(12) United States Patent
Hajimiri et al.

(10) Patent No.: US 11,601,183 B2
(45) Date of Patent: Mar. 7, 2023

(54) SPATIAL REDISTRIBUTORS AND METHODS OF REDISTRIBUTING MM-WAVE SIGNALS

(71) Applicant: California Institute of Technology, Pasadena, CA (US)

(72) Inventors: Seyed Ali Hajimiri, La Canada, CA (US); Austin C. Fikes, Pasadena, CA (US); Parham Porsandeh Khial, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/723,943

(22) Filed: Dec. 20, 2019

(65) Prior Publication Data

US 2020/0204244 A1    Jun. 25, 2020

Related U.S. Application Data

(60) Provisional application No. 62/931,634, filed on Nov. 6, 2019, provisional application No. 62/897,764, filed
(Continued)

(51) Int. Cl.
| | |
|---|---|
| H04B 7/06 | (2006.01) |
| H04B 7/02 | (2018.01) |
| H04L 1/08 | (2006.01) |

(52) U.S. Cl.
CPC .......... *H04B 7/0697* (2013.01); *H04B 7/028* (2013.01); *H04B 7/0617* (2013.01); *H04B 7/0667* (2013.01); *H04L 1/08* (2013.01)

(58) Field of Classification Search
CPC ................ H04B 7/0408; H04B 17/364; H04B 7/0686; H04B 7/0697
See application file for complete search history.

(56) References Cited

U.S. PATENT DOCUMENTS

| | | |
|---|---|---|
| 6,778,843 B2 | 8/2004 | Oura |
| 6,831,600 B1 | 12/2004 | Cherrette et al. |

(Continued)

FOREIGN PATENT DOCUMENTS

| | | |
|---|---|---|
| WO | 2018218003 A1 | 11/2018 |
| WO | 2020132126 A1 | 6/2020 |

(Continued)

OTHER PUBLICATIONS

Cho et al., "A True Time Delay-Based SiGe Bi-directional T/R Chipset for Large-Scale Wideband Timed Array Antennas", IEEE Radio Frequency Integrated Circuits Symposium (RFIC), Jun. 2018, pp. 272-275, DOI:10.1109/RFIC.2018.8428977.

(Continued)

*Primary Examiner* — Ayaz R Sheikh
*Assistant Examiner* — Debebe A Asefa
(74) *Attorney, Agent, or Firm* — KPPB LLP

(57) ABSTRACT

Spatial redistributors and methods of redistributing signals in accordance with various embodiments of the invention are illustrated. One embodiment includes an array of channels configured to receive and retransmit a signal, where each of a plurality of independently operating channels in the array includes: at least one antenna element; an RF chain configured to apply at least a time delay to the received signal prior to retransmission; control circuitry configured to control the time delay applied to the received signal by the RF chain; and a reference oscillator. In addition, the array of channels is configured to redirect a signal received from a first set of directions for retransmission in a second set of directions; and the control circuitry of the channels in the array of channels coordinates the time delays applied to the received signal across the array of channels to control the wave front of the retransmitted signal.

34 Claims, 30 Drawing Sheets
(25 of 30 Drawing Sheet(s) Filed in Color)

Related U.S. Application Data on Sep. 9, 2019, provisional application No. 62/783,011, filed on Dec. 20, 2018.

(56) References Cited

U.S. PATENT DOCUMENTS

| | | | |
|---|---|---|---|
| 7,848,719 | B2 | 12/2010 | Krishnaswamy et al. |
| 9,214,739 | B2 | 12/2015 | Sover et al. |
| 10,061,125 | B2 | 8/2018 | Hajimiri et al. |
| 11,112,491 | B2 | 9/2021 | Abediasl et al. |
| 11,249,370 | B2 | 2/2022 | Hajimiri |
| 2003/0054790 | A1* | 3/2003 | Sanada ............ H04B 7/084 455/334 |
| 2004/0087294 | A1 | 5/2004 | Wang |
| 2005/0255387 | A1 | 11/2005 | Butt et al. |
| 2006/0246911 | A1 | 11/2006 | Petermann |
| 2007/0046547 | A1* | 3/2007 | Crouch ............ H01Q 23/00 343/700 MS |
| 2007/0159407 | A1 | 7/2007 | Bolle et al. |
| 2008/0252546 | A1 | 10/2008 | Mohamadi |
| 2009/0274466 | A1 | 11/2009 | Cox et al. |
| 2011/0217970 | A1 | 9/2011 | Ben et al. |
| 2012/0002967 | A1 | 1/2012 | Mayer et al. |
| 2012/0039366 | A1 | 2/2012 | Wood et al. |
| 2012/0139810 | A1 | 6/2012 | Faraone et al. |
| 2013/0093624 | A1* | 4/2013 | Raczkowski ............ H01Q 3/42 342/368 |
| 2016/0048708 | A1 | 2/2016 | Sandler et al. |
| 2017/0029107 | A1* | 2/2017 | Emami ............ G01S 13/003 |
| 2017/0184699 | A1* | 6/2017 | Honma ............ G01S 13/003 |
| 2018/0020416 | A1 | 1/2018 | Smith et al. |
| 2018/0039154 | A1 | 2/2018 | Hashemi et al. |
| 2018/0241122 | A1 | 8/2018 | Jalali Mazlouman et al. |
| 2019/0056499 | A1 | 2/2019 | Fatemi et al. |
| 2019/0361102 | A1* | 11/2019 | Price ............ G01S 7/52034 |
| 2020/0106499 | A1* | 4/2020 | Branlund ............ H01Q 3/2605 |
| 2020/0192179 | A1 | 6/2020 | Hajimiri |
| 2021/0105092 | A1 | 4/2021 | Hajimiri et al. |
| 2022/0021114 | A1 | 1/2022 | Gal et al. |

FOREIGN PATENT DOCUMENTS

| | | |
|---|---|---|
| WO | 2020132611 A1 | 6/2020 |
| WO | 2022016110 A1 | 1/2022 |

OTHER PUBLICATIONS

Chu et al., "True-Time-Delay-Based Multi-Beam Arrays", IEEE Transactions on Microwave Theory and Techniques, Aug. 2013, vol. 61, Issue 8, pp. 3072-3082, DOI: 10.1109/TMTT.2013.2271119.

Dimas et al., "Cooperative Beamforming with Predictive Relay Selection for Urban mmWave Communications", IEEE Access, 2016, vol. 4, pp. 157057-157071, DOI: 10.1109/ACCESS.2017. DOI.

Garakoui et al., "Compact Cascadable gm-C All-Pass True Time Delay Cell with Reduced Delay Variation over Frequency", IEEE Journal of Solid-State Circuits, Mar. 1, 2015, first published Feb. 15, 2014, vol. 50, No. 3, pp. 693-703, DOI: 10.1109/JSSC.2015.2390214.

Ghaderi et al., "An Integrated Discrete-Time Delay Compensating Technique for Large-Array Beamformers", IEEE Transactions on Circuits and Systems—I: Regular Papers, Sep. 2019, vol. 66, No. 9, pp. 3296-3306.

Hajimiri et al., "Phased Array Systems in Silicon", Topics in Circuits for Communications, IEEE Communications Magazine, Aug. 2004, vol. 42, No. 8, pp. 122-130.

Havary-Nassab et al., "Distributed Beamforming for Relay Networks Based on Second-Order Statistics of the Channel State Information", IEEE Transactions on Signal Processing, Sep. 2008, vol. 56, Issue 9, pp. 4306-4316, DOI: 10.1109/TSP.2008.925945.

Hong et al., "Multibeam Antenna Technologies for 5G Wireless Communications", IEEE Transactions on Antennas and Propagation, Dec. 2017, vol. 65, Issue 12, pp. 6231-6249, DOI: 10.1109/TAP.2017.2712819.

Huang et al., "A Mm-Wave Wideband MIMO RX With Instinctual Array-Based Blocker/Signal Management for Ultralow-Latency Communication", IEEE Journal of Solid-State Circuits, Dec. 2019, first published Oct. 24, 2019, vol. 54, Issue 12, pp. 3553-3564, DOI: 10.1109/JSSC.2019.2945267.

Jang et al., "A 1-GHz 16-Element Four-Beam True-Time-Delay Digital Beamformer", IEEE Journal of Solid-State Circuits, 2019, vol. 54, No. 5, pp. 1304-1314, DOI: 10.1109/JSSC.2019.2894357.

Jing et al., "Network Beamforming Using Relays with Perfect Channel Information", IEEE Transactions on Information Theory, 2009, Vik, 55m Ni, 6, pp. 4306-4316, arXiv:0804.1117 [cs,IT], Apr. 7, 2008.

Laneman et al., "An efficient protocol for realizing cooperative diversity in wireless networks", Proceedings, 2001 IEEE International Symposium on Information Theory (IEEE Cat. No. 01CH37252), Jun. 24-29, 2001, p. 294, DOI:10.1109/ISIT.2001.936157.

Mondal et al., "A 2-GHz Bandwidth, 0.25-1.7 ns True-Time-Delay Element Using a Variable-Order All-Pass Filter Architecture in 0.13 μm CMOS", IEEE Journal of Solid-State Circuits, Aug. 2017, vol. 52, Issue 8, pp. 2180-2193, DOI: 10.1109/JSSC.2017.2693229.

Nishio et al., "A high-speed adaptive antenna array with simultaneous multiple-beamforming capability", IEEE Transactions on Microwave Theory and Techniques, Jul. 2003, vol. 3, pp. 1673-1676, DOI:10.1109/MWSYM.2003.1210460.

Pang et al., "A 28-GHz CMOS Phased-Array Beamformer Utilizing Neutralized Bi-Directional Technique Supporting Dual-Polarized MIMO for 5G NR", IEEE Journal of Solid-State Circuits, Sep. 2020, vol. 55, No. 9, pp. 2371-2386, 10.1109/JSSC.2020.2995039.

Scaglione et al., "Opportunistic Large Arrays: Cooperative Transmission in Wireless Multihop Ad Hoc Networks to Reach Far Distances", IEEE Transactions on Signal Processing, Aug. 2003, vol. 51, No. 8, pp. 2082-2092, DOI: 10.1109/TSP.2003.814519.

Sendonaris et al., "Increasing uplink capacity via user cooperation diversity", Proceedings, 1998 IEEE International Symposium on Information Theory (Cat. No. 98CH36252), Aug. 16-21, 1998, pp. 156, DOI:10.1109/ISIT.1998.708750.

Sendonaris et al., "User Cooperation Diversity—Part 1: System Description", IEEE Transactions on Communications, Nov. 2003, vol. 51, No. 11, pp. 1927-1938, DOI: 10.1109/TCOMM.2003.818096.

Sendonaris et al., "User Cooperation Diversity—Part II: Implementation Aspects and Performance Analysis", IEEE Transactions on Communications, Nov. 2003, vol. 51, No. 11, pp. 1939-1948, DOI:10.1109/TCOMM.2003.819238.

Shahramian et al., "A Fully Integrated 384-Element, 16-Tile, W-Band Phased Array With Self-Alignment and Self-Test", IEEE Journal of Solid-State Circuits, Sep. 2019, first published Aug. 6, 2019, vol. 54, Issue 9, pp. 2419-2434, DOI: 10.1109/JSSC.2019.2928694.

Skolnik, "Radar Handbook", Second Edition, McGraw-Hill, 1990, 36 pgs.

Tao et al., "An overview of cooperative communications", IEEE Communications Magazine, Jun. 6, 2012, vol. 50, Issue 6, pp. 65-71, DOI:10.1109/MCOM.2012.6211487.

International Preliminary Report on Patentability for International Application PCT/US2019/068115, Report issued Jun. 16, 2021, dated Jul. 1, 2021, 12 pgs.

International Search Report and Written Opinion for International Application No. PCT/US2019/068115, Search completed Feb. 13, 2020, dated Mar. 18, 2020, 18 Pgs.

"Altera: Time Delay Digital Beamforming", Altera Corporation, Reference Design Datasheet, Retrieved from: https://www.intel.cn/content/dam/www/programmable/us/en/pdfs/literature/ds/time_delay_digita_beamforming_11.pdf, Apr. 2014, 1 pg.

Abbas, "Beamforming Techniques for Millimeter Wave Relay Networks", PhD Thesis, University of Manchester, 2017, 168 pgs, presented in 2 parts.

(56) References Cited

OTHER PUBLICATIONS

Ahmed et al., "A Survey on Hybrid Beamforming Techniques in 5G Architecture and System Model Perspectives", IEEE Communications Surveys & Tutorials, vol. 20, No. 4, Fourth Quarter 2018, Jun. 4, 2018, pp. 3060-3097.
Chu et al., "A True Time-Delay-Based Bandpass Multi-Beam Array at mm-Waves Supporting Instantaneously Wide Bandwidths", 2010 IEEE International Solid-State Circuits Conference (ISSCC), Feb. 7-11, 2010, pp. 38-40.
Hajimiri et al., "Integrated Phased Array Systems in Silicon", IEEE Communications Magazine, Sep. 2005, vol. 93, Issue 9, pp. 1637-1655, DOI: 10.1109/JPROC.2005.852231.
Jang et al., "A True Time Delay 16-Element 4-Beam Digital Beamformer", 2018 IEEE Radio Frequency Integrated Circuits Symposium (RFIC), June 10-12, 2018, pp. 12-15.
Kutty et al., "Beamforming for Millimeter Wave Communications: An Inclusive Survey", IEEE Communications Surveys & Tutorials, vol. 18, No. 2, Second Quarter 2016, Electronic Publication: Dec. 1, 2015, pp. 949-973, DOI: 10.1109/COMST.2015.2504600.
Sohrabi et al., "Hybrid Digital and Analog Beamforming Design for Large-Scale Antenna Arrays", arXiv.org, Retrieved from: https://arxiv.org/abs/1601.06814v1, Jan. 25, 2016, 13 pgs.
Tsinos et al., "On the Energy-Efficiency of Hybrid Analog-Digital Transceivers for Single- and Mutli-carrier Large Antenna Array Systems", IEEE Journal on Selected Areas in Communications, vol. 35, No. 9, Sep. 2017, Electronic Publication: Jun. 28, 2017, 16 pgs.
Xu et al., "Spectral and Energy Efficiency of Multi-pair Massive MIMO Relay Network with Hybrid Processing", arXiv.org, Retrieved from: https://arxiv.org/abs/1706.06743v2, Jun. 25, 2017, 16 pgs.
Zhang et al., "Hybridly-Connected Structure for Hybrid Beamforming in mmWave MIMO Systems", IEEE Transactions on Communications, vol. 66, No. 2, Feb. 2018, 13 pgs, DOI: 10.1109/TCOMM.2017.2756882.
International Preliminary Report on Patentability for International Application PCT/US2019/067262, Report issued Jun. 16, 2021, dated Jul. 1, 2021, 8 Pgs.
International Search Report and Written Opinion for International Application No. PCT/US2021/042069, Search completed Nov. 5, 2021, dated Nov. 5, 2021, 10 Pgs.
International Search Report and Written Opinion for International Application No. PCT/US2019/067262, Search completed Feb. 21, 2020, dated Mar. 19, 2020, 13 Pgs.
Abiri et al., "A 1-D Heterodyne Lens-Free Optical Phased Array Camera With Reference Phase Shifting", IEEE Photonics Journal, vol. 10, No. 5, Sep. 2018, DOI: 10.1109/JPHOT.2018.2871823.
Aflatouni et al., "Nanophotonic projection system", Optical Society of America, Aug. 4, 2015, 11 pgs., DOI:10.1364/OE.23.021012.
Agrawal, "Fiber-Optic Communication Systems", Wiley Interscience, 2002, 563 pgs. (presented in 6 parts).
Akiba et al., "Photonic Architecture for Beam Forming of RF Phased Array Antenna", Optical Fiber Communication Conference, OSA Technical Digest, Mar. 2014, 3 pgs., https://doi.org/10.1364/OFC.2014.W2A.51.
Akima et al., "A 10 GHz frequency-drift temperature compensated LC VCO with fast-settling low-noise voltage regulator in 0.13 μm CMOS", Proceedings of the Custom Integrated Circuits Conference, Oct. 2010, pp. 1-4, DOI:10.1109/CICC.2010.5617448.
Beas et al., "Millimeter-Wave Frequency Radio over Fiber Systems: A Survey", IEEE Communications Surveys & Tutorials, Mar. 2013, vol. 15, No. 4, pp. 1593-1619, DOI 10.1109/SURV.2013.013013.00135.
Chang et al., "A temperature compensated VCO using feed-forward gain multiplication for cellular applications", IEEE Radio Frequency Integrated Circuits Symposium (RFIC), May 2015, pp. 187-190, DOI: 10.1109/RFIC.2015.7337736.
Chung et al., "A 1024-Element Scalable Optical Phased Array in 0.18 SOI CMOS", 2017 International Solid-State Circuits Conference, 2017, 12 pgs., DOI: 10.1109/ISSCC.2017.7870361.
Cripps, "RF power amplifiers for wireless communications", Boston: Artech House, 2006, 473 pgs.

Debaes et al., "High-impedance high-frequency silicon detector response for precise receiverless optical clock injection", Proceedings of the SPIE, Mar. 27, 2002, vol. 4654, pp. 78-88, https://doi.org/10.1117/12.463842.
Dunworth et al., "A 28GHz Bulk-CMOS dual-polarization phased-array transceiver with 24 channels for 5G user and basestation equipment", 2018 IEEE International Solid-State Circuits Conference—(ISSCC), Feb. 2018, pp. 70-72, DOI: 10.1109/ISSCC.2018.8310188.
Fatemi et al., "High sensitivity active flat optics optical phased array receiver with a two-dimensional aperture", Optics Express, vol. 26, No. 23, Nov. 12, 2018, 17 pgs., https://doi.org/10.1364/OE.26.029983.
Gal-Katziri et al., "A 28 GHz Optically Synchronized CMOS Phased Array with an Integrated Photodetector", IEEE Radio Frequency Integrated Circuits Symposium (RFIC), Jun. 2021,4 pgs., DOI:10.1109/RFIC51843.2021.9490452.
Gal-Katziri et al., "A Sub-Picosecond Hybrid DLL for Large-Scale Phased Array Synchronization", IEEE Asian Solid-State Circuits Conference (A-SSCC), 2018, pp. 231-234, DOI: 10.1109/ASSCC.2018.8579340.
Gao, "High-resolution phased array radar imaging by photonics-based broadband digital beamforming", Optics Express, Apr. 29, 2019, vol. 27, No. 9, p. 13194-13203, doi: 10.1364/OE.27.013194.
Gardner, "Charge-pump phase-lock loops", IEEE Transactions on Communications, Nov. 1980, vol. COM-28, pp. 1849-1858, DOI: 10.1109/TCOM.1980.1094619.
Gaudino et al., "Perspective in Next-Generation Home Networks: Toward Optical Solutions?", IEEE Communications Magazine, Mar. 2010, vol. 48, No. 2. pp. 39-47, DOI:10.1109/MCOM.2010.5402662.
Goodman et al., "Optical interconnections for VLSI systems", Proceedings of the IEEE, Jul. 1984, vol. 72, Issue 7, pp. 850-866, DOI: 10.1109/PROC.1984.12943.
Hajimiri et al., "Dynamic Focusing of Large Arrays for Wireless Power Transfer and Beyond", IEEE Journal of Solid-State Circuits, Nov. 2020, 25 pgs., DOI: 10.1109/JSSC.2020.3036895.
Hashemi et al., "A flexible phased array system with low areal mass density", Nature Electronics, May 17, 2019, vol. 2, pp. 195-205, DOI: https://doi.org/10.1038/s41928-019-0247-9.
He et al., "Long-distance telecom-fiber transfer of a radio-frequency reference for radio astronomy", Optica, Feb. 2018, vol. 5, Issue 2, pp. 138-146, https://doi.org/10.1364/OPTICA.5.000138.
Hong et al., , "A General Theory of Injection Locking and Pulling in Electrical Oscillators—Part I: Time-Synchronous Modeling and Injection Waveform Design", IEEE Journal of Solid-State Circuits, Aug. 2019, vol. 54, Issue 8, pp. 2109-2121, DOI: 10.1109/JSSC.2019.2908753.
Horvat, "True Time Domain Bandpass Beamforming", Thesis, Master of Applied Science, Engineering Science, Simon Fraser University, 1998, 104 pgs.
Hu et al., "17.6 A 21.7-to-26.5GHz Charge-Sharing Locking Quadrature PLL with Implicit Digital Frequency-Tracking Loop Achieving 75fs Jitter and −250dB FoM", IEEE International Solid-State Circuits Conference—(ISSCC), Feb. 2020, pp. 276-278, DOI: 10.1109/ISSCC19947.2020.9063024.
Jeon et al., "A Scalable 6-to-18 GHz Concurrent Dual-Band Quad-Beam Phased-Array Receiver in CMOS", IEEE Journal of Solid-State Circuits, Jan. 2009, vol. 43, No. 12, pp. 2660-2673, DOI:10.1109/JSSC.2008.2004863.
Kalia et al., "A Simple, Unified Phase Noise Model for Injection-Locked Oscillators", IEEE Radio Frequency Integrated Circuits Symposium, Jun. 2011, pp. 1-4, DOI: 10.1109/RFIC.2011.5940707.
Kang et al., "Low-cost multistandard radio-over-fiber downlinks based on CMOS-compatible Si avalanche photodetectors", IEEE Photonics Technology Letters, May 2009, vol. 21, No. 7, pp. 462-464, DOI: 10.1109/LPT.2009.2013356.
Kaukoruori et al., "Analysis and Design of Passive Polyphase Filters", IEEE Transactions on Circuits and Systems I: Regular Papers, Feb. 7, 2008, vol. 55, No. 10, pp. 3023-3037, DOI: 10.1109/TCSI.2008.917990.
Kern, "PLL-Based Active Optical Clock Distribution", Thesis, Sep. 2004, 105 pgs.

(56) References Cited

OTHER PUBLICATIONS

Komljenovic et al., "On-chip calibration and control of optical phased arrays", Optics Express, vol. 26, No. 3, Feb. 5, 2018, 12 pgs., https://doi.org/10.1364/OE.26.003199.

Lau et al., "Ultra-Stable RF-Over-Fiber Transport in NASA Antennas, Phased Arrays and Radars", Journal of Lightwave Technology, Oct. 15, 2014, vol. 32, Issue 20, pp. 3440-3451, DOI: 10.1109/JLT.2014.2312930.

Lee et al., "A silicon avalanche photodetector fabricated with standard CMOS technology with over 1 THz gain-bandwidth product", Optics Express, Nov. 2010, vol. 18, No. 23, pp. 24189-24194, DOI:10.1364/OE.18.024189.

Lee et al., "Optical-Power Dependence of Gain, Noise, and Bandwidth Characteristics for 850-nm CMOS Silicon Avalanche Photodetectors", IEEE Journal of Selected Topics in Quantum Electronics, Nov.-Dec. 2014, vol. 20, Issue 6, pp. 211-217, DOI:10.1109/JSTQE.2014.2327796.

Lee et al., "Performance Optimization and Improvement of Silicon Avalanche Photodetectors in Standard CMOS Technology", IEEE Journal of Selected Topics in Quantum Electronics, Mar.-Apr. 2018, vol. 24, Issue 2. pp. 1-13, DOI: 10.1109/JSTQE.2017.2754359.

Leu et al., "Injection-locked clock receiver for monolithic optical link in 45nm SOI", IEEE Asian Solid-State Circuits Conference, Nov. 2011, pp. 149-152, DOI: 10.1109/ASSCC.2011.6123624.

Liu et al., "A Temperature Compensated Triple-Path PLL With KVCO Non-Linearity Desensitization Capable of Operating at 77 K", IEEE Transactions on Circuits and Systems I: Regular Papers, May 2017, vol. 64, No. 11, pp. 1-9, DOI: 10.1109/TCSI.2017.2704023.

Matsko, "Advances in the Development of Spectrally Pure Microwave Photonic Synthesizers", IEEE Photonics Technology Letters, Dec. 1, 2019, vol. 31, Issue 23, pp. 1882-1885, DOI: 10.1109/LPT.2019.2947901.

McIntrye, "The distribution of gains in uniformly multiplying avalanche photodiodes: Theory", IEEE Transactions on Electron Devices, Jun. 1972, vol. 19, Issue 6, pp. 703-713, DOI: 10.1109/T-ED.1972.17485.

McIntyre, "A new look at impact ionization—Part I: A theory of gain, noise, breakdown probability, and frequency response", IEEE Transactions on Electron Devices, Aug. 1999, vol. 46, Issue 8, pp. 1623-1631, DOI: 10.1109/16.777150.

McIntyre, "Multiplication noise in uniform avalanche diodes", IEEE Transactions on Electron Devices, Jan. 1966, vol. ED-13, issue 1, pp. 164-168, DOI: 10.1109/T-ED.1966.15651.

Nayak et al., "A 10-GB/s −18.8 dBm Sensitivity 5.7 mW Fully-Integrated Optoelectronic Receiver With Avalanche Photodetector in 0.13-μm CMOS", IEEE Transactions on Circuits and Systems—I: Regular Papers, Aug. 2019, vol. 66, No. 8, pp. 3162-36173, DOI: 10.1109/TCSI.2019.2909284.

Niknejad, "Electromagnetics for High-Speed Analog and Digital Communication Circuits", Cambridge University Press, Feb. 2007, 10 pgs.

Ortega et al., "Optical Beamformer for 2-D Phased Array Antenna With Subarray Partitioning Capability", IEEE Photonics Journal, vol. 8, No. 3, Jun. 2016, 9 pgs., DOI: 10.1109/JPHOT.2016.2550323.

Paciorek, "Injection locking of oscillators", Proceedings of the IEEE, Nov. 1965, vol. 53, Issue 11, pp. 1723-1727, DOI: 10.1109/PROC.1965.4345.

Pan et al., "An 18-GB/s Fully Integrated Optical Receiver With Adaptive Cascaded Equalizer", IEEE Journal of Selected Topics in Quantum Electronics, Nov./Dec. 2016, vol. 22, No. 6, pp. 361-369, DOI: 10.1109/JSTQE.2016.2574567.

Pancheri et al., "Low-Noise Avalanche Photodiode in Standard 0.35-pm CMOS Technology", IEEE Transactions on Electron Devices, vol. 55, Issue 1, pp. 457-461, first published Dec. 26, 2007, DOI: 10.1109/TED.2007.910570.

Pang et al., "21.1 A 28GHz CMOS Phased-Array Beamformer Utilizing Neutralized Bi-Directional Technique Supporting Dual-Polarized MIMO for 5G NR", IEEE International Solid-State Circuits Conference—(ISSCC), Feb. 2019, pp. 344-346, DOI:10.1109/ISSCC.2019.8662324.

Pauchard et al., "Dead space effect on the wavelength dependence of gain and noise in avalanche photodiodes", IEEE Transactions on Electron Devices, Sep. 2000, vol. 47, Issue 9, pp. 1685-1693, DOI: 10.1109/16.861578.

Payne et al., "Photonic Techniques for Local Oscillator Generation and Distribution in Millimeter-Wave Radio Astronomy", International Topical Meeting on Microwave Photonics, Nov. 2002, pp. 9-12, DOI: 10.1109/MWP.2002.1158847.

Perley et al., "The Expanded Very Large Array: A New Telescope for New Science", The Astrophysical Journal Letters, Sep. 20, 2011. Vol. 739, No. L1, 5 pgs., doi:10.1088/2041-8205/739/1/L1.

Poulton et al., "High-Performance Integrated Optical Phased Arrays for Chip-Scale Beam Steering and LiDAR", CLEO, Jan. 2018, 3 pgs., DOI: 1364/CLEO_AT.2018. ATu3R.2.

Rajbhandari et al., "High-Speed Integrated Visible Light Communication System: Device Constraints and Design Considerations", IEEE Journal on Selected Areas in Communications, 2015, vol. 33, No. 9, pp. 1750-1757, http://dx.doi.org/10.1109/JSAC.2015.2432551.

Razavi, "A Study of Injection Locking and Pulling in Oscillators", IEEE Journal of Solid-State Circuits, Sep. 2004, vol. 39, No. 9, pp. 1415-1424, DOI: 10.1109/JSSC.2004.831608.

Sadiku et al., "Comparison of approximate formulas for the capacitance of microstrip line", Proceedings 2007 IEEE SoutheastCon, Apr. 2007, pp. 427-432, DOI: 10.1109/SECON.2007.342939.

Santiccioli et al., "17.2 A 66fsrmsJitter 12.8-to-15.2GHz Fractional-N Bang-Bang PLL with Digital Frequency-Error Recovery for Fast Locking", 2020 IEEE International Solid-State Circuits Conference—(ISSCC), Feb. 16-20, 2020, pp. 276-278, DOI: 10.1109/ISSCC19947.2020.9063094.

Shillue et al., "The ALMA photonic local oscillator system", in 2011 URSI General Assembly and Scientific Symposium, IEEE, Aug. 2011, 4 pgs., https://doi.org/10.1109/ursigass.2011.6051254.

Strobel et al., "Communication in automotive systems: Principles, limits and new trends for vehicles, airplanes and vessels", 2010 12th International Conference on Transparent Optical Networks, Aug. 16, 2010, pp. 1-6, DOI: 10.1109/ICTON.2010.5549163.

Van Overstraeten et al., "Measurement of the ionization rates in diffused silicon p-n junctions", Solid-State Electronics, May 1970, vol. 13, Issue 5, pp. 583-608, https://doi.org/10.1016/0038-1101(70)90139-5.

Vorontsov et al., "Adaptive phase-distortion correction based on parallel gradient-descent optimization", Optics Letters, vol. 22, No. 12, Jun. 15, 1997, pp. 907-909.

You et al., "A 12GHz 67% tuning range 0.37pS RJrms PLL with LC-VCO temperature compensation scheme in 0.13 μm CMOS", IEEE Radio Frequency Integrated Circuits Symposium, Jun. 2014, pp. 101-104, DOI: 10.1109/RFIC.2014.6851669.

Yuan et al., "A new look at impact ionization—Part II: Gain and noise in short avalanche photodiodes", IEEE Transactions on Electron Devices, Sep. 1999, vol. 46, No. 8, pp. 1632-1639, DOI:10.1109/16.777151.

Yuan et al., "A Simple Formula for the Estimation of the Capacitance of Two-Dimensional Interconnects in VLSI Circuits", IEEE Electron Device Letters, Dec. 1982, vol. EDL-3, No. 12, pp. 391-393, DOI: 10.1109/EDL.1982.25610.

\* cited by examiner

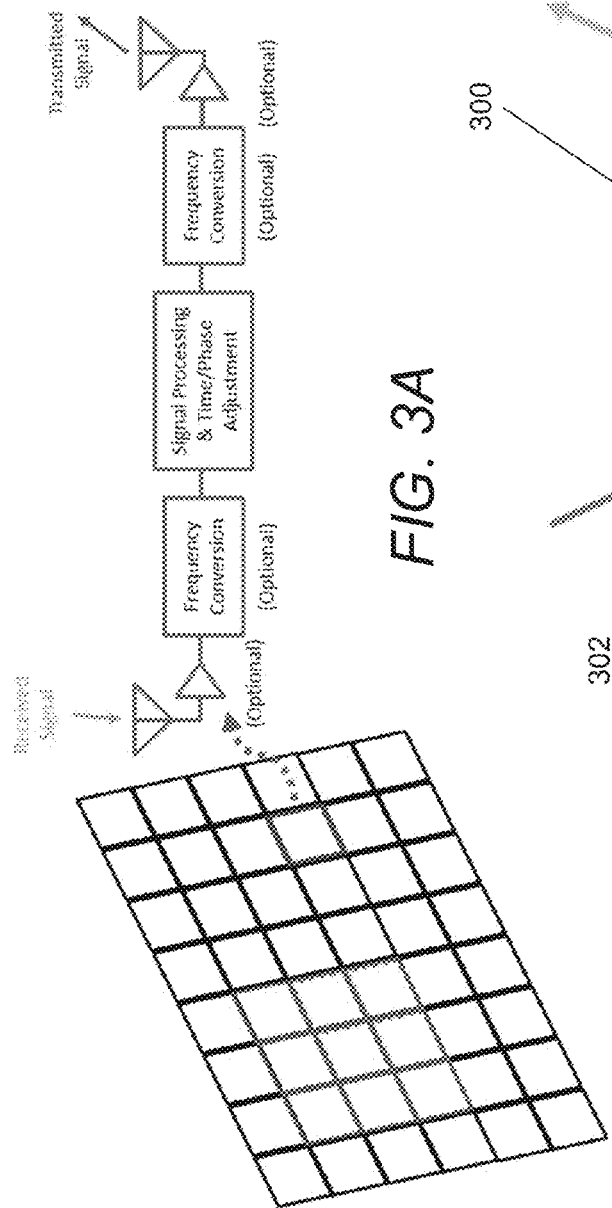
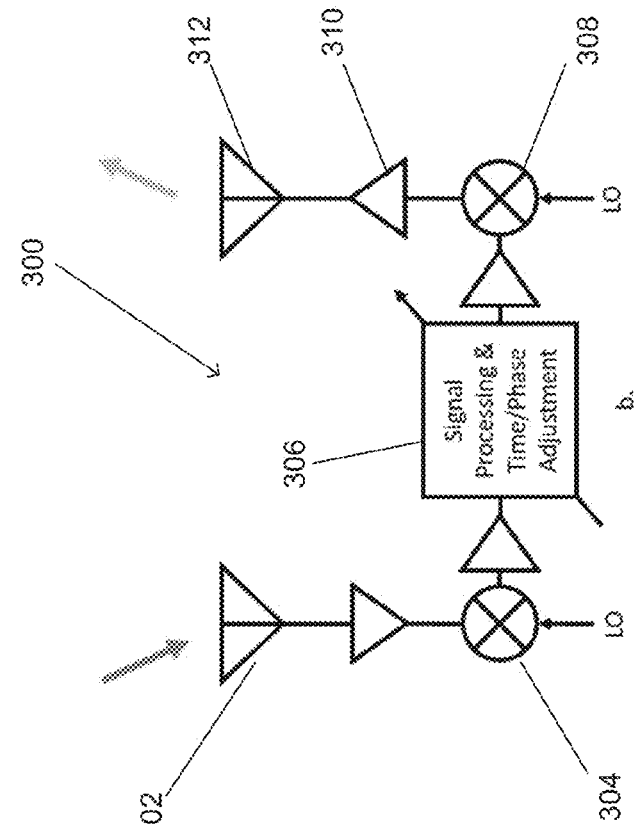
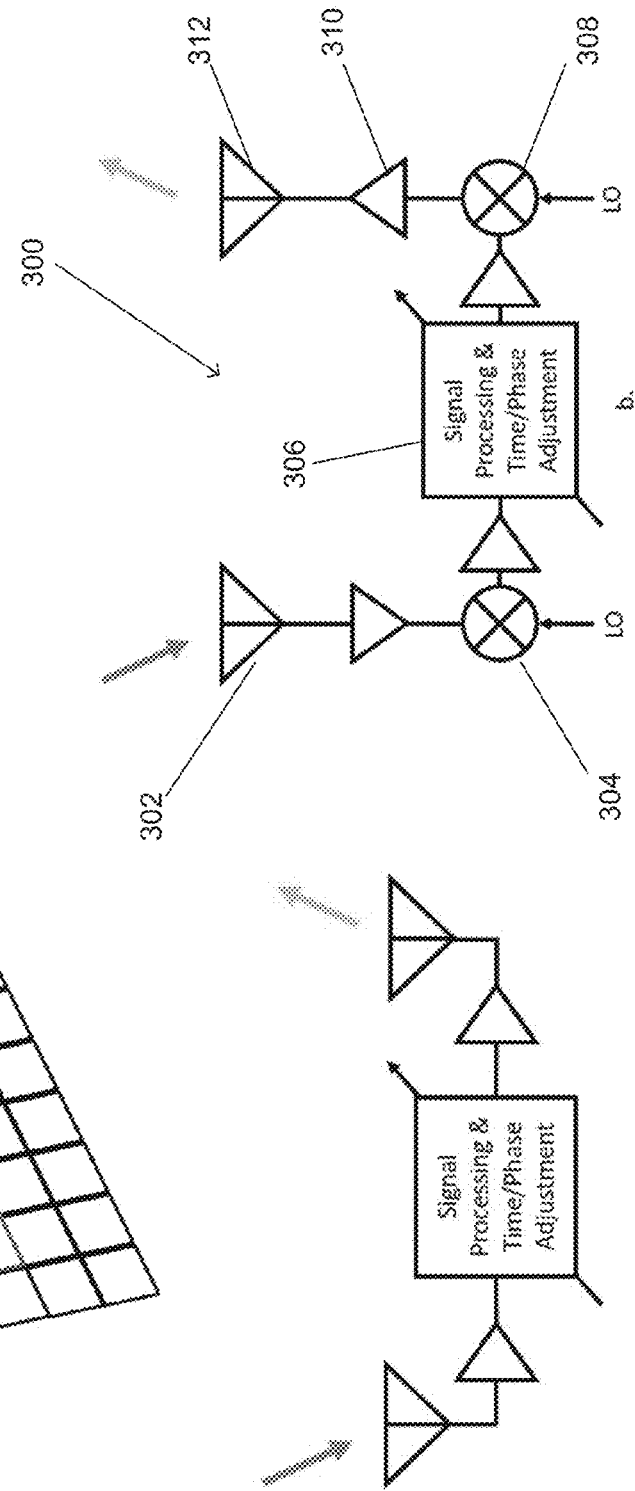
FIG. 3A
FIG. 3B
FIG. 3C

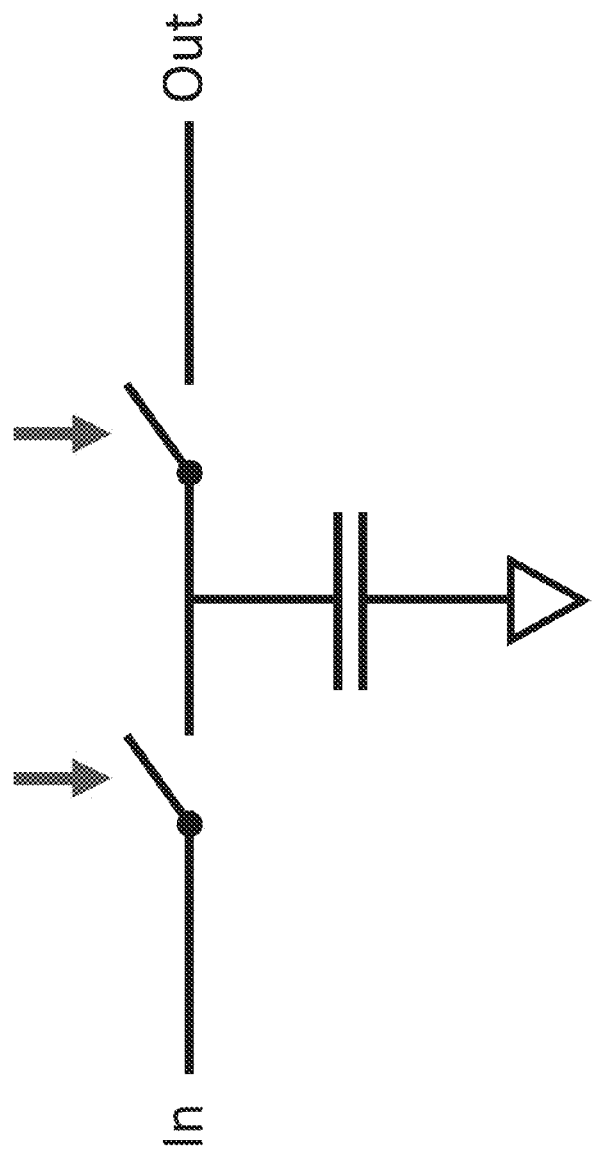
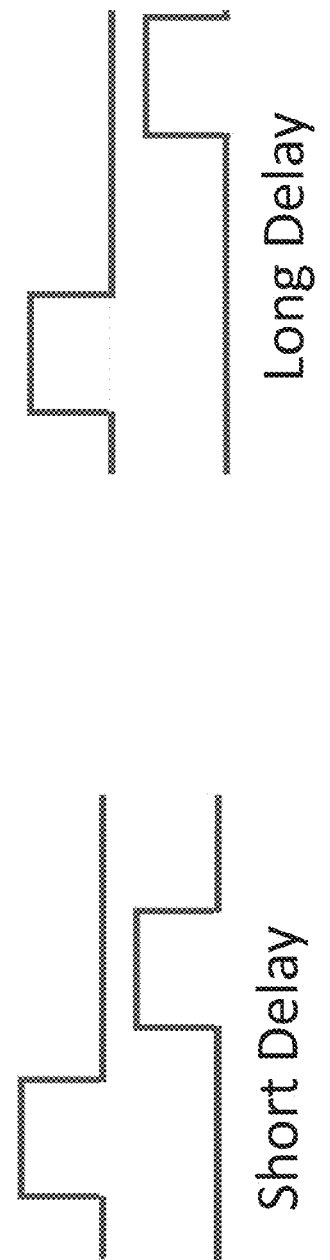
FIG. 20A
FIG. 20B
FIG. 20C

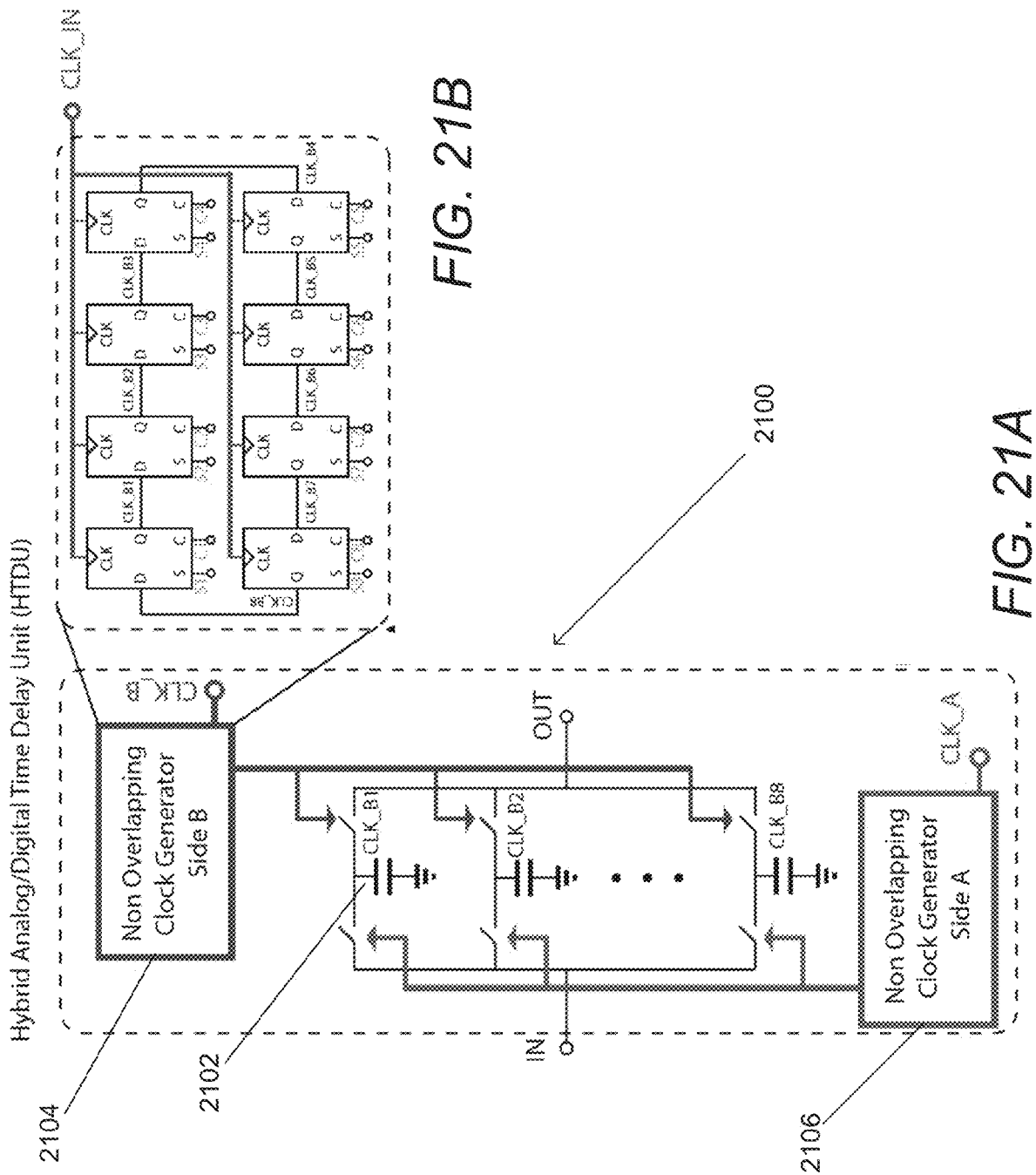

SPATIAL REDISTRIBUTORS AND METHODS OF REDISTRIBUTING MM-WAVE SIGNALS

CROSS-REFERENCE TO RELATED APPLICATIONS

The current application claims priority to U.S. Provisional Patent Application No. 62/783,011, entitled "Scalable, Agile, Electronically-Steering Conduit Array" and filed Dec. 20, 2018, U.S. Provisional Patent Application No. 62/897,764, entitled "Dynamic Scalable Decentralized Timed-Array Router" and filed Sep. 9, 2019 and U.S. Provisional Patent Application No. 62/931,634, entitled "Scalable Router Enhancements and Applications" filed Nov. 6, 2019. The disclosures of U.S. Provisional Patent Application Nos. 62/783,011, 62/897,764, and 62/931,634 are hereby incorporated by reference herein in their entireties.

FIELD OF THE INVENTION

The present invention generally relates to wireless communications and more specifically to the use of decentralized beam-forming systems and arrays to spatially redistribute mm-wave transmissions.

BACKGROUND

Over the last two decades, the development of mm-wave silicon ICs for communications and sensing has accelerated to answer demands for higher data rates and greater spatial selectivity. It is well known, however, that the higher the carrier frequency, the higher the propagation path losses. The short wavelength of mm-waves can also mean that objects like trees and light posts become obstacles that can block a signal. Therefore, mm-wave communication systems are typically line-of-sight and are designed to accommodate the high absorption of walls and other obstructions at these frequencies.

In many mm-wave communication systems, it can be advantageous to utilize antennas with highly directive characteristics (significant gains) to achieve long distance communication. The short wavelength of mm-waves enables the use of a very large number of antennas in a small region. Large antenna arrays can provide highly directional beam-forming gains, which can help overcome some of the propagation path loss and increase link reliability. Moreover, larger antenna arrays can transmit multiple streams via spatial multiplexing.

Transmit beamforming is typically performed by controlling the amplitude and/or phase of signals provided to multiple antenna elements. Receive beamforming is also typically performed by modifying the gain and phase of signals received at multiple antenna elements and then summing the modified signals. An important prerequisite in many beamforming architectures is a phase coherent signal, which means that there is a defined and stable phase relationship between the RF carriers of the signals utilize by the RF chain of each of the antenna elements. The term RF chain is typically utilized to refer to components that process RF signals. For example, an RF chain may convert a digital baseband signal into an RF analog signal in a transmitter or may convert an RF analog signal to a digital baseband signal in a receiver (e.g. a Digital to Analog Converter (DAC) and antenna amplifier or a Low Noise Amplifier (LNA) and an Analog to Digital Converter (ADC)). A variety of phased array beamforming architectures have been proposed for use in mm-wave communication systems including: digital beamforming arrays; analog beamforming arrays; and hybrid beamforming arrays.

The term digital beamforming array typically refers to a beamforming array, where beamforming is achieved through the adjustment of the amplitude and/or phase of the baseband signals provided to each antenna element in the digital domain by a digital signal processor. In this configuration, each antenna is connected to its own RF chain. The provision of a dedicated RF chain for each antenna element is considered by many to be prohibitive from both a cost and a power consumption perspective at mm-wave frequencies.

The term analog beamformer is typically used to describe a beamforming system that utilizes a single RF chain to generate an RF analog signal that is provided to a network of phase shifters that control the phase of the RF signals that are fed to each of the antenna elements. A disadvantage of analog beamforming is that a single RF chain typically can only support a single-stream transmission.

The term hybrid beamforming architecture is typically utilized to describe a beamformer constructed by concatenation of one or more low-dimensional digital beamformers with one or more analog beamformers (typically implemented using phase shifters). Hybrid beamforming architectures can be fully connected, partially connected, or hybrid connected. In a fully connected configuration, each RF chain is connected to each of the antenna elements in the array. In a partially connected architecture, each sub-array of antennas is only connected to a single RF chain. In a hybrid connected architecture, each sub-array of antennas is connected to a subset of the RF chains. Fully, partially, and hybrid connected mm-wave hybrid beamforming architectures are described in Zhang, Didi, Yafeng Wang, Xuehua Li, and Wei Xiang. "Hybridly connected structure for hybrid beamforming in mmWave massive MIMO systems." *IEEE Transactions on Communications* 66, no. 2 (2017): 662-674, the disclosure of which including the disclosure related to various hybrid beamforming architectures is hereby incorporated by reference in its entirety. It has been reported that a hybrid beamforming architecture need only utilize twice the number of RF chains as the total number of transmitted data streams for it to achieve similar performance as a fully digital beamforming scheme regardless of the number of antenna elements in the system.

Beamforming architectures typically are based on a centralized aggregation (e.g. summation), or distribution of a signal across the array. Therefore, many beamforming architectures require signal connectivity between elements of an array, which in turn leads need for physical connectivity in a centralized fashion.

SUMMARY OF THE INVENTION

Spatial distributors and methods of redistributing signals in accordance with various embodiments of the invention are capable of receiving signals and then redirecting them in a specific direction in a decentralized fashion. The ability of spatial distributors in accordance with many embodiments of the invention to operate in decentralized manner can enable a breadth of new applications, where a large number of independently operating units can operate in concert as a redistribution network, without being physically connected or even being in immediate proximity of one another.

Spatial redistributors in accordance with a number of embodiments of the invention can be low latency and highly scalable when compared to traditional RF relays, because the received signals are not centrally combined. In many embodiments, spatial redistributors avoid the long delays that can result from bringing signals from the periphery of an antenna array to its center. This can allow the size of the array to be increased without negatively impacting latency. Accordingly, a spatial redistributor can be scaled arbitrarily to achieve a desired sensitivity and/or signal power in the radiated directed beam. While the signal processing is decentralized, spatial radiators in accordance with several embodiments of the invention can maintain the ability to form a highly directive and data coherent steerable beam on both receive and transmit sides.

In some embodiments of the invention, adjustable time delays within each channel of a spatial redistributor can achieve coherent modulated data redistribution without additional dispersion due to the array operation. Conventional phased array beamformers approximate time delay by phase shift, but this can be limited by a phenomenon known as squinting which refers to poor beam steering away from the central frequency. The effects of squinting can be particularly pronounced in broadband mm-wave communication systems. Use of time delay beamforming by spatial redistributors in accordance with various embodiments of the invention can significantly reduce and/or eliminate squinting errors in wideband signals.

Spatial redistributors in accordance with many embodiments of the invention are able to perform transmit and receive beamforming using time delay beamforming. In a number of embodiments, time delay beamforming is performed by receiving a signal at an array of multiple antenna elements. The antenna array can be a 1D array, a 2D array, a 3D array (i.e. not all elements are located on a plane) and/or an ad hoc array. In several embodiments, time and phase adjustments are applied to the received signals and the time and phase adjusted signals are transmitted using an array of multiple antenna elements. As with the receive array, the transmit array can be a 1D array, a 2D array, a 3D array and/or an ad hoc array. In several embodiments, the spatial redistributor can use a single array of antenna elements for both receive and transmit beamforming.

One embodiment of a spatial redistributor in accordance with an embodiment of the invention includes an array of channels configured to receive and retransmit a signal, where each of a plurality of independently operating channels in the array includes: at least one antenna element; an RF chain configured to apply at least a time delay to the received signal prior to retransmission; control circuitry configured to control the time delay applied to the received signal by the RF chain; and a reference oscillator. In addition, the array of channels is configured to redirect a signal received from a first set of directions for retransmission in a second set of directions; and the control circuitry of the channels in the array of channels coordinates the time delays applied to the received signal across the array of channels to control the wave front of the retransmitted signal.

In a further embodiment, at least a plurality of the channels in the array of channels do not share a common reference oscillator signal.

In another embodiment, controlling at least one of a time delay and a phase shift applied to the received signal achieves at least one of receive beamforming and transmit beamforming.

In a still further embodiment, controlling at least one of a time delay and a phase shift applied to the received signal achieves receive and transmit beamforming.

In still another embodiment, each channel in the array of channels is further configured to apply a phase shift to the received signal prior to retransmission.

In a yet further embodiment, the time delay is applied to the received signal and the phase shift is applied to the time delayed signal.

In yet another embodiment, the time delay and the phase shift are applied using a single adjustment of the received signal.

In a further embodiment again, the antenna elements of the channels in the array of channels form an antenna array selected from the group consisting of: a one-dimensional (1D) array; a two-dimensional (2D) array; and a three-dimensional (3D) array.

In another embodiment again, channels in the array of channels form at least one array selected from the group consisting of a regular array and an ad hoc array.

In a further additional embodiment, the antenna array includes alternating transmit and receive antenna elements.

In another additional embodiment, the antenna array includes transmit and receive antenna elements mounted to different sides of a supporting structure.

In a still yet further embodiment, the antenna array includes antenna elements that are utilized as both a receive and a transmit antenna array.

In still yet another embodiment, the at least one antenna element of at least one of the channels in the array of channels includes at least one receive antenna element and at least one transmit antenna element.

In a still further embodiment again, the at least one antenna element of at least one of the channels in the array includes a multiport antenna element that is utilized for receiving and transmitting signals.

In still another embodiment again, the: at least one antenna element of at least one of the channels in the array includes a single port; and the at least one channel in the array that includes a single port antenna element further includes a circulator.

In a still further additional embodiment, at least a plurality of the channels in the array of channels apply at least one of a time delays and a phase shift directly to a received RF signal.

In still another additional embodiment, at least a plurality of the channels in the array of channels perform frequency conversion and apply a time delay and apply a phase shift to an intermediate frequency (IF) signal.

In a yet further embodiment again, at least a plurality of the channels in the array of channels perform frequency conversion and apply time delays and apply phase shifts to a base band (BB) signal.

In yet another embodiment again, the frequency conversion includes down conversion and up conversion.

In a further additional embodiment again, the received signal has a carrier frequency with a first frequency and the up conversion is to a carrier frequency at a second frequency that is different to the first frequency.

In another additional embodiment again, at least a plurality of the channels in the array of channels apply at least one of a time delay and a phase shift to a received analog signal.

In a still yet further embodiment again, the at least a plurality of the channels in the array of channels that apply at least one of a time delay and a phase shift to a received analog signal: perform frequency conversion to convert the received signal to an IF signal; obtain analog samples of the received signal; and apply delays to the analog samples of the received signal.

In still yet another embodiment again, obtaining analog samples of the received signal includes sampling the received signal onto a set of parallel switched capacitors; and applying delays to the analog samples of the received signals includes controlling the delay between the sampling of the received signal onto the capacitors in the set of parallel switch capacitors and the readout of the capacitors in the set of parallel switched capacitors.

In a still yet further additional embodiment, each of the at least a plurality of the channels in the array of channels that apply delays to analog signals further includes two non-overlapping clock generators (NOCs) that control the sampling of the received signal onto the capacitors in the set of parallel switch capacitors and the readout of the capacitors in the set of parallel switched capacitors.

In still yet another additional embodiment, at least a plurality of the channels in the array of channels have reference oscillators that produce different time bases.

In a yet further additional embodiment again, at least a plurality of the channels in the array of channels: digitize the received signal; apply time delays and phase shifts to the digitized signal; generate an analog signal using a digital to analog converter; and retransmit a signal based upon the generated analog signal.

In yet another additional embodiment again, array of channels forms a spatial router configured to utilize routing information to dynamically adjust the manner in which received signals are redirected.

In a still yet further additional embodiment again, the spatial router includes at least one channel configured to decode data modulated onto the received signal and extract routing information from the decoded data.

In still yet another additional embodiment again, the routing information includes at least one geometric angles, location coordinates, and an identifier.

In another further embodiment, the reference oscillator of at least a plurality of channels in the array is a free running oscillator.

In still another further embodiment, at least a plurality of channels in the array are bidirectional channel.

In yet another further embodiment, at least a plurality of channels in the array are mobile.

Another further embodiment of a spatial redistributor also includes an array of channels configured to receive and retransmit a signal, where each of a plurality of independently operating channels in the array includes: at least one antenna element; an RF chain configured to perform frequency conversion of the received signal and apply at least a time delay and a phase shift to an intermediate frequency (IF) signal prior to upconversion and retransmission; control circuitry configured to control the time delay and the phase shift applied to the received signal by the RF chain; and a reference oscillator. In addition, the array of channels is configured to redirect a signal received from a first set of directions for retransmission in a second set of directions; the control circuitry of the channels in the array of channels coordinates the time delays and phase shifts applied to the received signal across the array of channels to control the wave front of the retransmitted signal to perform receive and transmit beamforming; and at least a plurality of the channels in the array of channels do not share a common reference oscillator signal.

An embodiment of a method of invention includes: receiving a signal from a first set of directions at an array of channels, and retransmitting the received signal in a second set of directions by coordinating the time delays applied to the received signal across the array of channels to control the wave front of the retransmitted signal. In addition, each of a plurality of independently operating channels in the array includes: at least one antenna element; an RF chain configured to apply at least a time delay to the received signal prior to retransmission; control circuitry configured to control the time delay applied to the received signal by the RF chain; and a reference oscillator.

A communication system in accordance with an embodiment of the invention includes: a basestation including a transmitter; at least one user device, where each user device includes a receiver; and a spatial redistributor configured to receive a signal transmitted by the basestation and to retransmit the received signal to the at least one user device. In addition, the spatial redistributor includes an array of channels, where each of a plurality of independently operating channels in the array includes: at least one antenna element; an RF chain configured to apply at least a time delay to a received signal prior to retransmission; control circuitry configured to control the time delay applied to the received signal by the RF chain; and a reference oscillator. Furthermore, the array of channels is configured to redirect the received signal, which is received from a first set of directions, for retransmission in a second set of directions; and the control circuitry of the channels in the array of channels coordinates the time delays applied to the received signal across the array of channels to control the wave front of the retransmitted signal.

Another communication system in accordance with an embodiment of the invention includes: a plurality of user devices, where each user device includes a transmitter and a receiver; and a spatial router configured to route signals transmitted by the plurality of user devices. In addition, the spatial router includes an array of channels, where each of a plurality of independently operating channels in the array includes: at least one antenna element; an RF chain configured to apply at least a time delay to a received signal prior to retransmission; control circuitry configured to control the time delay applied to the received signal by the RF chain; and a reference oscillator. Furthermore, the array of channels is configured to redirect the received signal, which is received from a first set of directions, for retransmission in a second set of directions; the control circuitry of the channels in the array of channels coordinates the time delays applied to the received signal across the array of channels to control the wave front of the retransmitted signal; and the spatial router is configured to utilize routing information to dynamically adjust the manner in which received signals are redirected.

In a further embodiment, the spatial router includes at least one channel configured to decode data modulated onto the received signal and extract routing information from the decoded data.

In another embodiment, the routing information includes at least one of geometric angles, location coordinates, and an identifier.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A conceptually illustrates the manner in which a receive antenna element of a spatial redistributor can provide a signal to an independent signal pathway within a channel.

FIG. 3B is a simplified circuit diagram of a spatial redistributor in which the signal processing and time delay unit can be implemented to apply a time delay at the signal frequency.

FIG. 3C is a simplified circuit diagram of a channel that includes a signal pathway that performs time and/or phase adjustment at an intermediate frequency (IF).

FIGS. 20A-20C conceptually illustrate the sampling of a signal using a capacitor in accordance with an embodiment of the invention.

FIG. 21A illustrates multiple switched capacitors placed in parallel in an n-path configuration to implement a hybrid analog/digital time delay in accordance with an embodiment of the invention.

FIG. 21B shows the input and output switches of the parallel switched capacitors controlled by two separate non-overlapping clock generators (NOCs) in accordance with an embodiment of the invention.

DETAILED DISCLOSURE OF THE INVENTION

Figures 1, 2:
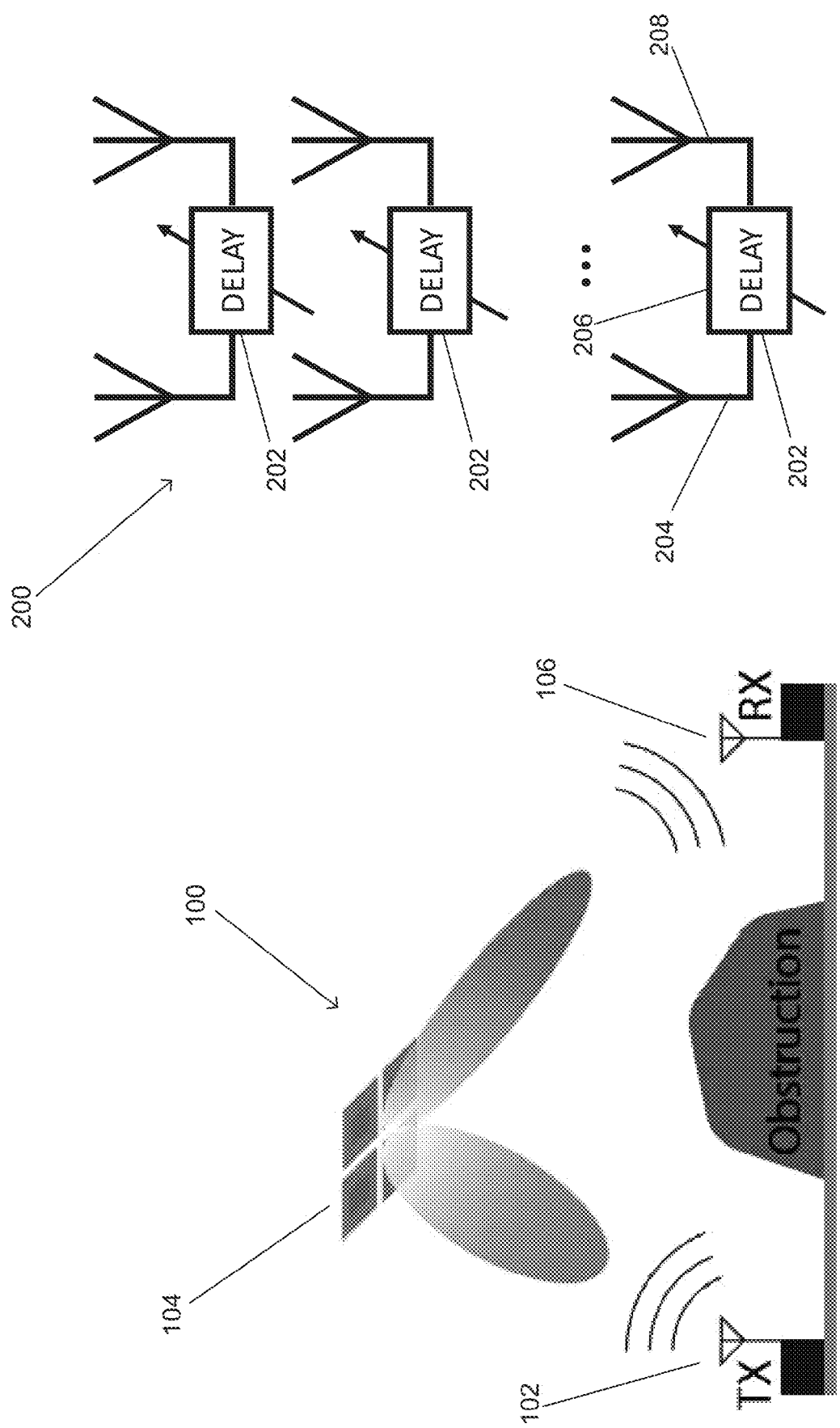
FIG. 1 illustrates a communication system including a spatial redistributor in accordance with an embodiment of the invention.
FIG. 2 conceptually illustrates a spatial redistributor in accordance with an embodiment of the invention.

Turning now to the drawings, spatial redistributors and methods of redistributing signals in accordance with various embodiments of the invention are illustrated. In many embodiments of the invention, the spatial redistributors utilize time delay beamforming arrays to redistribute mm-wave signals. In a number of embodiments, the time delay beamforming arrays are decentralized, which means that they do not share a phase coherent reference signal. In many embodiments, the time delay beamforming arrays are constructed using an array of channels that coordinate by passing command and control information. The channels can be considered to be a signal path through a spatial redistributor connected to receive and/or transmit elements that are independent (i.e. signals from different channels are not combined within the spatial redistributor). Each channel can apply time and phase adjustments to a received signal. By coordinating the time and phase adjustments across an array of channels both receive and transmit time beam steering can be achieved. As is discussed below, the ability of the channels to apply time and phase adjustments to a received signal that can include comparatively high levels of phase noise and without synchronization across channels facilitates the scaling of spatial redistributors to large numbers of channels and large antenna array sizes/apertures.

In several embodiments, the spatial redistributors are implemented as relays that can redirect a received signal received from a first direction for transmission in a second direction. In certain embodiments, the relays spatially redistribute a single transmission from a transmitter to a receiver. In a number of embodiments, the relays are bi-directional and spatially redistribute transmissions from a first channel to a second channel and vice versa. In many embodiments, a relay can redistribute transmissions from multiple transmitters to one or more receivers. In many embodiments, the spatial redistributors are implemented as routers that can dynamically control the spatial redistribution of transmissions from one or more transmitters to one or more receivers. Spatial routers can utilize routing information, which can be provided in a sideband channel or in header data, to dynamically adjust the manner in which received signals are redirected. In various embodiments, the transmitters, receivers, and/or spatial redistributors are capable of movement. Accordingly, spatial redistributors in accordance with several embodiments of the invention can track the relative location of a transmitter and/or a receiver and dynamically adjust the spatial redistribution of a transmission accordingly.

Channels utilized to implement spatial redistributors can be implemented in a number of different ways in accordance with various embodiments of the invention. In several embodiments, channels apply time delays directly to a received RF signal. In many embodiments, channels perform frequency conversion and apply time and phase adjustments to an intermediate frequency (IF) signal or baseband signal. In a number of embodiments, time delays are applied in the analog domain. In certain embodiments, the received signal is digitized and time delays are applied in the digital domain. A group of embodiments utilizes what can be referred to as a hybrid analog/digital time delay units, which applies time delays to analog samples of a received signal. Hybrid analog/digital time delay units can achieve time delays with fine resolution and broad range. The aperture size of a spatial redistributor can be increased with increased range of time delay and fine resolution can determine the effectiveness with which the spatial redistributor can perform time delay beamforming.

While much of the discussion that follows highlights application of various embodiments of the invention in the context of RF and mm-wave communications, it should be appreciated that scalable, agile, and/or electronically-steering spatial redistributors in accordance with different embodiments of the invention can be utilized in a broad range of frequencies (for instance, audio frequencies, lower RF frequencies, or mm-wave and optical) and modalities (electromagnetic or acoustic, including audio).

Spatial redistributors and methods of redistributing signals in accordance with various embodiments of the invention are discussed further below.

Spatial Redistributors

Spatial redistributors in accordance with many embodiments of the invention include a number of channels, operating independently that can be arranged in an array to perform receive and/or transmit beamforming. Receive and/or transmit beamforming can be performed through each channel individually applying time and phase modifications to its received signal. As discussed in depth below, the time and phase modifications can be performed in separate processes or in a single process. Furthermore, beamforming across the array can be achieved with the individual channels operating with different time bases and without being phase locked to each other.

A spatial redistributor in accordance with an embodiment of the invention is conceptually illustrated in FIG. 1. In the illustrated embodiment, the communication system 100 includes a transmitter 102 that transmits a signal, which is redirected by a spatial redistributor 104 to a receiver 106.

In many embodiments, the spatial redistributor 104 is implemented as a distributed phase and data coherent receiver and transmit array. In several embodiments, there is no need for high speed data distribution and collection across the array. Instead of combining all of the signals received by the antenna elements in the receive array, the received signals from one or a subset of antenna elements are independently processed, time and phase-adjusted, then radiated locally by a single antenna element or a subset of elements in the array (which is possibly but not necessarily different to the receive subset).

The spatial redistributor 104 can receive signals from multiple directions and reproduce signals that either individually or in aggregate carry the information contained in the individual received signals. This information may be contained in various aspects of the incident and re-transmitted signals, including (but not limited) to amplitude, frequency, phase, and/or polarizations. The re-transmitted signals can be at the same or different frequencies, amplitudes, phases, and polarizations, and can contain the same information as one stream or an arbitrary combination of the information contained in multiple streams.

Spatial redistributors can take a variety of configurations including (but not limited) a spatial relay and/or a spatial router. Spatial relays involve configuration of a spatial redistributor as an intermediate node between a transmitter and a receiver similar to the configuration illustrated in FIG. 1. Spatial routers can receive, amplify, and re-route incoming beams to arbitrary directions allowing the dynamic establishment of communication between nodes. The data transmitted through the spatial router may use a header which specifies the direction of arrival of the wavefront, its intended destination, and/or other information related to the communication channel established through the spatial router. The direction of arrival and the intended destination can be specified in several ways including (but not limited to) geometric angles, location coordinates, and/or an identifier.

Spatial redistributors in accordance with various embodiments of the invention can be utilized in any of a variety of configurations. For example, a spatial redistributor may help overcome obstruction/attenuation from walls, corners, or path loss. In other embodiments, a spatial redistributor can be used to connect an area obstructed by local geography (e.g. mountains, valleys, distance, etc.) to a basestation. In this configuration, the spatial redistributor can effectively extend the area covered by a single basestation. This could be used to reduce the total number of basestations (e.g. cellular basestations) needed to serve an area. In yet further configurations, the spatial redistributor can be utilized to connect terrestrial users with a satellite. The relay could provide the large aperture/gain/power needed for a high bandwidth space link while user hardware only needs to communicate with the local relay. In yet additional configurations, a scalable relay is rapidly deployed to provide connections to users. For example, when a basestation fails the spatial redistributor can redirect signals from users to a different basestation which would otherwise have been inaccessible to them. Furthermore, spatial redistributors in accordance with many embodiments of the invention can be mounted to an aerial platform (aircraft, UAV, balloon, etc.) and relays signals to a basestation or communication hub while in flight. A spatial router network including a spaceborne spatial router could also be used to avoid the dense lossy atmosphere near the Earth's surface. As can readily be appreciated, the specific manner in which spatial redistributors in accordance with various embodiments of the invention can be configured is largely only limited by the requirements of specific applications.

A spatial redistributor in accordance with an embodiment of the invention is conceptually illustrated in FIG. 2. The spatial redistributor 200 is implemented using a number of channels 202 that largely operate independently and can be arranged in an array. The channels 202 individually receive, process, and retransmit the incoming wavefront and condition and redirect it to any desired direction. This eliminates the need for centralized combining of the received signals and the subsequent redistributing to the transmit elements. In addition, the channels 202 need not share a common reference oscillator signal between elements.

In order to perform beam steering, the channels 202 maintain phase and data coherence between channels. Channels in accordance with many embodiments of the invention are configured to adjust the phase and data timing of the received signal. While some embodiments may perform the phase adjustment and timing adjustment in separate steps, the channels 202 shown in FIG. 2 utilize a single delay setting in each channel that adjusts both phase and data timing.

In the illustrated embodiment, each channel 202 includes a receive antenna element 204 and a signal path that includes a time delay unit 206, which provides an output to at least one transmit antenna 208. As is discussed further below the delay setting of each time delay unit 206 can control the reception and transmission angles of the spatial redistributor 200. Each channel, which can be referred to as a branch, operates independently, with the relative delays of each branch determining the angles of incidence and retransmission of the receive and transmit beam pair. It can be shown that this decentralized approach maintains the benefits of the phased array coherent combining of signals, but the combining occurs in space in the transmit and receive beams. Also notably, the individual branches can operate with different time bases not phased locked to each other and not even at exactly the same frequency. These two qualities can significantly add to the versatility of spatial redistributors in accordance with various embodiments of the invention.

A spatial redistributor 200 can include any number of channels. In many embodiments, this number can be large, where each one of the channels 202 operates locally, without the need for high frequency data connection to other channels. This approach can provide significant advantages, by eliminating the need for high-speed data lines, and/or a centralized processing unit to which the data needs to be aggregated and from which the data needs to be distributed. In many embodiments, the ability to operate in a decentralized manner is one of the key enablers of the scalability and scale of the number of antenna elements that can be incorporated within a spatial redistributor, where the addition of extra channels does not require changes (either qualitatively or quantitatively) in the architecture of the array. In certain embodiments, the decentralized operation of the channels can also enable dynamic reconfiguration and reassignment of the array elements, and/or dynamically changing channel configurations to address the different needs of different applications.

While specific examples of spatial redistributors including (but not limited to) spatial relays and spatial routers are described above with reference to FIGS. 1 and 2, spatial redistributors in accordance with many embodiments of the invention can be configured in any of a variety of ways appropriate to the requirements of specific applications. Specific implementations and configurations of spatial redistributors and the time delay units utilized within spatial redistributors in accordance with various embodiments of the invention are discussed further below.

Time Delay Beamforming Arrays

Spatial redistributors in accordance with many embodiments of the invention are able to perform transmit and receive beamforming using time delay beamforming. In a number of embodiments, time delay beamforming is performed by receiving a signal at an array of multiple antenna elements. The antenna array can be a 1D array, a 2D array, a 3D array (i.e. not all elements are located on a plane) and/or an ad hoc array. In several embodiments, time and phase adjustments are applied to the received signals and the time and phase adjusted signals are transmitted using an array of multiple antenna elements. As with the receive array, the transmit array can be a 1D array, a 2D array, a 3D array and/or an ad hoc array. In several embodiments, the spatial redistributor can use a single array of antenna elements for both receive and transmit beamforming.

As is conceptually illustrated in FIG. 3A, each receive antenna element can provide a signal to a channel. The channel can include an RF chain including an analog front end (AFE), such as (but not limited to) a low noise amplifier (LNA). In several embodiments, the channel can directly apply timing and/or phase adjustments to the received RF signal. In many embodiments, the channel down converts the received signal to either an intermediate frequency (IF) or baseband and applies timing and/or phase adjustments to the signal prior to modulating the signal onto an RF carrier. In a number of embodiments, the channel utilizes the down conversion and up conversion to perform frequency conversion with respect to the received signal (i.e. the carrier frequencies of the received and transmitted signals are different).

As previously mentioned, the phase and time delays may be implemented separately or as part of the same processing step. Furthermore, the signal processing and time delay unit can be implemented to apply a time delay at the signal frequency (RF). A simplified circuit diagram of a spatial redistributor in which the signal processing and time delay unit can be implemented to apply a time delay at the signal frequency is shown in FIG. 3B. In many embodiments, the spatial redistributor preforms signal processing and time/phase adjustment at an intermediate frequency (IF). A simplified circuit diagram of a channel 300 that performs time/phase adjustment at an IF is provided in FIG. 3C. If the delay is implemented at an IF, the RF signal received by at least one antenna element 302 can be demodulated 304 with a local oscillator (LO) to produce the IF. After the delay 306, the frequency converted and processed signal can be modulated 308 onto a carrier frequency and amplified 310 for transmission by at least one transmit antenna element 312. This modulation can be accomplished with an additional mixer or another modulating circuit. Furthermore, the received signal can be mixed down to baseband (i.e. an IF of zero frequency), which can simplify the requirements of the circuits of the spatial redistributor.

Figure 3D:
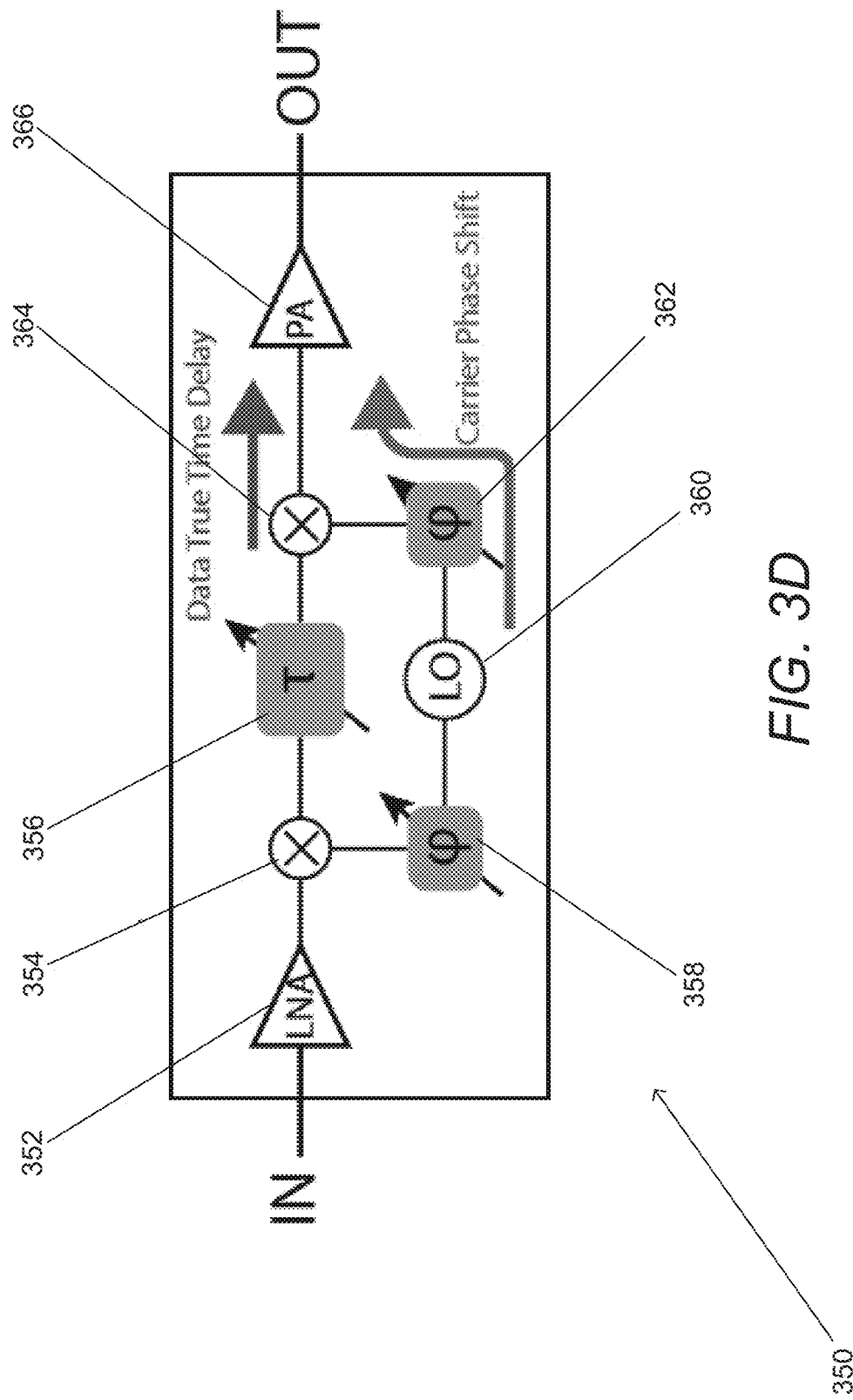
FIG. 3D illustrates the manner in which time and/or phase adjustments can be performed by a down converting channel in accordance with an embodiment of the invention.

The manner in which time and phase adjustments can be performed by a down converting channel in accordance with an embodiment of the invention is illustrated in FIG. 3D. The channel 350 includes an AFE incorporating an LNA 352 followed by a down-conversion mixer 354 that down converts a received modulated signal to baseband. Where the channel is implemented as an integrated circuit, the down-conversion mixer's LO 356 can be generated on chip. The LO signal passes through a phase rotator 358, such as (but not limited to) a vector sum phase rotator. In a number of embodiments, the phase rotator 358 can provide 360° phase control. Variable gain amplifiers (not shown) can be utilized to condition the baseband signal before it is provided to a time delay unit 360, which can introduce a time delay into the baseband signal. The time delayed baseband signal can then be up-converted using the LO signal phase rotated by a phase rotator 362. The phase control rotation of the LO signal utilized for up conversion is independent from the phase control rotation applied to the LO oscillator in order to perform down conversion of the received signal.

When a spatial redistributor utilizes channels that employ frequency conversion (i.e. the time delay is implemented at a frequency band other than the signal carrier), there can be several possible configurations of phase and frequency coherence between the elements. In several embodiments, all of the channels are phase and frequency locked to a shared reference signal. In a number of embodiments, the channels are phase and frequency locked to a local reference which may not be shared across the entire array. For example, antenna elements forming a sub-array may share a frequency reference but sub-arrays may have no shared frequency reference. In certain embodiments, channels within a spatial redistributor do not share a frequency reference. Instead, the channels may use their own low phase noise reference (such as a crystal oscillator) or they may use a free running oscillator reference.

Spatial redistributors in accordance with many embodiments of the invention can tolerate high phase noise oscillators (such as a free running voltage controlled oscillator), when the phase noise is sufficiently low frequency. If the received signal is down-converted in order to be delayed and up-converted with the same LO signal, then the low frequency phase noise (noise events with period much longer than the delay time), can be attenuated to an extent that they are effectively cancelled. This can allow spatial redistributors in accordance with many embodiments of the invention to use free running sources with high phase noise.

It is also not strictly necessary for channels within a scalable relay to have LO signals operating at the same or even similar frequencies. Provided the down-conversion and up-conversion steps in each channel results in effectively identical (or minimal) net frequency shift of the signal being redistributed, the output of each channel will still coherently combine. For example, a router may have one channel using a 28 GHz reference for down-conversion and up-conversion while another channel is using a 10 GHz reference signal for down-conversion and up-conversion. Provided the baseband/IF circuitry has the appropriate bandwidth, these channels may work together within the same spatial router.

As noted above, channels within spatial modulators can utilize a high phase noise reference to perform down-conversion and up-conversion. The ability of spatial redistributors in accordance with many embodiments of the invention to utilize channels including comparatively inexpensive free running quartz oscillators at mm-wave frequencies (e.g. without phase lock loops) facilitates their scalability by reducing the power requirements of each individual channel and the complexity and power requirements that would be involved in distributing a low phase noise reference to each channel. In certain embodiments, the spatial redistributor achieves coordination between the transceivers to perform receive and transmit beamforming by simply sharing a common (possibly low frequency) reference, and/or command and control information. As can readily be appreciated, the specific signals and/or information shared between individual channels within a spatial redistributor are largely dependent upon the requirements of a specific application.

Conventional phased array beamformers approximate time delay by phase shift, but this can be limited by a phenomenon known as squinting which refers to poor beam steering away from the central frequency. The effects of squinting can be particularly pronounced in broadband mm-wave communication systems.

Figure 4A:
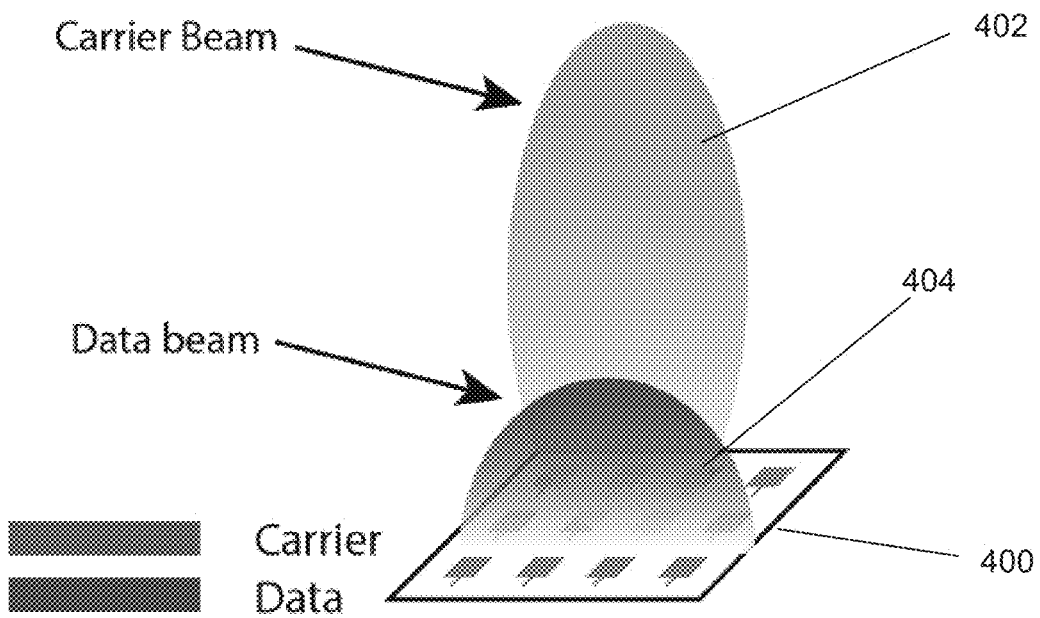
FIG. 4A conceptually illustrates dispersion experienced by broadband signals transmitted using a phased array antenna.
Figure 4B:
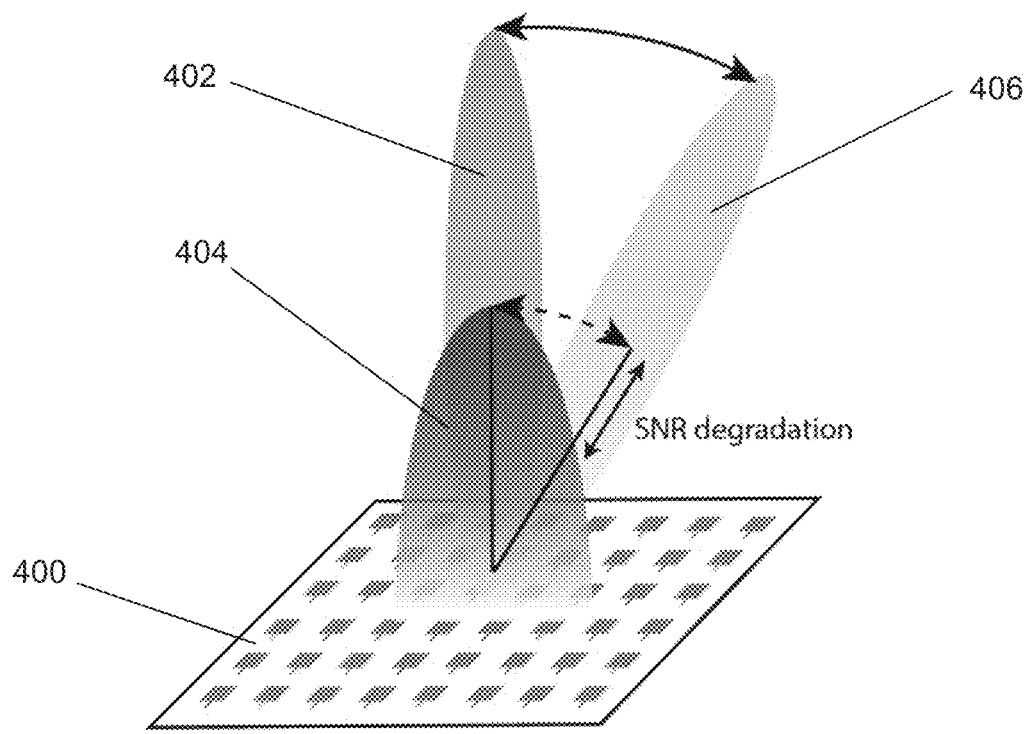
FIG. 4B illustrates attenuation that can occur due to squinting errors when a phased array attempts to perform beam steering of a wide bandwidth signal relative to an RF carrier.
Figure 5:
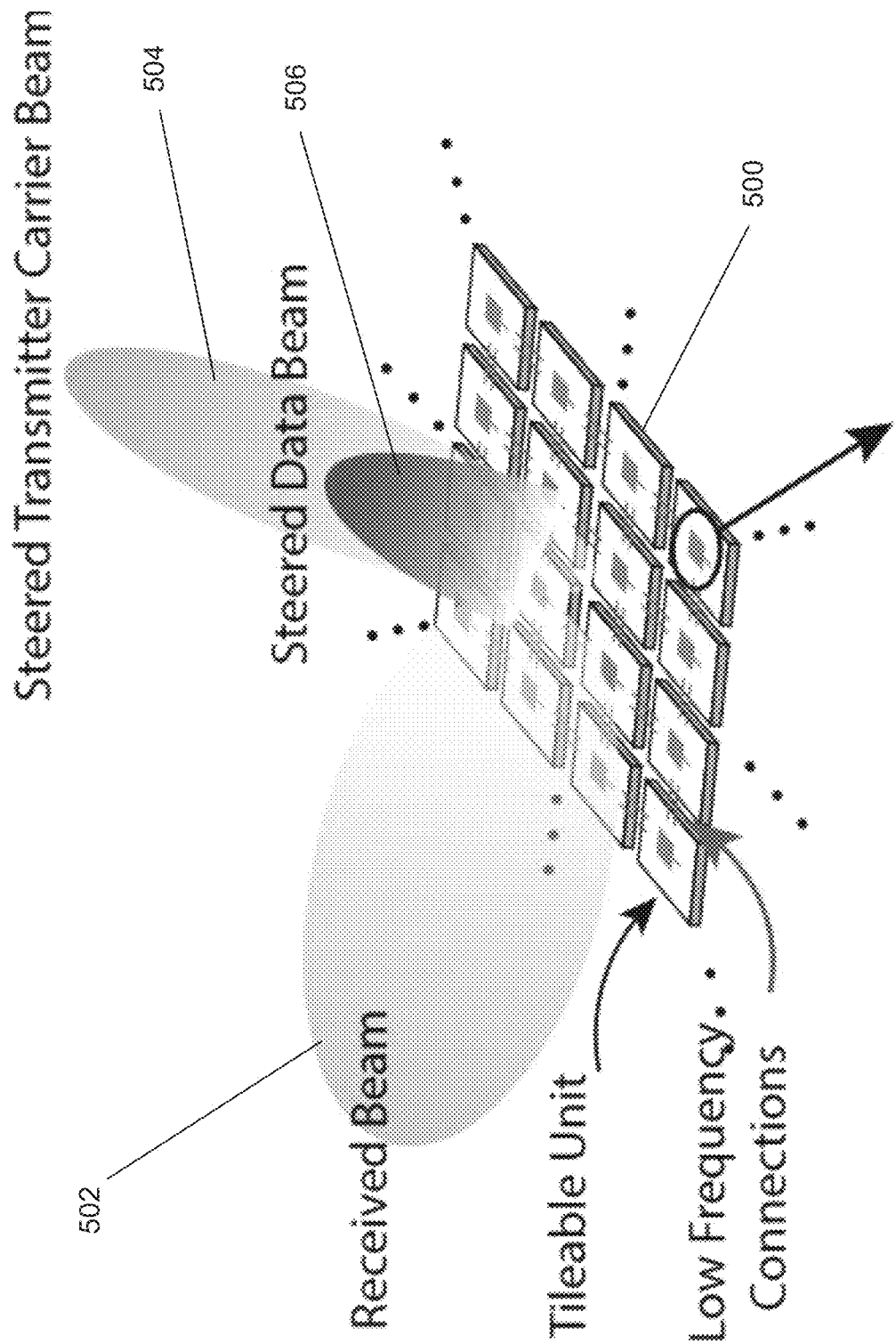
FIG. 5 illustrates use of time delay beamforming by a spatial redistributor in accordance with an embodiment of the invention to reduce squinting errors in wideband signals.

The impact of squinting and the benefits of utilizing time delay beamforming with wideband mm-wave signals can be readily appreciated by referring to FIGS. 4A, 4B and 5. FIG. 4A conceptually illustrates dispersion experienced by broadband signals transmitted using a phased array antenna 400. FIG. 4B further illustrates the attenuation that can occur due to squinting errors when a phased array 400 attempts to perform beam steering 406 of a wide bandwidth signal 404 relative to an RF carrier 402. As can be observed, the carrier is steered accurately. However, beam squinting errors for frequencies at increasing distances from the carrier frequency can result mis-direction of a wideband data signal 404 relative to the carrier on which it is modulated with resulting attenuation losses in the direction in which the beam is intended to be steered.

As can be appreciated with reference to FIG. 5, use of time delay beamforming by spatial redistributors 500 in accordance with various embodiments of the invention can significantly reduce and/or eliminate squinting errors in wideband signals. The spatial redistributor 500 shown in FIG. 5 is capable of performing receive beamforming 502 and transmit beamforming through application of time and phase modifications using a single antenna array. As noted above, use of time delay beamforming enables accurate beam steering at the carrier frequency 504 and with respect to the wideband modulated data signal 506. As a result, spatial redistributors that utilize time delay beamforming typically achieve greater signal-to-noise ratio (SNR) at a receiver than can be achieved through phase control alone. The specific manner in which both receive and transmit beamforming can be performed using a single array of antenna elements through application of time and/or phase modifications is discussed further below.

The delay setting in each channel controls the reception and transmission angles of spatial redistributors in accordance with many embodiments of the invention. The relationship between the reception and transmission angles and the delay setting in each element of an antenna array can be derived. Consider, for example, the one-dimensional exemplary N+1 element array 600 having nodes 602 at pitch d shown in FIG. 6. $\theta_{rx}$ and $\theta_{tx}$ are the receive and transmit wavefront angles of incidence. Note that, in general, $\theta_{rx} \neq \theta_{tx}$. The additional path length traveled by the wavefront to element n is nl. The lengths of the transmit and receive paths for the first element are:

$$l_{rx} = d \sin \theta_{rx}$$

$$l_{tx} = d \sin \theta_{tx}$$

The time delay for a signal to propagate this distance is:

$$t_{rx} = \frac{l_{rx}}{c} = \frac{d}{c}\sin\theta_{rx}$$

$$t_{tx} = \frac{l_{tx}}{c} = \frac{d}{c}\sin\theta_{tx}$$

If the element n is set to have a delay of $t_n = t_0 + \Delta t_n$ where $t_0$ is a (potentially adjustable) common time offset present in all elements. It can be chosen in a way to provide $t_n > 0$ for all n and the current operating, $\theta_{rx}$ and $\theta_{tx}$. The added time delay $\Delta t_n$, in element n can be chosen to define the relationship between the incident angle of the received wavefront and the launch angle of the transmitted signal. In a simple exemplary scenario, $\Delta t_n = n\Delta t$, where $\Delta t$ is the time offset between two adjacent elements.

To steer the beam, element n's signal should be delayed by $nt_{rx}$ relative to element 0. Therefore, the internal path delay at element n to achieve beam steering is:

$$-nt_{tx} = nt_{rx} + \Delta t_n$$

The negative sign of $nt_{tx}$ is due to the fact that element n should be advanced not retarded relative to element 0. Also note that $t_0$ is dropped since it is common to all elements and beam steering is primarily interested in relative delay steering. This expression can be simplified to determine the relationship between $\Delta t$, $\theta_{rx}$ and $\theta_{tx}$.

$$-nt_{tx} = -n\frac{d}{c}\sin\theta_{tx} = nt_{rx} + \Delta t_n = n\Delta t + n\frac{d}{c}\sin\theta_{rx}$$

$$-\sin\theta_{tx} = \frac{c}{d}\Delta t + \sin\theta_{rx}, \text{ or}$$

$$0 = \frac{c}{d}\Delta t + \sin\theta_{rx} + \sin\theta_{tx}$$

Figure 6:
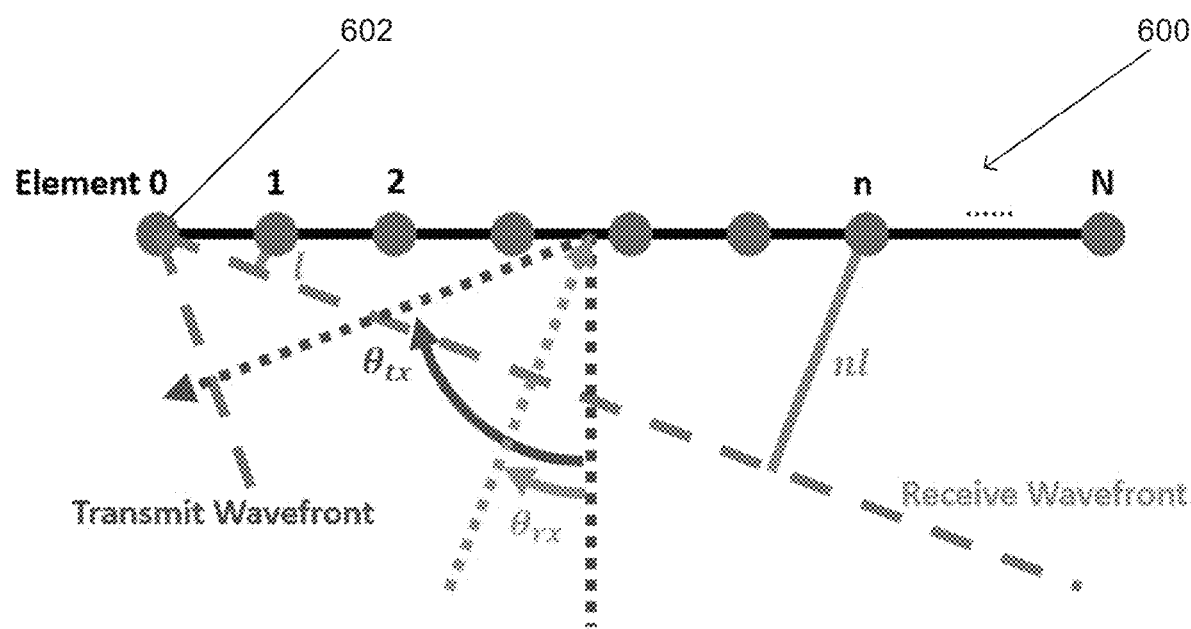
FIG. 6 illustrates a one-dimensional exemplary N+1 element array having nodes at pitch d in accordance with an embodiment of the invention.

The last equation above indicates that desired reception and transmission angles can be set for the array shown in FIG. 6 by selection of the internal delay of each channel (i.e. single-path channel through the spatial redistributor). Specifically, a time offset between adjacent elements $\Delta t$ exists that can enable the spatial redistributor to achieve receive and transmit beamforming for any combination of receive and transmit beam directions $\theta_{rx}$ and $\theta_{tx}$.

For a router element with control of its delay and phase, the phase and group delay of the element transfer function can be controlled, as demonstrated below. With these two degrees of freedom it is possible to arbitrary choose the phase of the transfer function at two different frequencies. This allows the phased array to independently steer full power beams at those two frequencies. These beams can provide separate communication channels through the same router. It is also possible to create more than two beams using the group delay and phase control capabilities demonstrated above. Essentially, this would create a programmable, frequency-scanning phased array. This multi-beam capability can be extended further by adding additional degrees of freedom to the transfer function phase response. This extension would allow independent beams at many frequencies and, in several embodiments, can be accomplished using programmable all-pass filters implemented at either RF or baseband frequencies.

While the above example is presented in the context of the uniformly spaced 1-D array illustrated in FIG. 6, similar processes can be utilized to determine the appropriate delays to apply within channels to achieve receive and/or transmit beamforming in a spatial redistributor having a 2-D and/or 3-D array of antenna elements. For example, many embodiments of the invention add an offset delay between the rows and/or columns of a multi-dimensional area. In several embodiments, spatial redistributors can utilize more sophisticated reception and transmission radiation patterns (multi-lobe, wider beam, etc.) by adjusted received signals by performing modifications including (but not limited to) non-uniform delay adjustments and/or amplitude control.

Figure 7A:
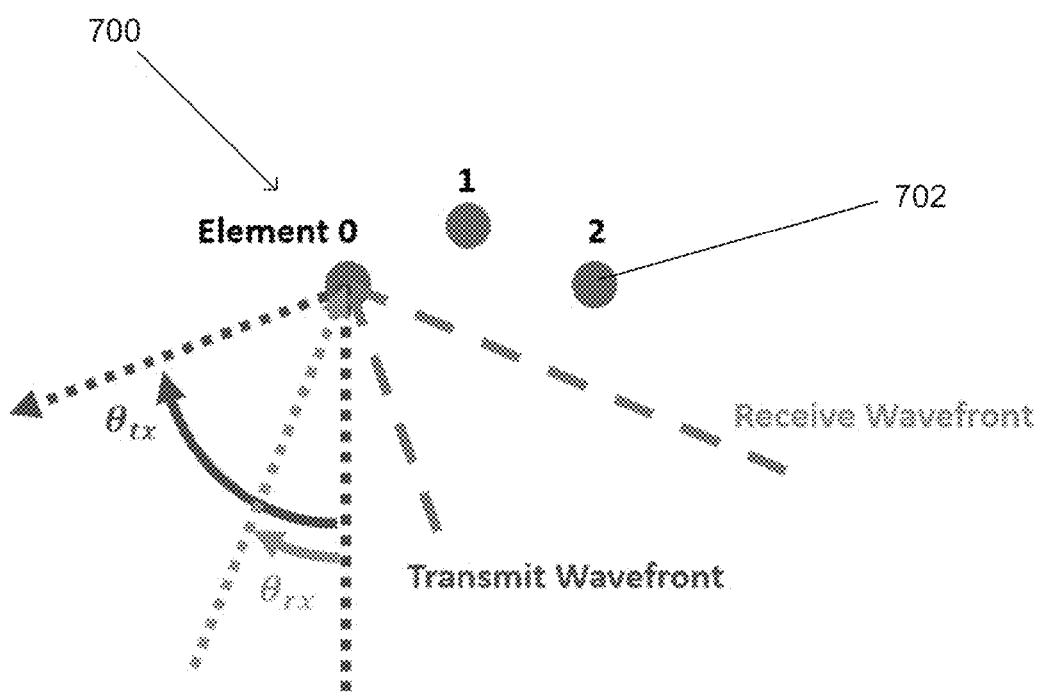
FIG. 7A illustrates a three-branch spatial redistributor in accordance with an embodiment of the invention.

In several embodiments, the location of antenna elements in a spatial redistributor can be used to add spatial selectivity to the beam pattern of the spatial redistributor. As noted above, for planar 1-d arrays similar to those shown in FIG. 6, a given time delay between adjacent elements can coherently redirect a signal regardless of its angle of incidence. In certain embodiments, additional selectivity can be achieved by locating antenna elements so that they are not on a single line. Consider the three-branch spatial redistributor 700 shown in FIG. 7A. Having non-collinear element dimensions adds a second degree of freedom into the expression utilized to determine the time delays that achieve coherence in a given transmit beam direction for a specific receive beam direction. In this way, the relative positions of the antenna elements 702 can be chosen to establish spatial selectivity for a router, reducing the coherence of signals arriving at the array from directions other than the desired reception angle. In addition, the relative positions of the transmit antenna elements can impact the transmit beam steering of the spatial redistributor. Furthermore, additional benefits can be obtained by utilizing an unequal ratio of receive antenna elements to transmit antenna elements (i.e. not a 1:1 ratio) in certain applications. As can be readily appreciated, the specific spacing of antenna elements will be largely dependent upon the requirements of a specific application.

Receive and Transmit beamforming are not the only factors that can influence the design of the spacing and position of antenna elements in a spatial redistributor. In many embodiments, it can be desirable to design a system with sufficient isolation between transmit and receive elements. This isolation can be achieved in a variety of ways, including but not limited to element position or orientation, element polarization, circulators or other non-reciprocal elements, multiple frequencies, and/or transmitted signal cancellation in the receiver. Beam-steering capabilities and the ability to form a high gain beam are intimately tied to radiator location. In a number of embodiments, the antenna elements of a spatial redistributor are arranged to meet the beam steering and area requirements of the larger system. FIGS. 6-7G show several possible 1D and 2D layouts for antenna elements in accordance with various embodiments of the invention. While these figures represent 1D and 2D arrays, these receiver and/or transmitter antenna layouts can easily be adapted to 3D arrays as appropriate to the requirements of specific applications in accordance with various embodiments of the invention.

Figures 7B, 7C, 7D, 7E:
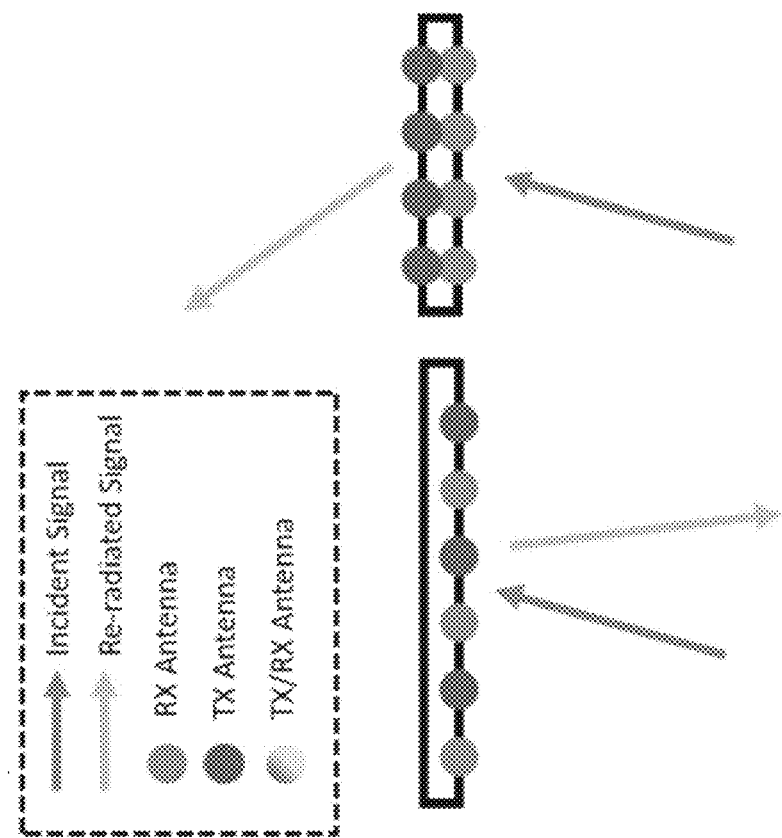
FIG. 7B shows an antenna array of a spatial redistributor incorporating alternating transmit and receive antennas.
FIG. 7C illustrates a spatial distributor that includes an antenna array including two arrays on opposite sides of a supporting structure.
FIG. 7D illustrates antenna elements that can be utilized as both a receive and a transmit antenna array.
FIG. 7E illustrates a spatial distributor that includes an antenna array including two arrays on different faces of a supporting structure.

FIG. 7B shows an antenna array of a spatial redistributor incorporating alternating transmit and receive antennas. With this topology, it can be difficult to achieve 2/2 pitch between the elements that form each of the receive and transmit arrays. The spatial distributor shown in FIG. 7C includes an antenna array that can avoid the challenge of spacing the receive and transmit arrays by placing the two arrays on opposite sides of a supporting structure. Alternatively, the same antenna elements can be utilized as both a receive and transmit antenna array as shown in FIG. 7D. Sharing antenna elements can be achieved using a multiport antenna with multiple polarizations (e.g. circular polarizations). Sharing of antenna elements can also be achieved by the use of a circulator in combination with a single port antenna element.

As can readily be appreciated from the above discussion, the antenna elements of the receive and transmit arrays can also be placed on different faces (see FIG. 7E) and at different angles of the same structure and/or different structures. In addition, the arrays are not limited to placement of antenna elements on a single line, but can be placed ad hoc on any surface. In several embodiments, the antenna elements are regularly spaced to form a 2D array as illustrated in FIG. 7F.

Figure 7F:
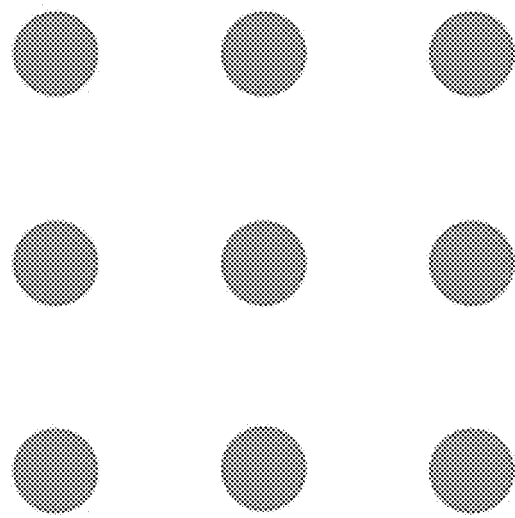
FIG. 7F illustrates antenna elements that are regularly spaced to form a 2D array that can be utilized in a spatial redistributor in accordance with an embodiment of the invention.
Figure 7G:
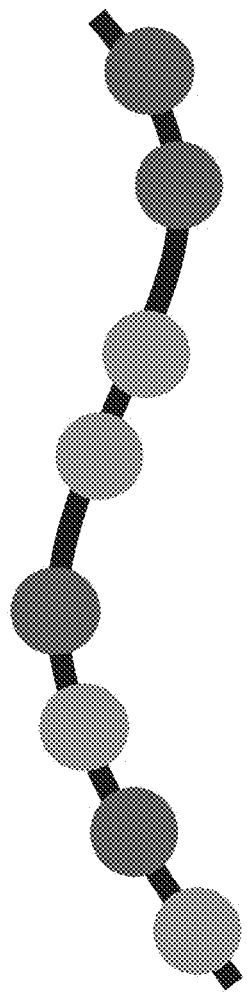
FIG. 7G illustrates an irregular antenna element layout.

The antenna array layouts illustrated in FIGS. 6-7F maintain uniform pitch between elements on flat surfaces, however, a spatial redistributor can be built on bent, flexible, and/or conformal surfaces with non-uniform element pitch and/or order. An exemplary, irregular antenna element layout is shown in FIG. 7G. While an irregular layout may cause routing difficulties or additional lobes in the beam pattern, spatial redistributors that utilize antenna arrays having irregular layouts are still able to perform their functions and may offer other system-level advantages.

While specific antenna array configurations for spatial redistributors are described above with reference to FIGS. 6-7G, antenna elements of a spatial redistributor can be placed in any of a variety of configurations as appropriate to the requirements of specific applications. The manner in which spatial redistributors can be configured as spatial relays and/or spatial routers using receive and transmit time delay beamforming in accordance with various embodiments of the invention is discussed further below.

Bidirectional Spatial Relays and Spatial Routers

Figure 8:
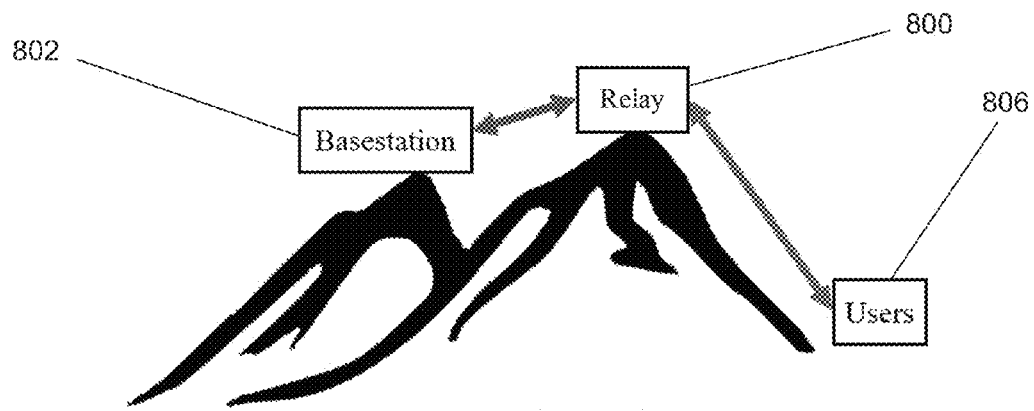
FIG. 8 conceptually illustrates use of a spatial relay to spatially redirect a transmission from a basestation to a user.

Spatial relays are spatial redistributors that are configured to route received signals in a predetermined manner and can be particularly useful for redirecting a transmission around obstacles. Use of a spatial relay 800 to spatially redirect a transmission from a basestation 802 to a user 804 is conceptually illustrated in FIG. 8. In a number of embodiments, spatial distributors are bidirectional (meaning the ability to transmit and receive in both directions, which allows full duplex communication between a transceiver pair).

Figure 9:
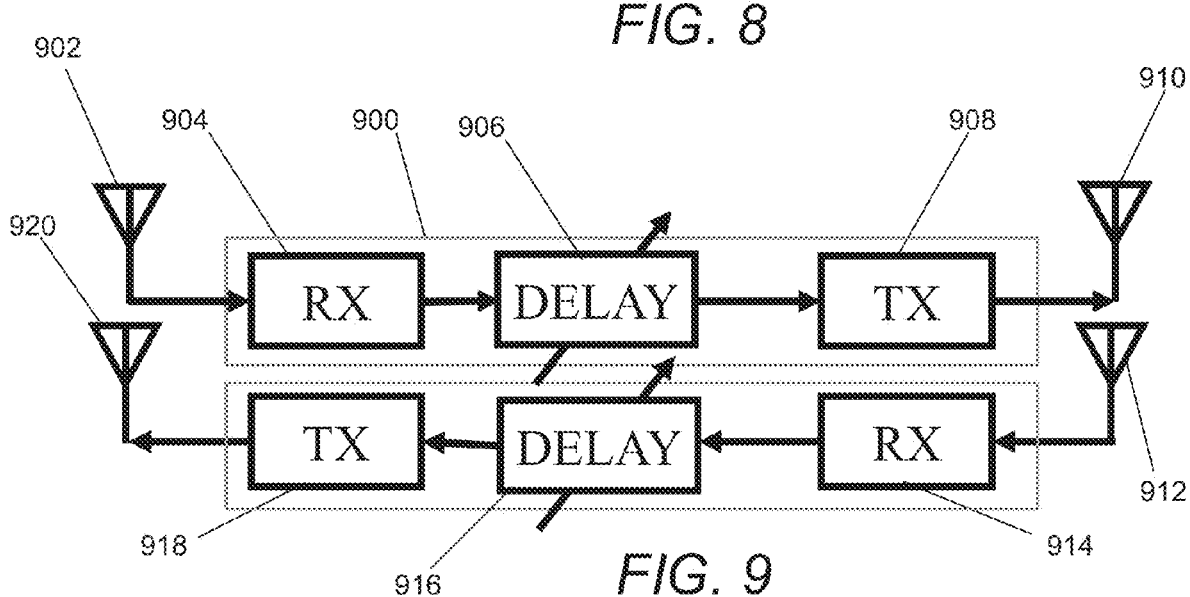
FIG. 9 conceptually illustrates use of pairs of channels to provide bidirectional capability.

Bidirectional capability can be achieved by using pairs of separate channels (one for each direction of communication) to construct receive and transmit antenna arrays as conceptually illustrated in FIG. 9. In the illustrated embodiment, a bidirectional channel pair 900 is shown that can be utilized within an array of bidirectional receivers to implement a spatial redistributor. The bidirectional channel pair 900 has a first channel including a receive antenna 902, a receiver AFE 904, a time/phase adjustment unit 906, a transmit power amplifier 908 and a transmit antenna element 910 and a second channel that also includes a receive antenna 912, a receiver AFE 914, a time/phase adjustment unit 916, a transmit power amplifier 918 and a transmit antenna element 920. The two channels can largely operate independently and the combined operation of multiple bidirectional channel pairs 900 can result in receive beamforming in at least a first direction and a second direction and transmit beamforming of at least a third direction and a fourth direction.

Figure 10:
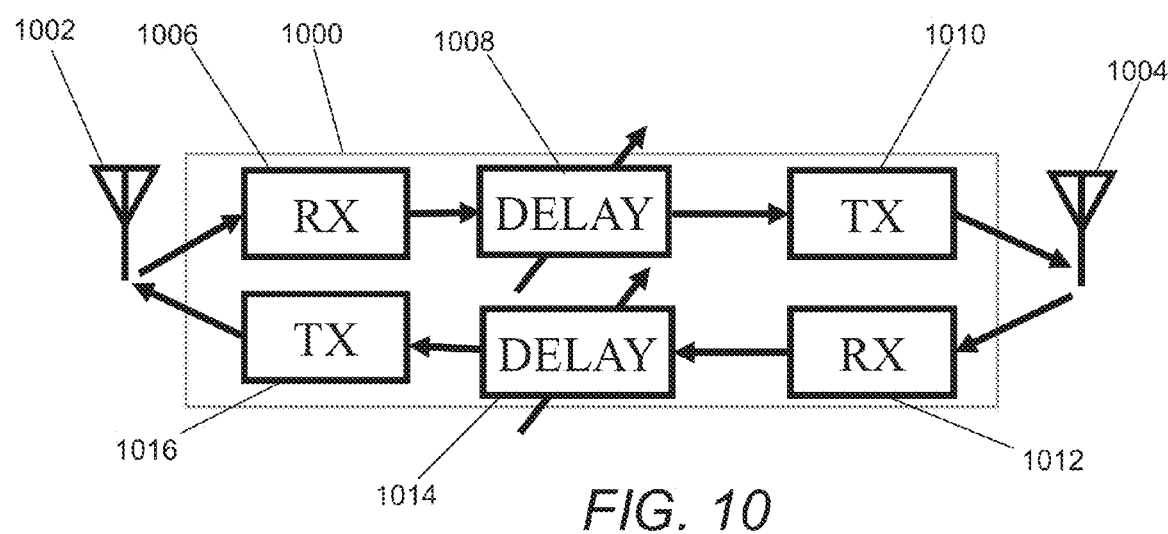
FIG. 10 illustrates use of antenna elements that act as a receive array antenna element in a first channel and a transmit array antenna element in a second channel to provide bidirectional capabilities within a spatial redistributor in accordance with an embodiment of the invention.

A bidirectional channel pair can also be constructed using antenna elements that act as a receive array antenna element in a first channel and a transmit array antenna element in a second channel as illustrated in FIG. 10. In the illustrated embodiment a first channel is formed by the bidirectional channel pair using a first antenna element as a receive antenna 1002 and a second antenna element 1004 as a transmit antenna element. The first channel includes a receiver AFE 1006, a time/phase adjustment unit 1008, and a transmit power amplifier 1010. A second channel can be formed by the bidirectional channel pair using the second antenna element as a receive antenna 1004 and the first antenna element 1002 as a transmit antenna element. The second channel also includes a receiver AFE 1012, a time/phase adjustment unit 1014, and a transmit power amplifier 1016. In several embodiments, the first 1002 and second 1004 antenna elements can be multi-port antenna elements that transmit and receive using different polarizations. In several embodiments, the first 1002 and second 1004 antenna elements can also be implemented as single port antenna elements in combination with circulators.

In many embodiments, a single time-multiplexed scalable router is utilized to achieve bidirectional communication, with alternating time slots allocated for each direction of communication. Bidirectional capability can also be achieved using additional circuitry within a channel. One such embodiment uses directional circuit elements (for example circulators) to achieve bidirectionality. Another embodiment uses frequency multiplexing to accomplish bidirectionality, with different frequencies being used for each direction of communication. As can readily be appreciated, the specific mechanism that is utilized within a spatial redistributor to achieve bidirectional transmission is largely dependent upon the requirements of a specific application. In addition, the scalability of spatial redistributors in accordance with many embodiments of the invention means that arrays of bidirectional channel pairs can be constructed using multiple different types of bidirectional channel pairs as appropriate to the requirements of specific applications in accordance with various embodiments of the invention.

While various configurations of bidirectional channel pairs that can be utilized to implement spatial redistributors are described above with reference to FIGS. 9 and 10, bidirectional communication can be achieved in communication systems that utilize spatial distributors using any of a variety of techniques and transceiver designs as appropriate to the requirements of specific applications. Furthermore, use of bidirectional channel pairs and/or bidirectional communication is not limited to spatial relays. Communication systems in accordance with many embodiments of the invention perform bidirectional communication using bidirectional routers, which may also be constructed using bidirectional channel pairs in accordance with various embodiments of the invention. Spatial router configurations that can be utilized in a variety of applications in accordance with various embodiments of the invention are discussed further below.

Spatial Router Configurations

Spatial redistributors can be utilized as spatial routers in a variety of applications and systems in accordance with many embodiments of the invention. In several embodiments, the spatial router is able to dynamically change the manner in which received signals are directed by adjusting the time and phase adjustments applied by the channels within the spatial router. In applications including (but not limited to) broadcasting applications, spatial routers can be unidirectional. In other applications, spatial routers can utilize bidirectional channel pairs in the manner described above to provide bidirectional signal redistribution.

A spatial router may use a variety of techniques to determine the desired direction of reception and transmission for a given signal. In certain embodiments, the spatial router obtains routing information via a sideband channel. In various embodiments, the spatial router receives routing information within a transmitted data stream. For example, direction of arrival, direction of departure, duration, and/or other information can be encoded in header data within a transmitted data stream received by a spatial router. The spatial router can interpret this header then establishes the correct delay settings to route the signal and/or packet of data to the correct direction. The direction and/or other information can also be encoded in the signal transmitted through the router but in an orthogonal waveform to the carrier. Several embodiments include direction information and/or packet data encoded in amplitude/phase, phase/amplitude, two different frequency bands, as well as other aspects of the received signal. It is also possible to use algorithmic optimization to find the delay setting for each element that provides the best channel between a transmitter and a receiver. This could use additional communication between the receiver and the router. A spatial router embodiment may also switch between different routing configurations on a predetermined pattern rather than dynamically determining where signals should be routed. Accordingly, the specific manner in which a spatial router in accordance with various embodiments of the invention determines the manner in which to redirect transmitted signals is largely dependent upon the requirements of specific applications. Channels that are capable of obtaining routing information from a received signal and dynamically reconfiguring based upon the obtained routing information are discussed further below.

Figure 11:
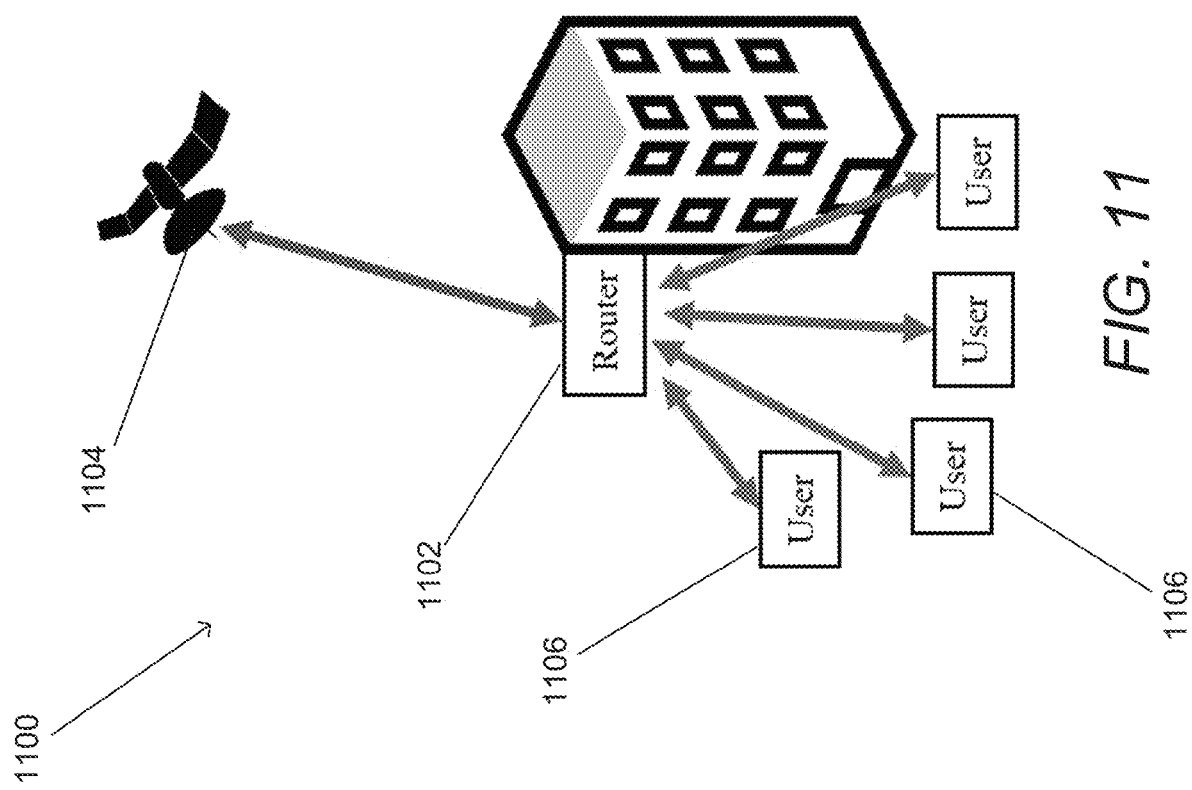
FIG. 11 illustrates a communication system employing a spatial router in a river delta configuration.

A number of applications that incorporate spatial routers can be categorized as incorporating "river delta" configurations. A communication system employing a spatial router in a typical river delta configuration is conceptually illustrated in FIG. 11. The communication system 1100 can use the spatial router 1102 to redirect transmissions between a common node 1104 (shown as, but not limited to, a satellite) and many users 1106 that the common node serves. As noted above, the spatial router can enable bidirectional communication between the common node 1104 and the users 1106.

Figure 12:
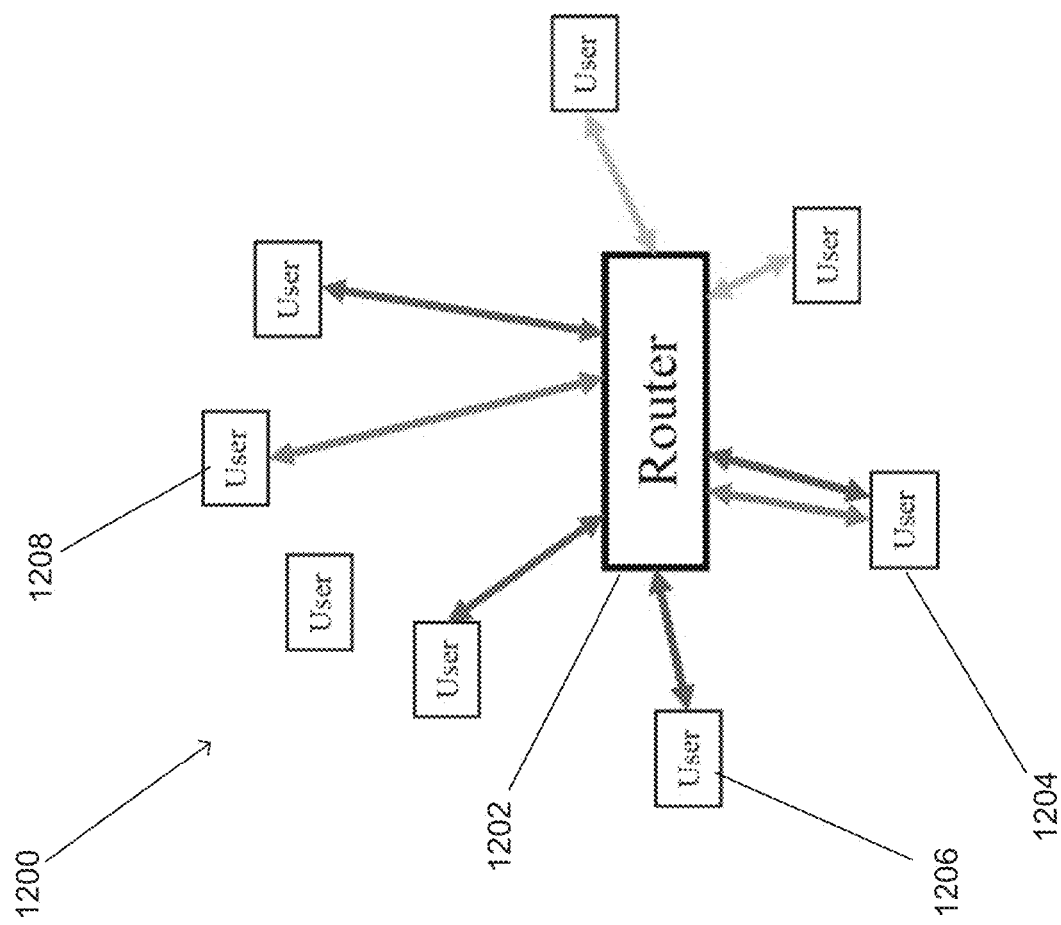
FIG. 12 conceptually illustrates a local wireless network where the spatial router guides transmitted data from a transmitter to the receiver of one or more intended targets in accordance with an embodiment of the invention.

Another set of applications can be more aptly described as employing "true hub" configurations. In these configurations, a spatial router is often switching between many different users, serving multiple users in both directions. One such system 1200 is a local wireless network where the spatial router 1202 guides transmitted data from a transmitter 1204 to the receiver of one or more intended targets 1206, 1208 as conceptually illustrated in FIG. 12.

While "river delta" and "true hub" descriptors encompass several possible use cases, a communication system can reconfigure one or more spatial routers to switch between these states or operate in other states. Furthermore, while the spatial routers described above with respect to FIGS. 11 and 12 are static. Spatial routers in accordance with many embodiments of the invention can be mobile. In addition, the spatial routers in accordance with several embodiments of the invention can redistribute transmissions from transmitters that may be moving to receivers that may also be moving. In this way it is important to appreciate that the ability of a spatial redistributors to perform dynamic receive and transmit beamforming can enable the use of spatial redistributors, including (but not limited to) spatial relays and spatial routers, in circumstances in which one or more of a transmitter, a spatial redistributor, and a receiver are mobile and/or in motion. Furthermore, spatial redistributors can be implemented in a distributed fashion in which multiple channels and/or arrays of channels mounted in different locations cooperate. Accordingly, spatial routers and spatial redistributors in accordance with various embodiments of the invention should be understood as not limited to any specific configuration.

Distributed Spatial Redistributors

As noted above, spatial redistributors in accordance with various embodiments of the invention can be implemented using multiple channels that do not have a shared frequency reference. Channels that do not have a shared frequency reference can be well suited for implementation of a spatial redistributor that is physically distributed in addition to electronically distributed. If a shared reference is still desired for a physically distributed system, a wireless reference may be used. A physically distributed router may have little or no mechanical connection elements but is still capable of coherent signal combining. Physically distributed spatial redistributors can be utilized in applications including (but are not limited to): as a spatial redistributor with elements distributed across buildings/rooms, a spatial redistributor with elements distributed across several moving and/or static objects such as (but not limited to) boats, drones, aircraft, satellites, cars, and buildings; and/or a spatial redistributor with elements distributed among personal electronics such as cell phones. As can readily be appreciated, the manner in which physically distributed channels can cooperate to form a spatial redistributor is largely only limited by the requirements of specific applications.

Figure 13:
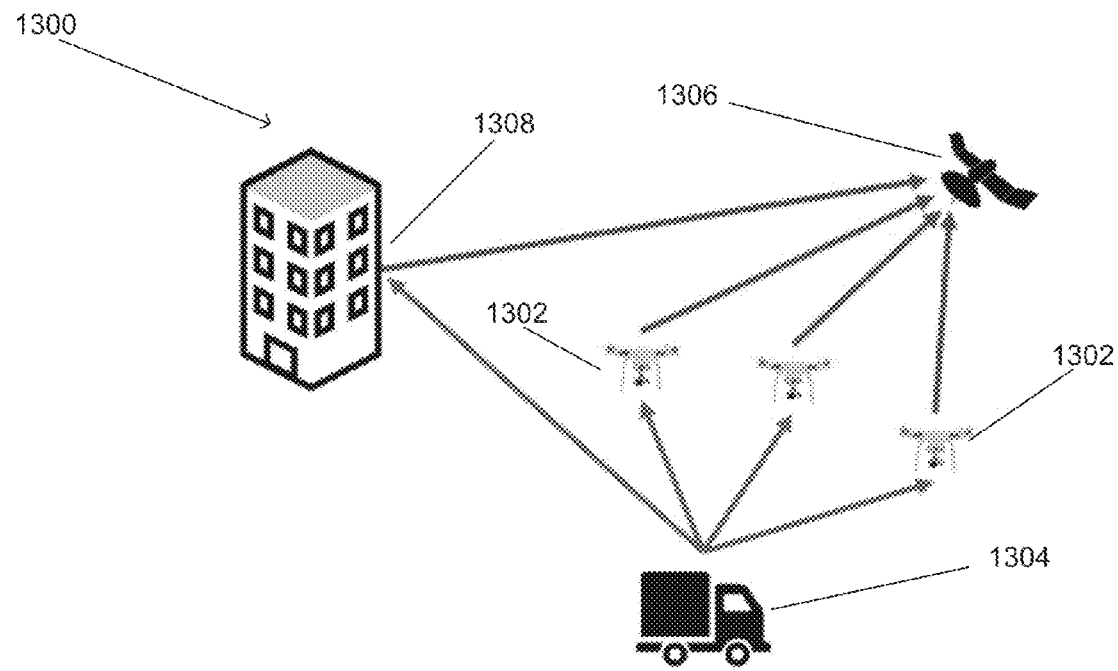
FIG. 13 illustrates the manner in which multiple distributed channels can coordinate to form a distributed spatial redistributor in accordance with an embodiment of the invention.

The manner in which multiple distributed channels can coordinate to form a distributed spatial redistributor in accordance with an embodiment of the invention is conceptually illustrated in FIG. 13. The communication system 1300 includes a spatial redistributor that is formed by a number of channels 1302. In the illustrated embodiment, the channels are mounted to moving drones. As can readily be appreciated the one or more channels mounted to each drone collectively form an array of channels. The array of channels can cooperate to collectively perform receive beamforming between a transmitter 1304 and a receiver 1306. In several embodiments, the channels are coordinated by performing a process that optimizes a cost function (e.g. maximum SNR/maximum strength/minimum BER, etc.) at the receiver by modifying the time and/phase adjustments applied by each channel. In a number of embodiments, the relative distances between the channel and the receiver can be measured (e.g. using time of flight sensors, multiview stereo cameras, radar, GPS measurements, etc.) and the measurements used to calculate time and/or phase adjustments to apply in each channel or a set of time and/or phase adjustment combinations to try using an optimization process similar to the process described above. In the illustrated embodiment, reflections 1308 of the transmitted signal are also considered. In several embodiments, the time delays introduced by the channels 1302 are determined based upon one or more reflected signals in the environment. In this way, the spatial redistributor can achieve additional SNR gains at the receiver by generating a wavefront that is coherent with dominant reflections in the direction of the receiver.

Figure 14:
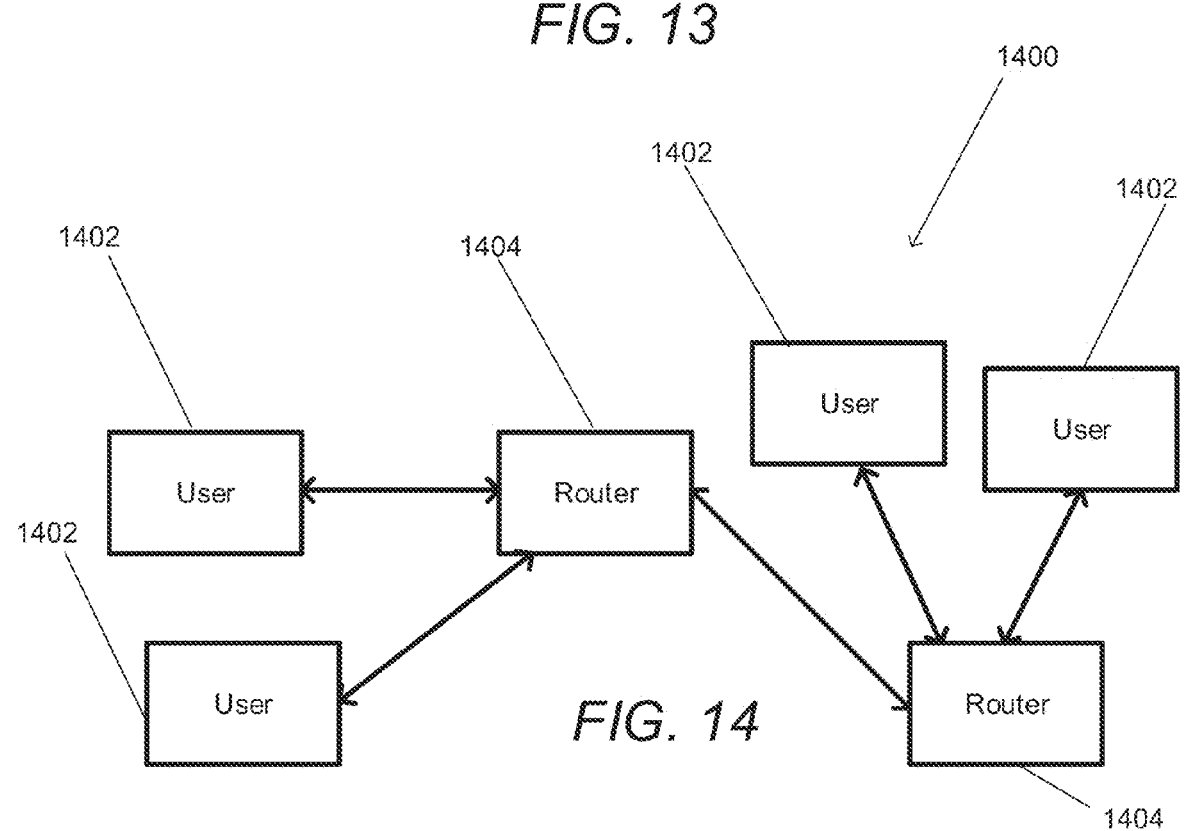
FIG. 14 illustrates a communication system in which users communicate via a series of routers that are capable of redirecting signals transmitted to another user to another a router and then eventually on to the receiver of the intended recipient of the signal in accordance with an embodiment of the invention.

In addition to multiple distributed channels being able to cooperate to form a spatial redistributor, communication systems in accordance with many embodiments of the invention can also employ multiple spatial redistributors to direct a signal from a transmitter to a receiver. A communication system in which users 1402 communicate via a series of routers 1404 that are capable of redirecting signals transmitted to another user to another a router and then eventually onto the receiver of the intended recipient of the signal is conceptually illustrated in FIG. 14. As can readily be illustrated FIG. 14 illustrates the broader concept of using a series of spatial redistributors to enable transmitters to direct signals to receivers, which are otherwise unable to communicate via a direct line of site (or other) transmission.

Time Delay Beamforming Channels

Figure 15:
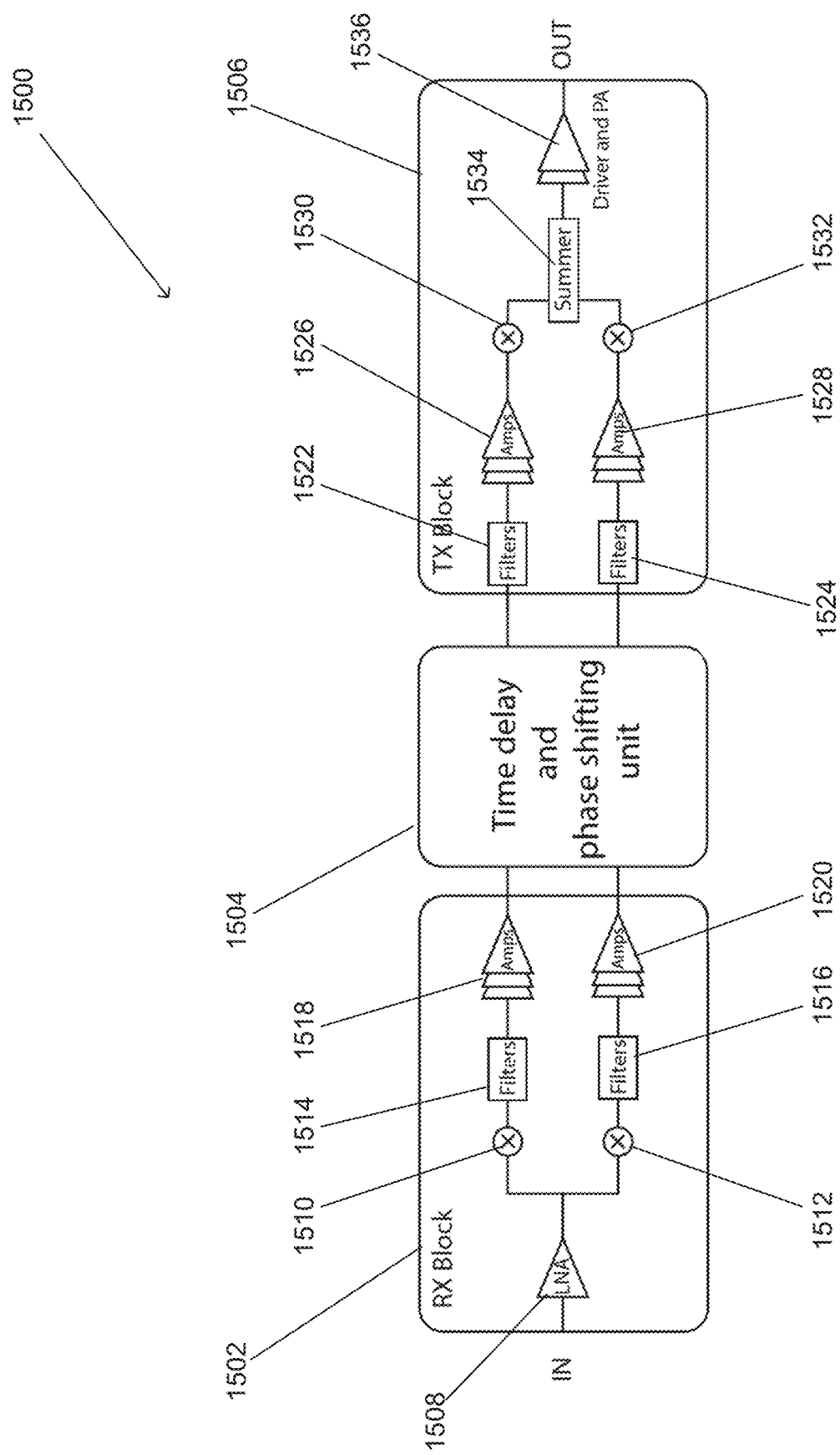
FIG. 15 shows a generalized channel architecture in accordance with an embodiment of the invention.

Referring again to FIGS. 3C and 3D, channels that can be utilized in spatial redistributors in accordance with various embodiments of the invention can utilize frequency conversion to apply time and frequency manipulations to a received signal. The following section discusses the specific manner in which time delay and phase adjustment units of a channel in accordance with various embodiments of the invention can be implemented. The various time delay and phase adjustment units are discussed with reference to a generalized channel architecture shown in FIG. 15.

The channel 1500 is capable of performing time and phase adjustments with respect to a received signal that includes data modulated onto in-phase and quadrature components of the signal (I/Q modulated data). The channel includes a receiver block 1502, which is capable of receiving a signal from one or more antenna elements. The receiver block 1502 provides I and Q output signals to a time delay and phase adjustment unit 1504, which can be implemented in accordance with any of a variety of embodiments including (but not limited to) those discussed below with reference to FIGS. 16-19. The time delay and phase adjustment unit 1504 provides time delayed and phase shifted outputs to a transmitter block 1506.

The receiver block 1502 is capable of receiving a signal from at least one antenna element that includes an I/Q modulated data signal. In the illustrated embodiment, the received signal is amplified by an LNA (1508). The in-phase and quadrature components can be separated using mixers 1510, 1512 to provide separate in phase and quadrature signals that are then filtered 1514, 1516, and amplified 1518, 1520. The outputs can then be provided to the time delay and phase adjustment unit 1504, various possible implementations of which are discussed further below.

The transmitter block 1506 receives in-phase and quadrature signals for transmission. The signals can be filtered 1522, 1524 and amplified 1526, 1528 prior to being I/Q modulated using mixers 1530, 1532 and a summer 1534. The modulated signal can then be amplified by a power amplifier 1536 and provided to at least one antenna element for transmission. The power amplifier can be implemented in any of a variety of different configurations including (but not limited to) a linear, switching, digital and/or polar power amplifier. In some embodiments, the data may be regenerated within each channel. In a number of embodiments, a switching power amplifier can be used without significant distortion. In certain embodiments, a polar PA is used to modulate the regenerated phase and amplitude data onto the carrier separately.

The general architecture of the channel discussed above with reference to FIG. 15 provides context for a variety of different potential ways in which to implement time delay and phase adjustment units in accordance with various embodiments of the invention. As can readily be appreciated, the specific manner in which a time delay and phase adjustment unit is implemented is largely dependent upon the requirements of a specific application. The time and phase adjustments applied by a time delay and phase adjustment unit can be employed in the analog domain and/or the digital domain. In many embodiments, the channel is employed in a router and the received signal includes data that provides routing information (e.g. header information). Accordingly, the channel digitizes the received signal in order to extract routing information, which then can be utilized in the configuration of the time delay and phase adjustment unit to apply appropriate adjustments to the received signal to perform beam steering.

Figure 16:
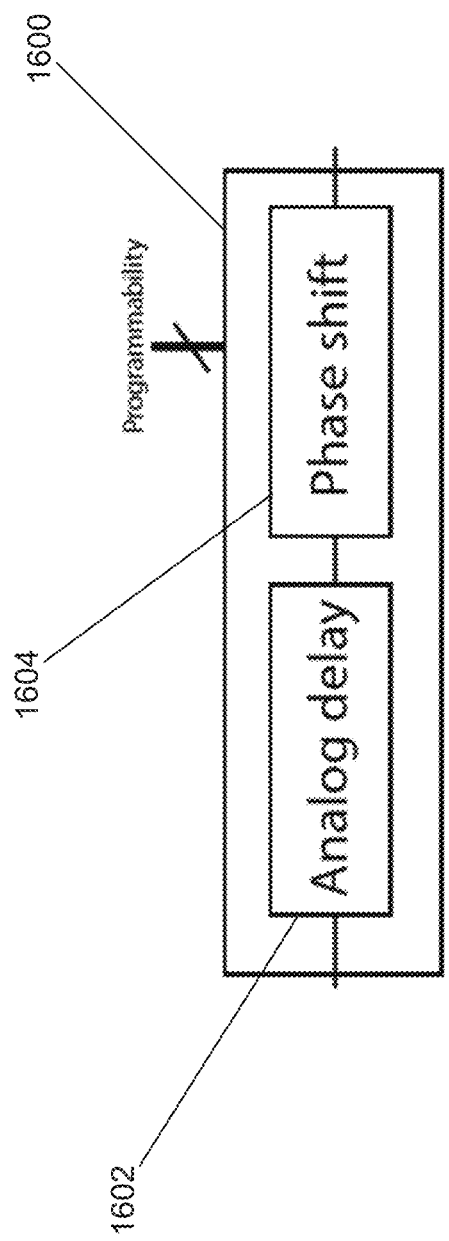
FIG. 16 illustrates a time delay and phase adjustment unit that performs time and phase adjustment in the analog domain in accordance with an embodiment of the invention.

A time delay and phase adjustment unit that performs time and phase adjustment in the analog domain is illustrated in FIG. 16. The time delay and phase adjustment unit 1600 receives an analog signal (e.g. an in-phase or quadrature signal) and utilizes an analog delay circuit 1602 to apply a time delay to the received signal and a phase shifter 1606 to apply a phase shift to the time delayed analog signal. The output can then be provided to a transmitter block to up-convert the signal for transmission. Analog delay can be implemented in a variety of ways including (but not limited to) transmission lines, optical delay lines, or phase delay only instead of a true time delay. Adjustable, analog, true time delay can present implementation challenges in certain RF circuit implementations, e.g., in integrated circuits. Transmission lines and switches can create adjustable delays but can require large area, on or off chip. Optical delay lines can be implemented more readily but typically require RF to optical and optical to RF conversion. Another analog delay option is to only use a phase delay instead of a true time delay. While phase delay is easy to implement, dispersion will occur for large arrays or high bandwidth signals. As can readily be appreciated, the circuits that apply the time delay and/or phase shift to the received analog signal can be controllable using digital command signals. Furthermore, any of a variety of time delay and phase shift circuits can be utilized to implement an analog time delay and phase adjustment unit as appropriate to the requirements of a specific application in accordance with various embodiments of the invention.

Figure 17:
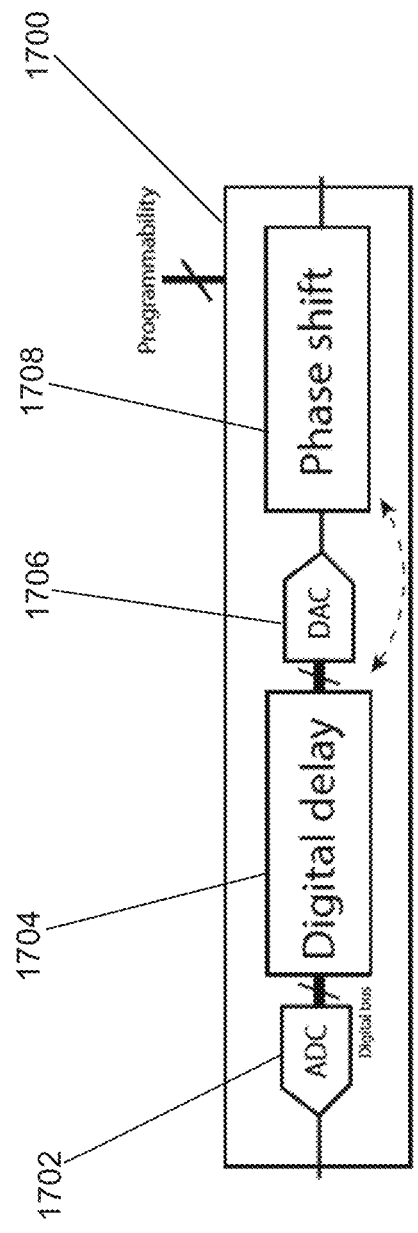
FIG. 17 illustrates a time delay and phase adjustment unit that applies a time delay to a received signal in the digital domain and a phase shift in the analog domain in accordance with an embodiment of the invention.
Figure 18:
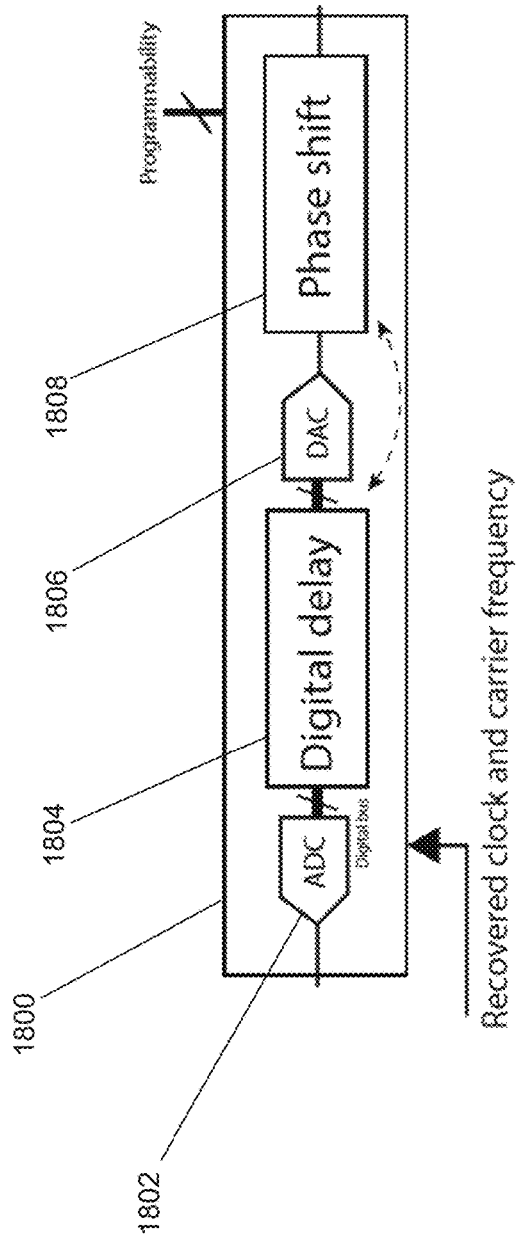
FIG. 18 illustrates a time delay and phase adjustment unit that performs digital data recovery in accordance with an embodiment of the invention.

A time delay and phase adjustment unit that applies a time delay to a received signal in the digital domain and a phase shift in the analog domain in accordance with an embodiment of the invention is illustrated in FIG. 17. The time delay and phase adjustment unit 1700 includes an analog-to-digital converter (ADC) 1702 that is utilized to digitize a received signal. The digitized samples from the received signal can then be provided to a digital delay circuit 1704. In many embodiments, the digital delay 1704 can be implemented as an adjustable series of buffers and/or flip flops. Switching additional flip flops in and out can create a large delay range using small area in an integrated circuit. The digitizer can be multi-bit ADC or a single bit quantizer. In some embodiments, a single bit quantizer with sufficient sample rate and filtering can reduce circuit complexity without sacrificing the ability to fully reconstructed the signal. In other embodiments, the digital delay 1704 can be implemented using any of a variety of digital circuits appropriate to the requirements of a given application. The output of the digital delay circuit 1704 can be provided to a digital-to-analog converter 1706 to convert the time delayed signal to the analog domain and a phase shifter 1708 utilized to phase shift the time delayed analog signal in a similar manner as described above with reference to FIG. 16.

By transforming a received signal into the digital domain, the potential exists for the time delay and phase adjustment unit to perform data recovery to extract routing data (e.g. routing data from a header) from the digitized signal. A time delay and phase adjustment unit that performs digital data recovery in accordance with an embodiment of the invention is illustrated with FIG. 18. Similarly to the time delay and phase adjustment unit 1700 shown in FIG. 17, the time delay and phase adjustment unit 1800 includes an analog-to-digital converter (ADC) 1802 that is utilized to digitize a received signal. The digitized samples from the received signal can then be provided to a digital delay circuit 1804 and then the digital delay circuit 1804 is provided to a digital-to-analog converter 1806, which converts the time delayed signal to the analog domain and a phase shifter 1808 applies a phase shift the time delayed analog signal. The time delay and phase adjustment unit 1800 differs from the time delay and phase adjustment unit 1700 shown in FIG. 17 in that the time delay and phase adjustment unit 1800 receives a recovered clock signal and carrier frequency. These signals can be utilized by the time delay and phase adjustment unit 1800 to perform demapping and decoding of samples of the received signal to obtain a bitstream of data. As noted above, the obtained bitstream can include routing information that can be utilized by control circuitry within the channel to program the time delay and phase shift introduced by the time delay and phase adjustment unit 1800. As can readily be appreciated, the specific manner in which the time delay and phase adjustment unit 1800 decodes data from the received signal is largely dependent upon the requirements of a specific application.

Figure 19:
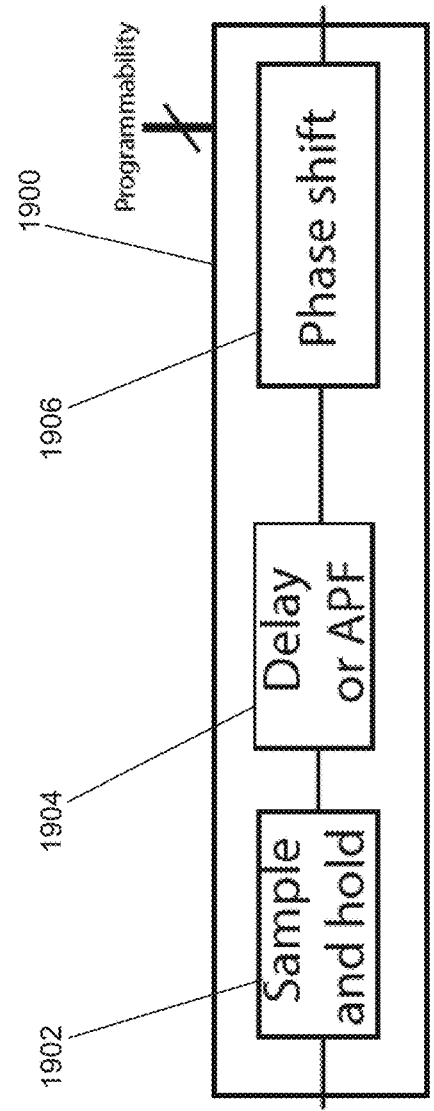
FIG. 19 illustrates a time delay and phase adjustment unit that utilizes sample and hold circuitry to apply time delays to an analog signal in accordance with an embodiment of the invention.

A fourth implementation of a time delay and phase adjustment unit in accordance with an embodiment of the invention is illustrated in FIG. 19. The time delay and phase adjustment unit 1900 utilizes a sample and hold circuit 1902 to manipulate the time delay of the received signal. As is discussed further below, the use of sample and hold circuits 1902 enables a time delay 1904 to be applied to analog samples of the received analog signal without converting the analog signal into the digital domain. The time delayed sampled signal can be converted to a continuous time analog signal using an appropriate filter and a phase shift applied to the analog signal using a phase shifter 1906. As is discussed further below, the use of sample and hold circuits in the manner illustrated in FIG. 19 can provide desirable advantages of being able to implement long time delays with high precision. This combination of characteristics within a time delay and phase adjustment unit can be difficult to achieve using purely analog time delays and/or by converting the received signal into the digital domain. A class of time delay and phase adjustment units that can be referred to as hybrid analog/digital time delay units utilize an approach similar to the time delay and phase adjustment unit illustrated in FIG. 19 for these reasons and are discussed in detail below.

While various time delay and phase adjustment units are described above with reference to FIGS. 15-19, it should be readily appreciated that any of a variety of time delays and/or phase shifters can be combined to implement a time delay and phase adjustment unit for use in a spatial redistributor in accordance with an embodiment of the invention including (but not limited to) switchable transmission lines, optical delay lines, and/or a true time delay circuit. Hybrid analog/digital time delay units that can be utilized within large scale spatial redistributors in accordance with various embodiments of the invention are discussed further below.

Time Delay Beamforming Element Incorporating Hybrid Analog/Digital Time Delay Unit Time delay with fine resolution and broad range can be a key enabler of the scalability of spatial redistributors. Large scale timed-arrays can be challenging to implement, because existing integrated delays can be power hungry, area inefficient, and/or lacking sufficient range and resolution. Non-IC solutions, such as switchable transmission lines or optical delays, are physically and economically impractical for arrays with hundreds or thousands of elements. Accordingly, spatial redistributors in accordance with a number of embodiments of the invention utilize hybrid analog/digital time delay units to enabling the construction of large scale timed-arrays.

The performance requirements of spatial redistributors in accordance with many embodiments of the invention are determined by the physical array aperture size and bandwidth of the intended application. For instance, in a 1 m aperture span array with 500 MHz baseband bandwidth, two elements on opposite sides of the array can experience time offset of up to 2 ns while ideally requiring delay adjustment resolution of <20 ps for temporal alignment within 1% of the maximum data frequency content. A 2 ns delay range requirement can be challenging for existing analog delay solutions, while the <20 ps resolution can be impractical in purely digital solutions due to the feasibility of generating a suitable digital clock signal. Channels in accordance with a number of embodiments of the invention can utilize a hybrid analog/digital switched capacitor delay unit, which can achieve the desired combination of large magnitude time delays with fine resolution of temporal alignment.

Any switched capacitor circuit can be considered as a time delay. As is conceptually illustrated in FIGS. 20A-20C, a signal can be sampled onto the capacitor by a clock edge delivered to the input switch and accessed later by a subsequent clock edge. By controlling the delay between the sample and access clock edges, the delay of the circuit can be changed (see FIGS. 20B and 20C). As is discussed further below, a set of parallel switched capacitors can be utilized to implement hybrid analog/digital time delay circuits in accordance with various embodiment of the invention that can achieve fine resolution and broad range.

To provide sufficient sample rate for an input signal's bandwidth, multiple switched capacitors can be placed in parallel in an n-path configuration similar to the configuration shown in FIG. 21A to implement a hybrid analog/digital time delay. The input and output switches of the parallel switched capacitors can be controlled by two separate non-overlapping clock generators (NOCs) as shown in FIG. 21B. The time delay introduced by the hybrid analog/digital time delay can be controlled by the relative phase of the two NOCs.

With specific reference to the hybrid analog/digital time delay 2100 illustrated in FIG. 21A, eight (8) switched capacitors 2102 are utilized, where the time delay introduced by switched capacitors is controlled by the relative phase of two NOCs 2104, 2106. As can readily be appreciated, the number of parallel switched capacitors that can be utilized is not fixed at eight and is largely dependent upon the requirements of specific applications. In many embodiments, the hybrid analog/digital time delay 2100 enables independently configurable fine, medium, and coarse controls for the relative phase of the two NOCs 2104, 2106. The coarse control circuit can change the location of the pulse in the output NOC. In a number of embodiments, the fine and medium control circuits can change the phase of the clock driving the output NOC.

Figure 22A:
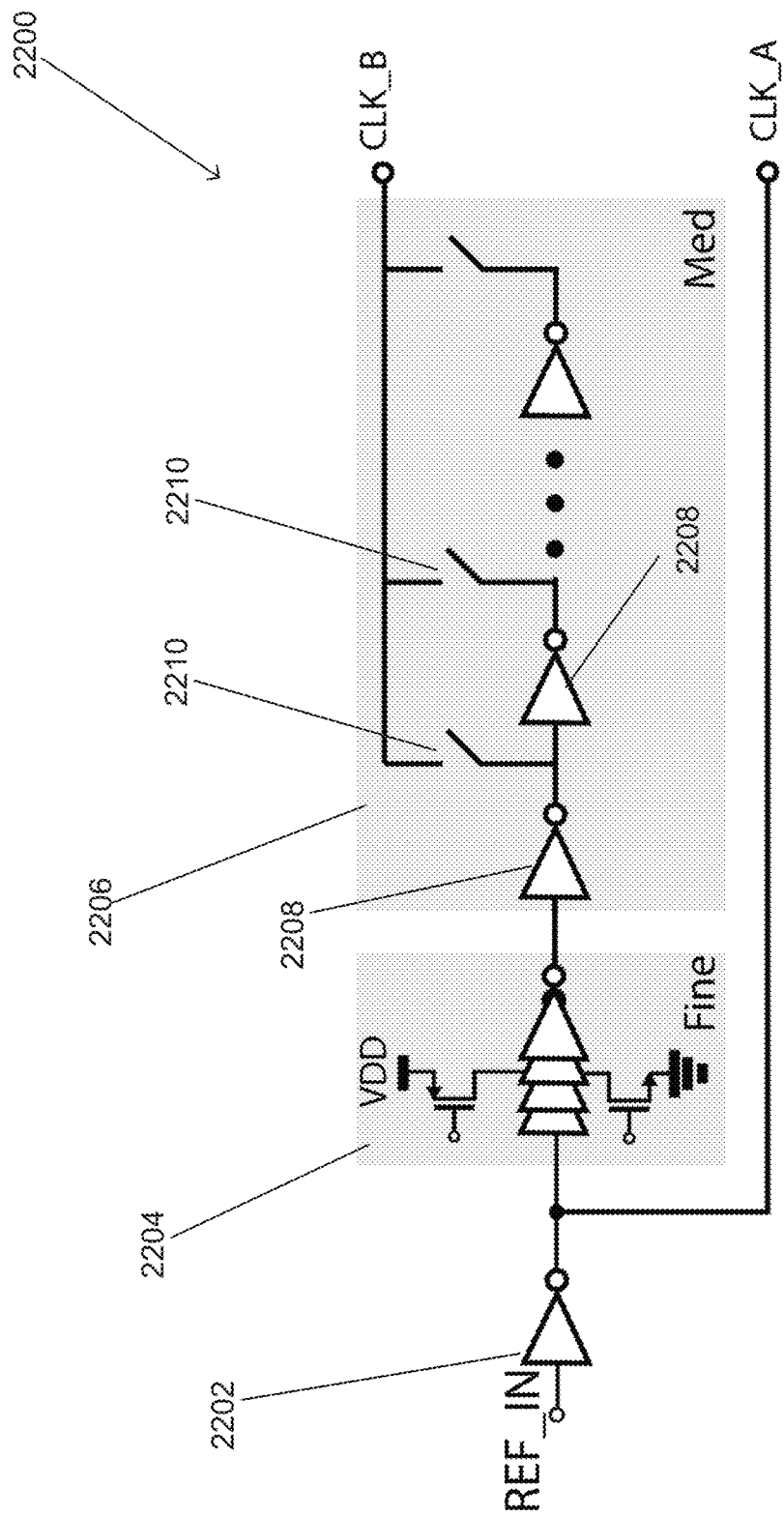
FIG. 22A illustrates the combination of a fine control circuit and a medium control circuit in accordance with an embodiment of the invention.
Figure 22B:
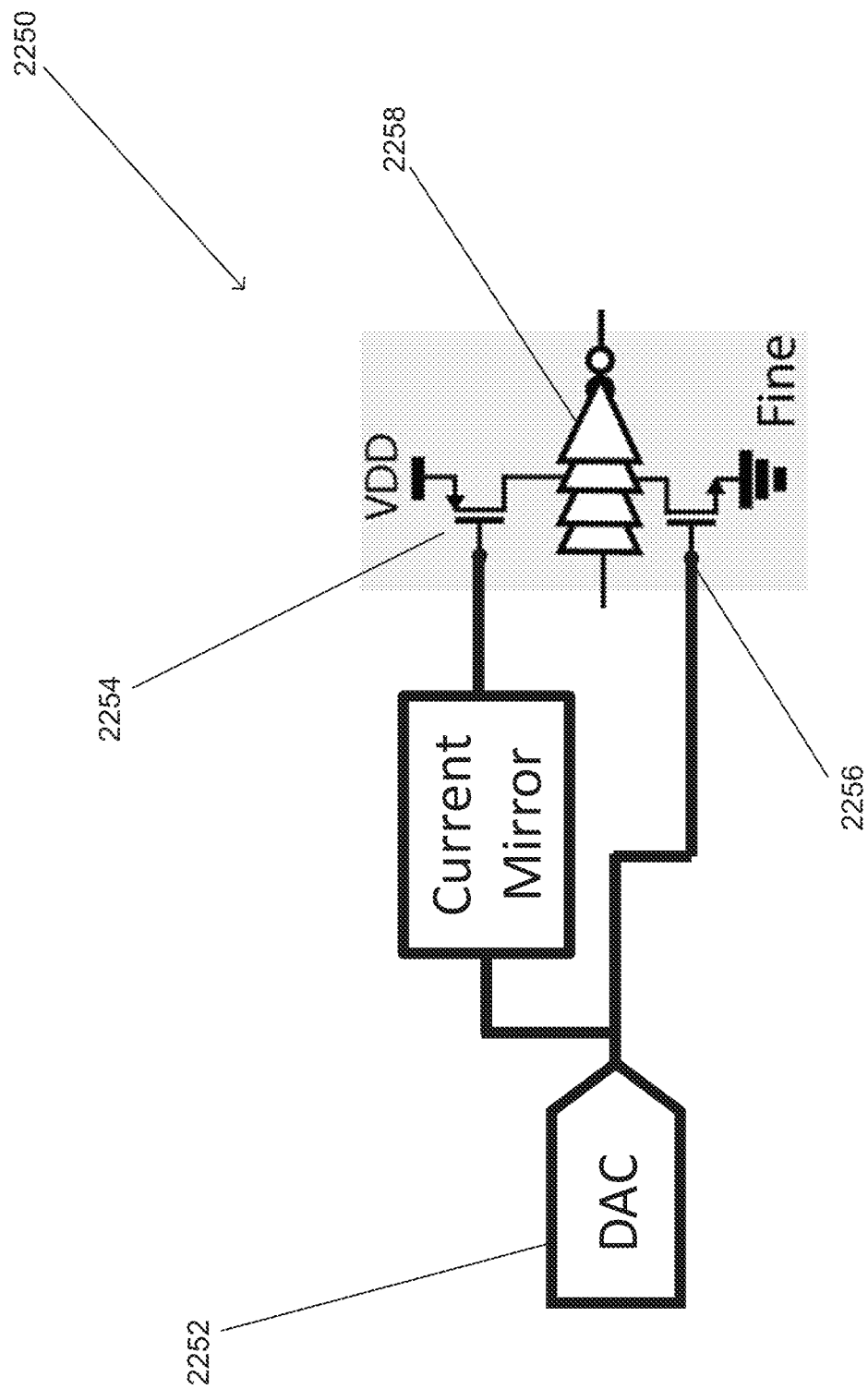
FIG. 22B illustrates a fine control circuit in accordance with an embodiment of the invention.

The combination of a fine control circuit and a medium control circuit in accordance with an embodiment of the invention is illustrated in FIG. 22A. The circuits 2200 receive a reference signal in 2202 from an NOC. The fine control circuit 2204 is shown in greater detail in FIG. 22B. The fine control circuit 2250 can be implemented using a DAC 2252 to change the bias 2254, 2256 of a chain 2258 of current starved inverters carrying the clock signal. The medium control circuit 2206 can add or remove inverters 2208 to the output clock signal path of an NOC using switches 2210.

Figure 23:
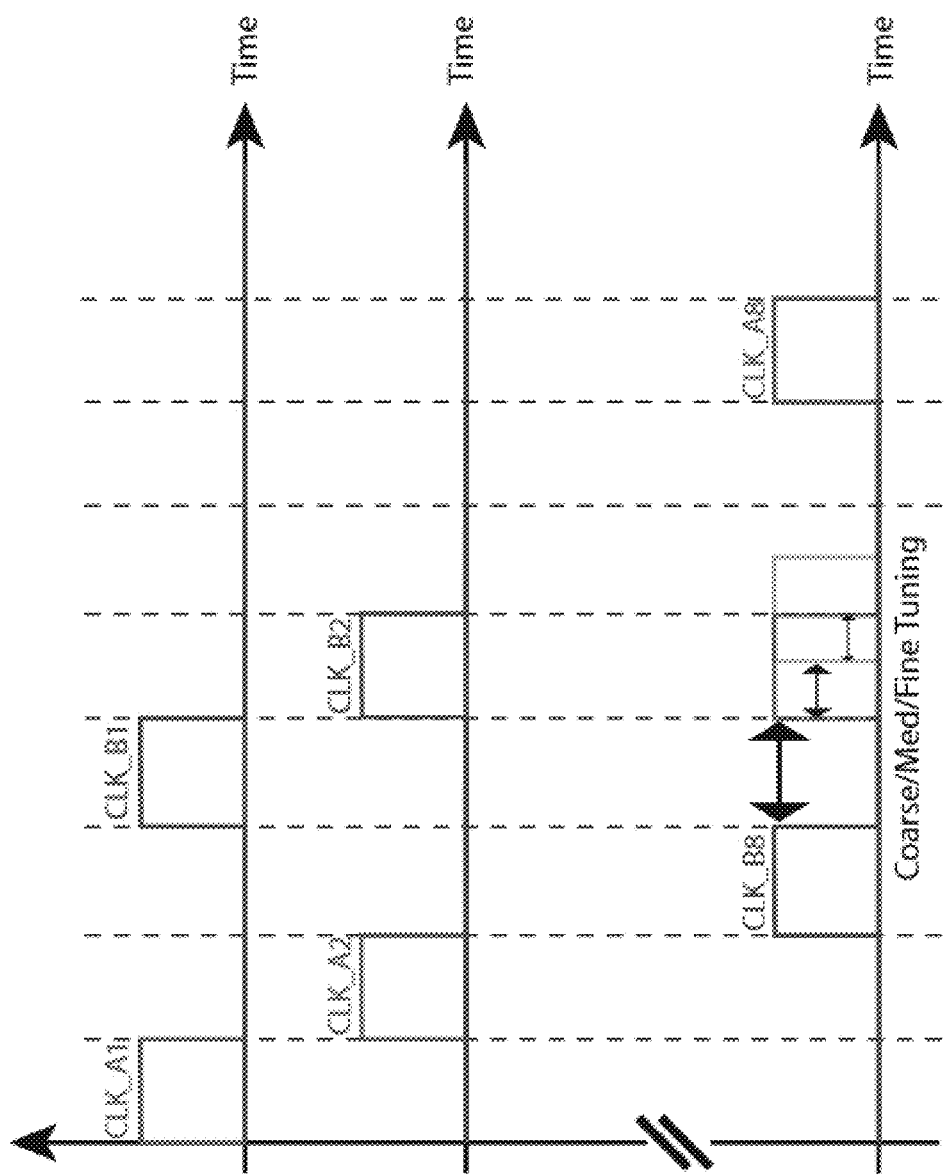
FIG. 23 is a timing diagram illustrating the manner in which coarse, medium and fine controls can adjust phase difference between NOCs in accordance with an embodiment of the invention.
Figure 24A:
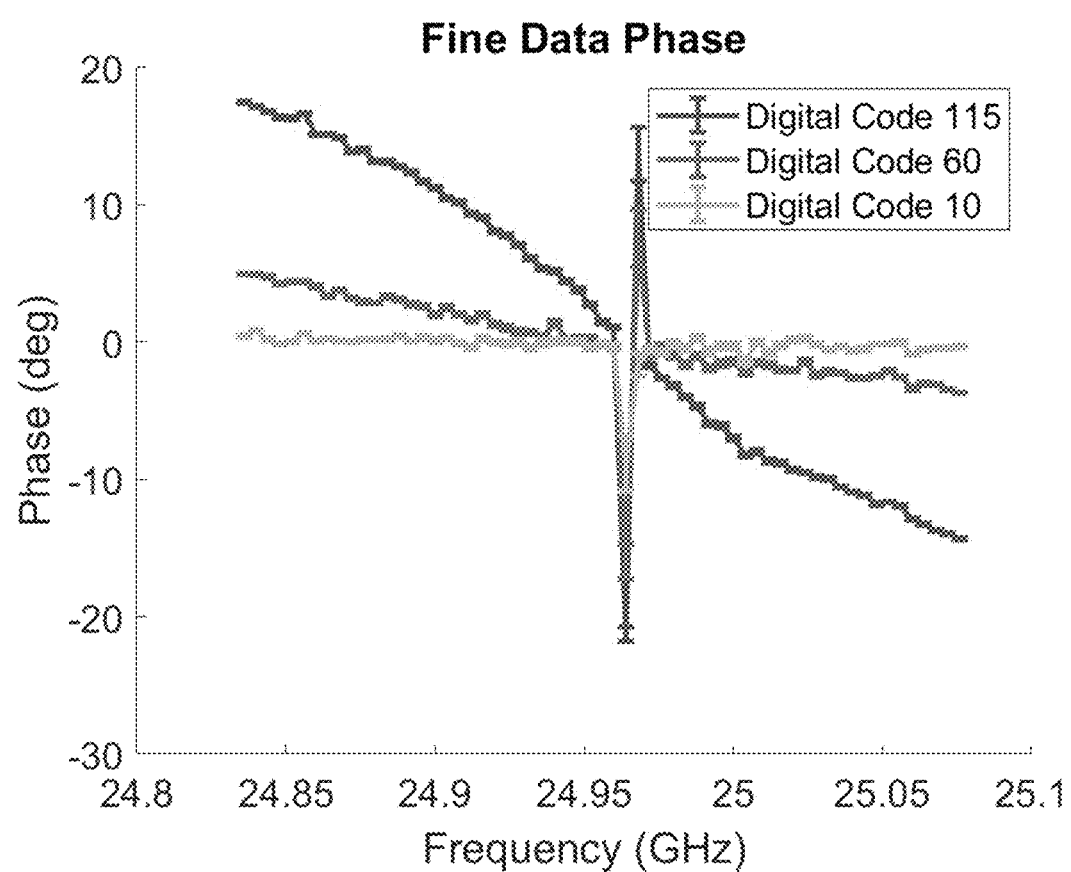
FIGS. 24A-26B show time delay line measurements made with respect to a hybrid analog/digital time delay unit implemented in a manner similar to the implementation of FIGS. 21A-22B.
Figure 24C:
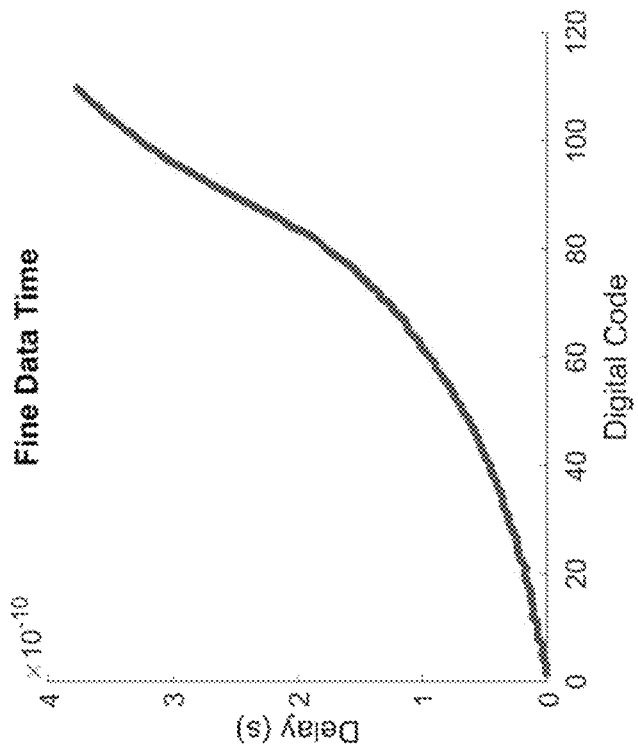
Figure 24B:
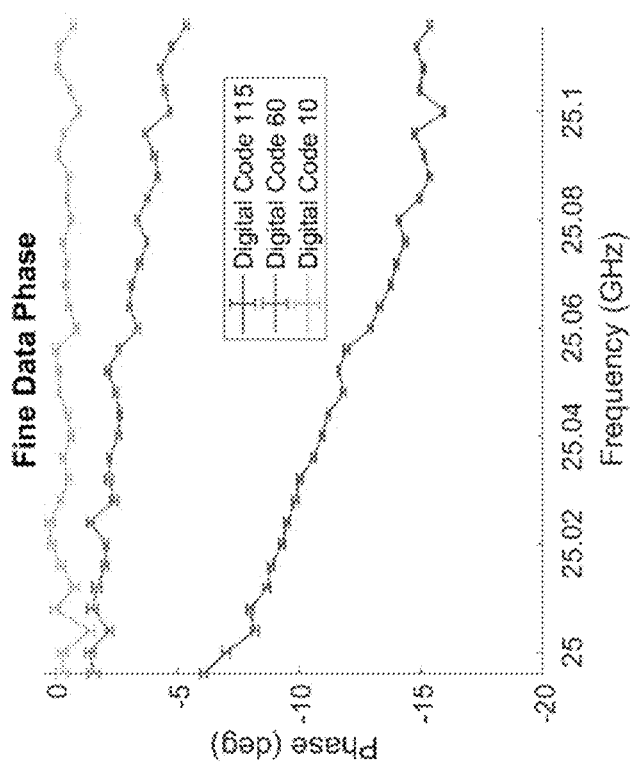
Figure 25B:
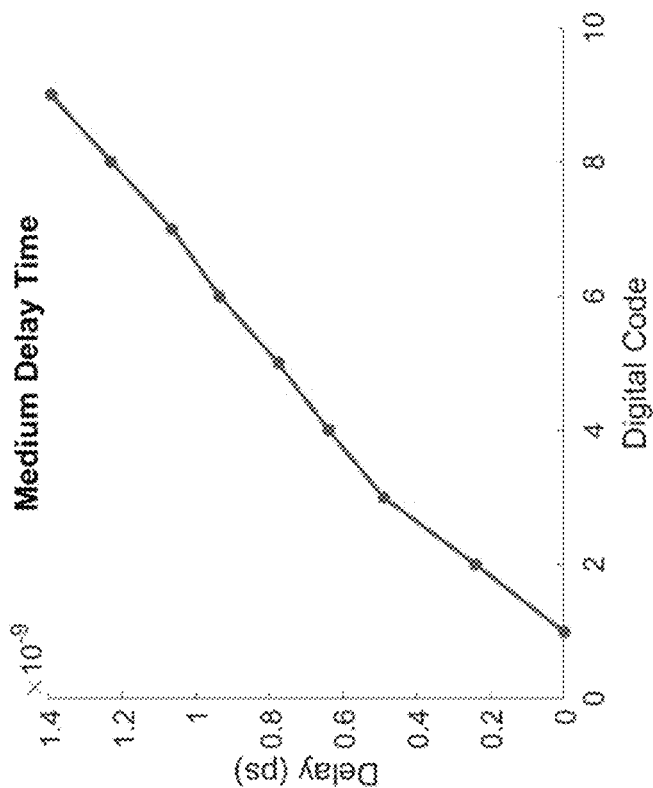
Figure 25A:
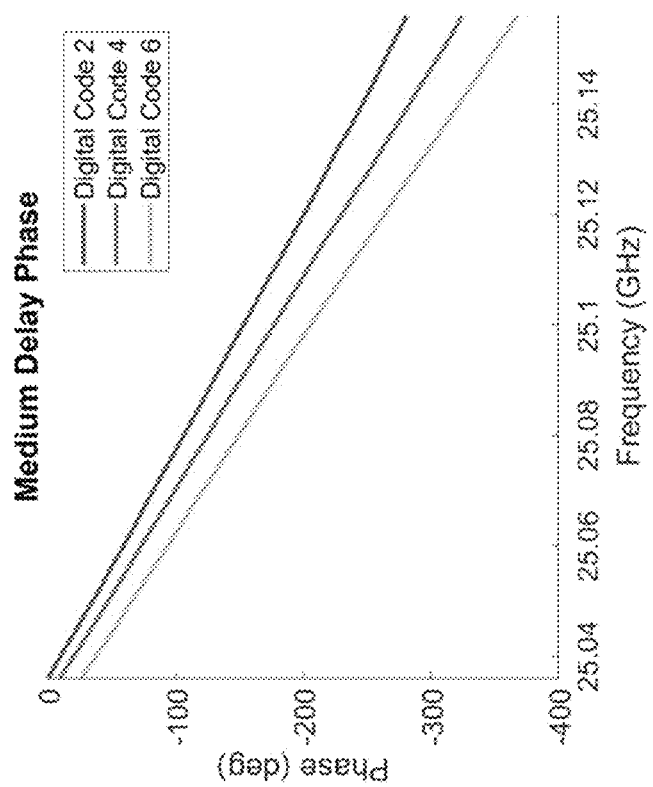
Figure 26B:
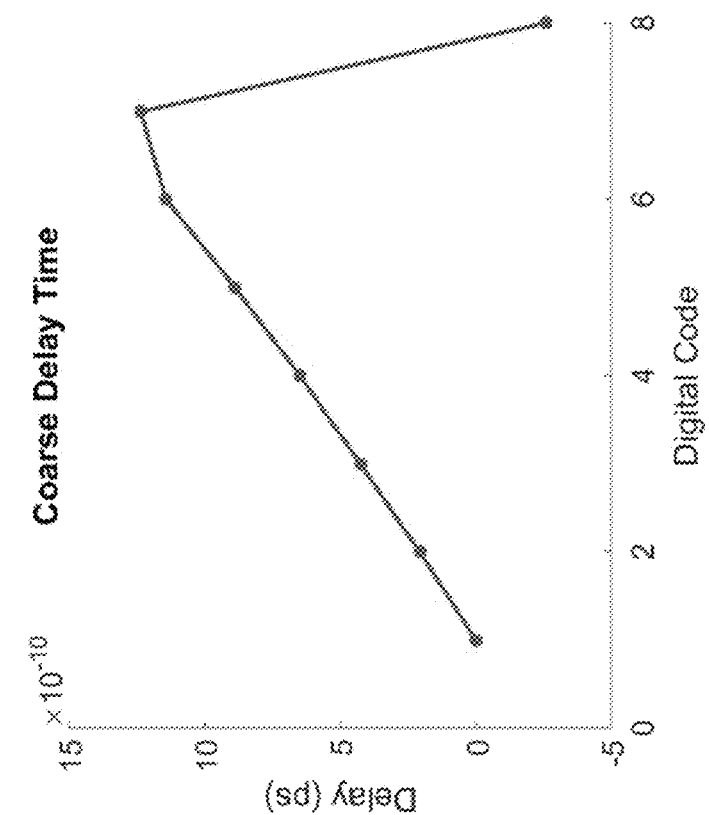
Figure 26A:
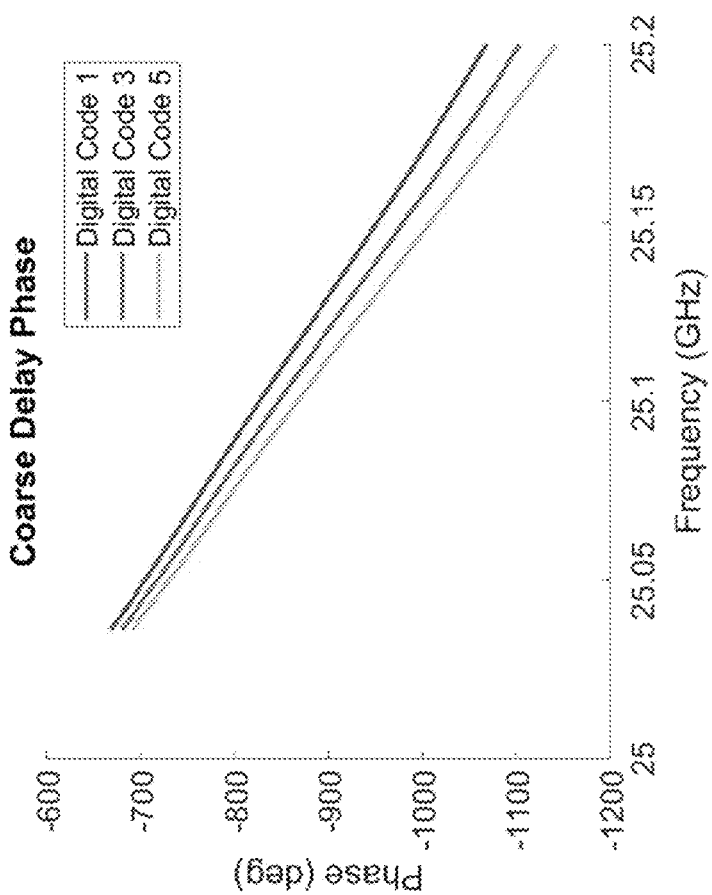

The manner in which the coarse, medium and fine controls can adjust the phase difference between the NOCs shown in FIG. 21A is illustrated in FIG. 23. The Clk_B8 signal can be time delayed by a time delay introduced by the coarse control signal, and the resulting signal is further time delayed by the time delays introduced into the NCO output by the fine and medium controls.

Figure 27:
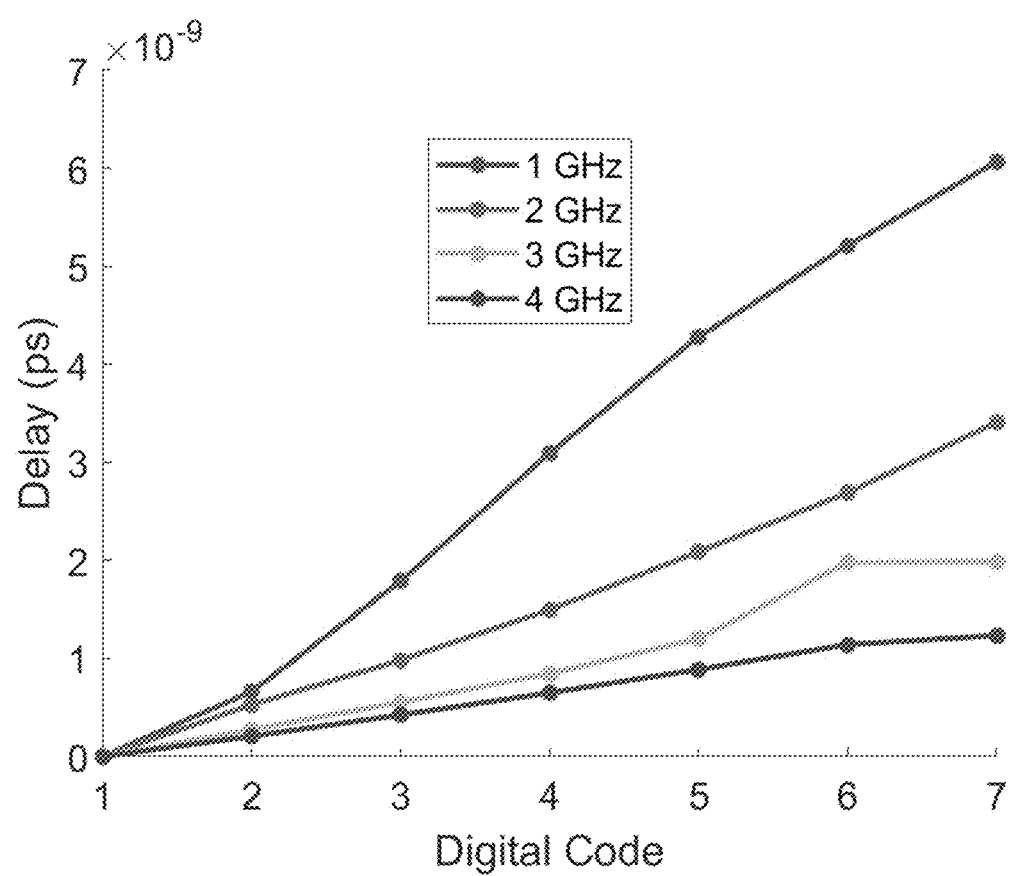
FIG. 27 illustrates that a delay introduced by a coarse control is inversely dependent upon the frequency of the clock signal of the digital circuitry within the hybrid analog/digital time delay unit.

Time delay line measurements made with respect to a hybrid analog/digital time delay unit implemented in a manner similar to the implementations described above with reference to FIGS. 21A-22B are shown in FIGS. 24A-26B. The time delay measurements illustrate a cumulative delay range of greater than 2.4 ns with a resolution of <5 ps. As can be seen from FIG. 27, the delay introduced by the coarse control is inversely dependent upon the frequency of the clock signal of the digital circuitry within the hybrid analog/digital time delay unit with a 6 ns delay demonstrated at a clock frequency of 1 GHz.

Figure 28:
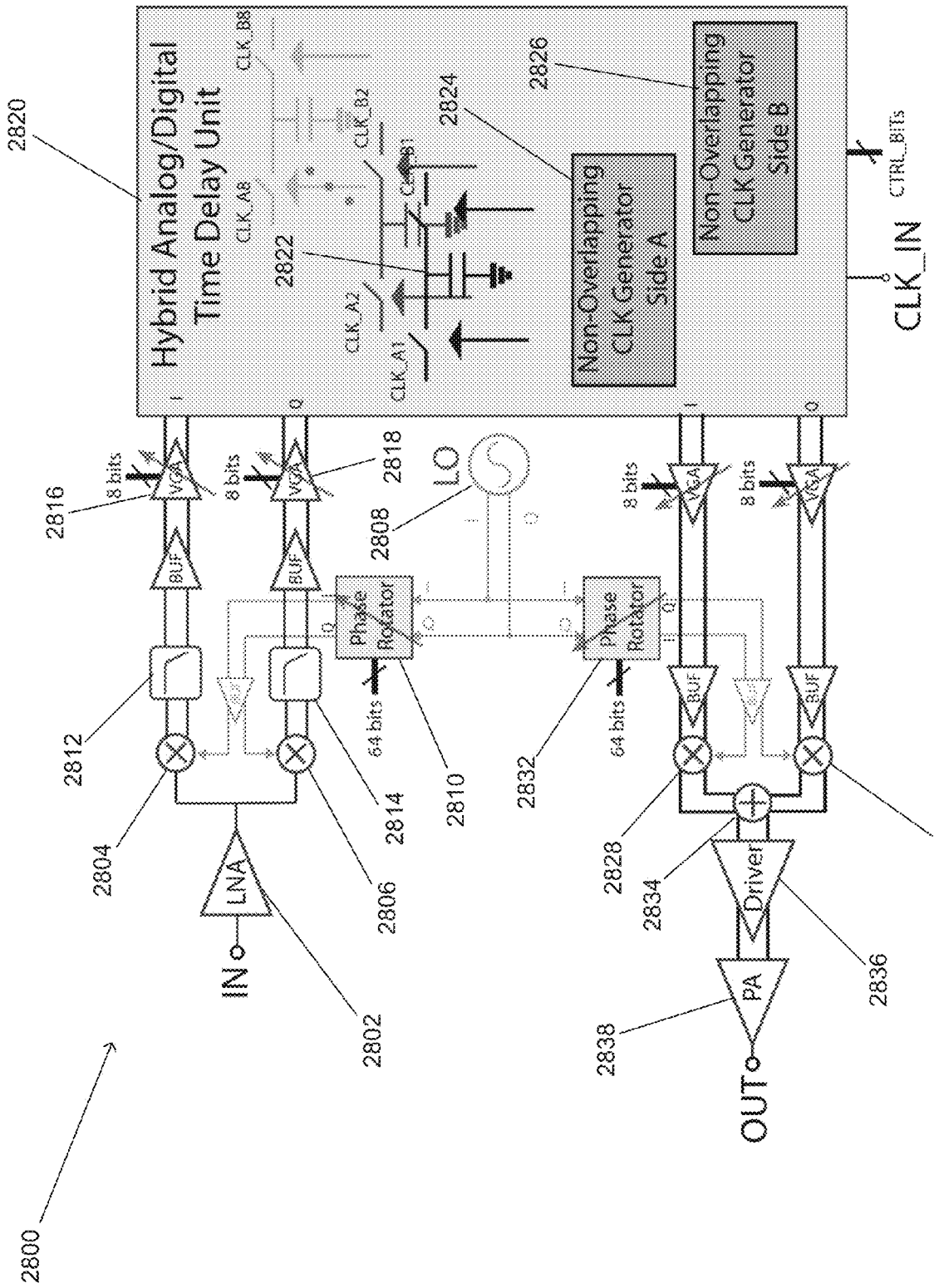
FIG. 28 illustrates a channel implemented using a hybrid analog/digital time delay unit in accordance with an embodiment of the invention.

A channel implemented using a hybrid analog/digital time delay unit in accordance with an embodiment an embodiment of the invention is illustrated in FIG. 28. The channel 2800 includes an LNA 2802 followed by an I/Q down-conversion mixer 2804, 2806. The I/Q mixer's LO 2808 can be generated on chip. The LO signals pass through a vector sum phase rotator 2810 that can provide 360 phase control.

The output of the I/Q down-conversion mixer is filtered 2812, 2814 and variable gain amplifiers 2816, 2818 condition the baseband I/Q signals before they are provided to the hybrid analog/digital time delay unit 2820. The hybrid analog/digital time delay unit 2820 can be implemented in a similar manner to the hybrid analog/digital time delay units described above with reference to FIGS. 21A-22B including parallel capacitors 2822 that are switched using a pair of NOCs 2824, 2826 or in any other appropriate manner that achieves fine resolution and broad range.

After the hybrid analog/digital time delay unit 2820, the time delayed I/Q signals are up-converted 2828, 2830 using phase rotated 2832 LO signals, where the phase control of the phase rotator 2832 is independent from the phase rotator 2810 utilized to apply a phase shift to the LO 2808 signal during down-conversion. The up-converted I/Q signals are recombined at RF in a vector summer 2834 and transmitted by a driver 2836 and PA 2838.

While specific channel implementations incorporating hybrid analog/digital time delay units are discussed above with respect to FIG. 28, any of a variety of channel architectures can be utilized with similar hybrid analog/digital time delay units as appropriate to the requirements of specific applications in accordance with various embodiments of the invention. For example, a number of variations can be implemented with respect to the hybrid analog/digital time delay unit described above with reference to FIGS. 21A-22B and the channel shown in FIG. 28. In several embodiments, the offset between the sample and write clocks in the switched capacitor hybrid analog/digital delay may be controlled with a programmable delay lock loop (DLL). In addition, the clock signal utilized within the delay cells of the hybrid analog/digital time delay unit may be supplied externally or synthesized on chip. Furthermore, the clock signal can be synthesized from the LO signal utilized in the mixers of the channel. While the channels described above with respect to FIG. 28 can utilize two phase shifters (one in the receiver path and one in the transmit path), channels in accordance with many embodiments of the invention only use one phase shifter and a time delay unit. A number of embodiments, integrate the time delay unit with a pipeline ADC and a digital power amplifier. In many of these embodiments, the sample and write clock relative phase in the hybrid analog/digital time delay unit can be used to delay the pipeline ADC output by time steps greater than and less than a clock period. Furthermore, while the channels described above with reference to FIG. 28 utilize direct down conversion with an IQ mixer and separate I/Q baseband delays, channels in accordance with several embodiments of the invention instead use IF down-conversion with the appropriate filtering and a single delay. Accordingly, it should be readily appreciated that there are many ways in which to implement channels for use in spatial redistributors in accordance with various embodiments of the invention and that the implementations are largely only limited by the requirements of specific applications.

Figure 29A:
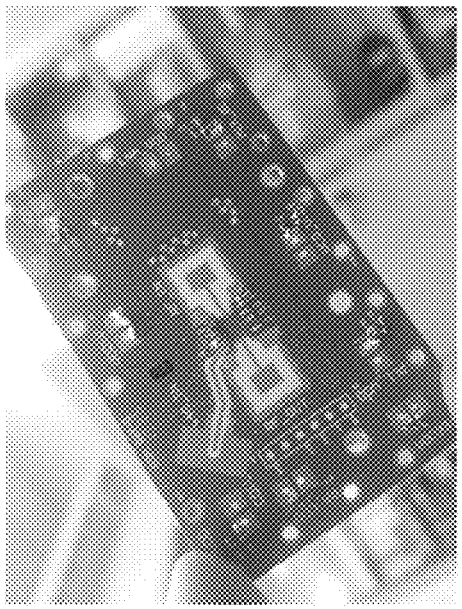
FIG. 29A shows an integrated circuit implementation of channel similar to the channel of FIG. 28.
Figure 29B:
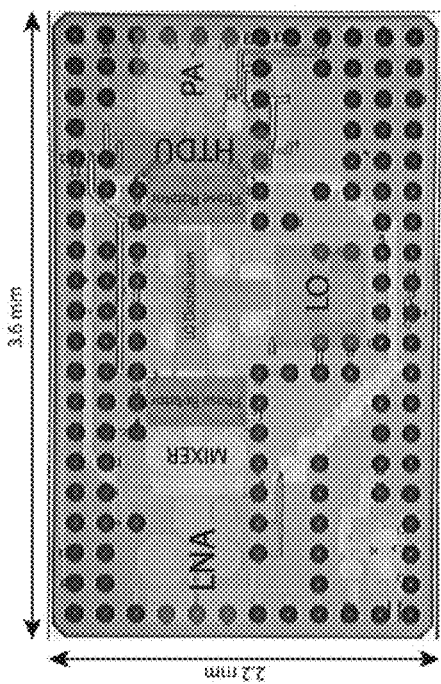
FIG. 29B shows a printed circuit board incorporating transmit and receive antenna elements that is connected to a channel integrated circuit in accordance with an embodiment of the invention.

A channel similar to the channel described above with respect to FIG. 28 can be implemented on an integrated circuit as shown in FIG. 29A. A printed circuit board incorporating transmit and receive antenna elements that is connected to a channel integrated circuit in accordance with an embodiment of the invention is shown in FIG. 29B.

Figure 29C:
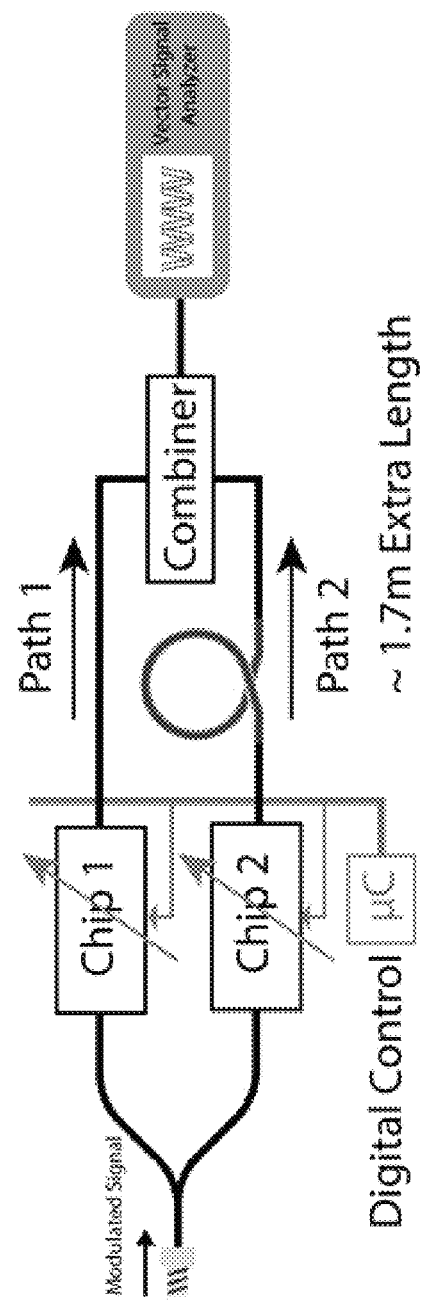
FIG. 29C illustrates an experimental configuration for testing the ability of two integrated circuits that each implement a channel in accordance with an embodiment of the invention to maintain data coherence for an 80 Mbps QPSK signal when separated by 6 ns of time offset.

In order to demonstrate system scalability for large aperture applications, the ability of two channel integrated circuits to maintain data coherence for a 80 Mbps QPSK signal when separated by 6 ns of time offset was tested using the experimental configuration illustrated in FIG. 29C. It is important to note that the LOs for the two channel ICs were not phase locked. Test results obtained using this experimental configuration are shown in FIGS. 30A-31B.

Figures 30A, 30B:
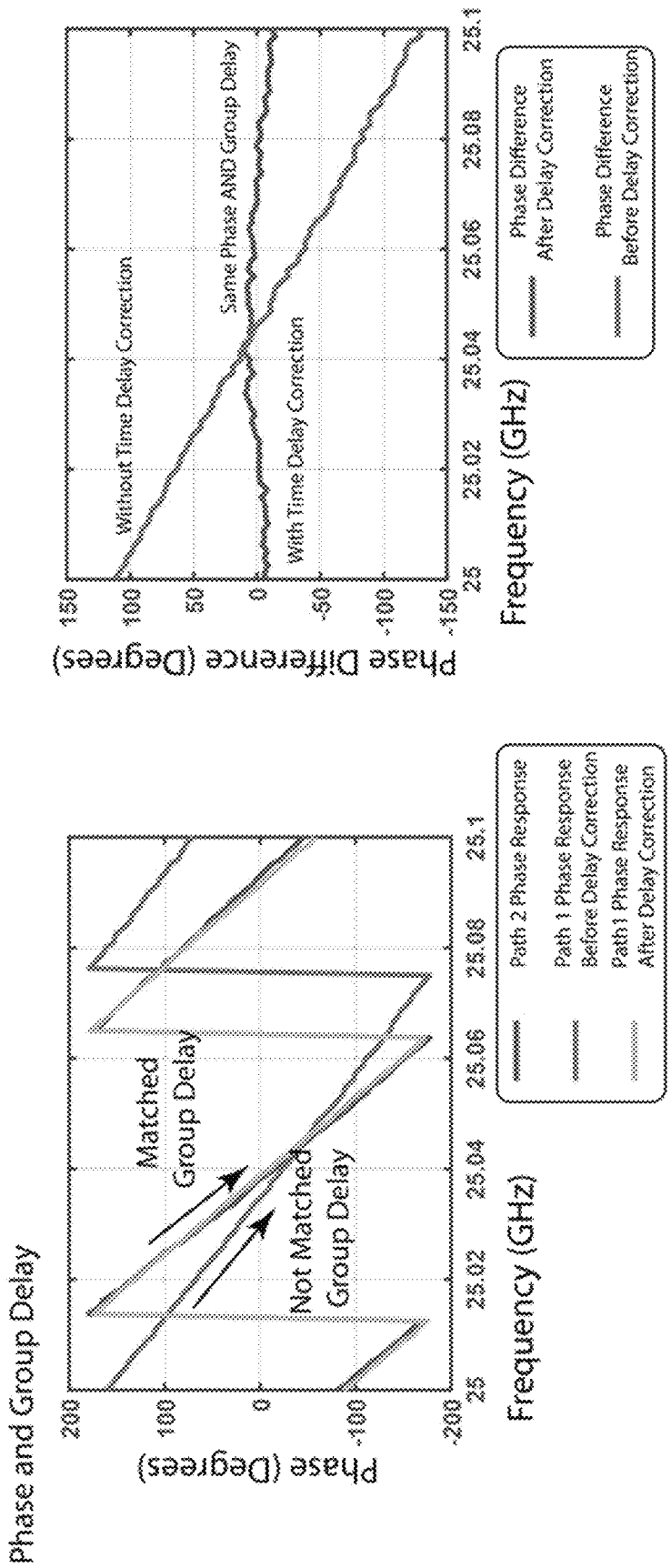
FIG. 30A shows a comparison between an unmodified Path 1 signal, a time modified Path 1 signal and the Path 2 signal from the experimental configuration shown in FIG. 29C.
FIG. 30B shows the phase difference with frequency before and after time delay correction in the Path 1 signal from the experimental configuration shown in FIG. 29C.
Figures 31A, 31B:
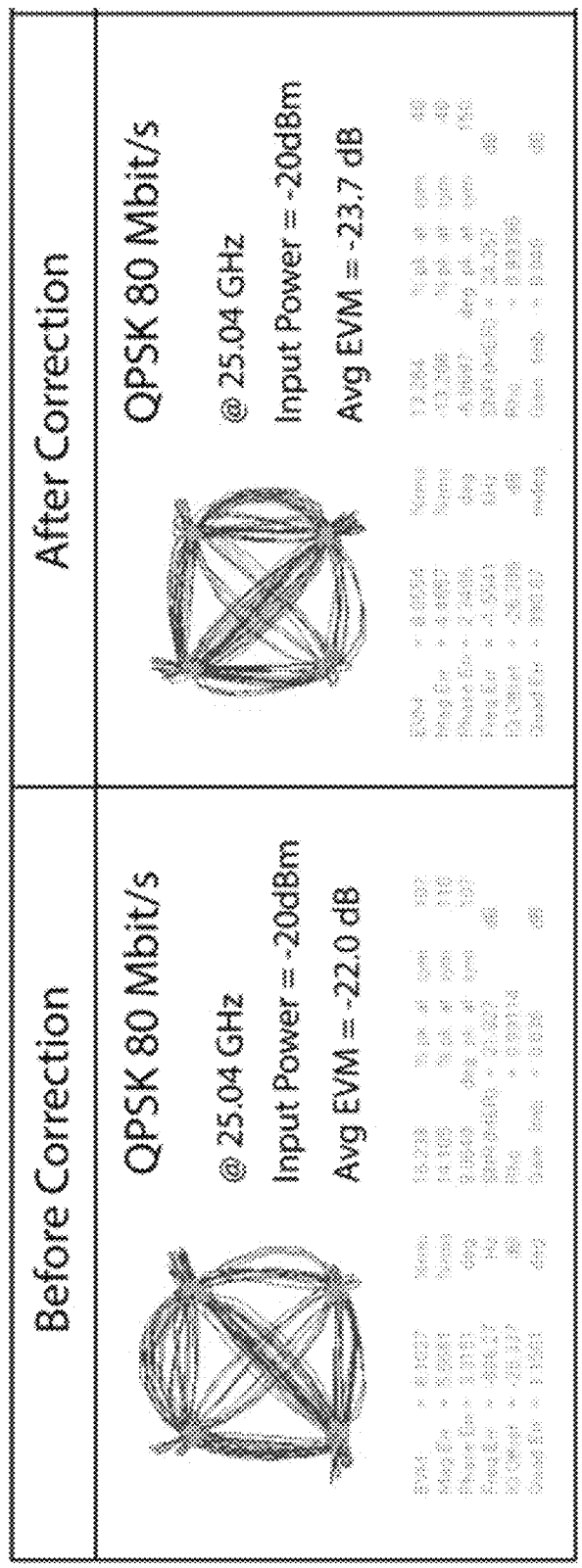
FIGS. 31A and 31B show results indicating that time coherence improves the measured EVM by 1.7 dB over phase only coherence in the experimental configuration shown in FIG. 29C.

Turning first to FIGS. 30A and 30B, the hybrid analog/digital time delay unit of the channel whose input signal was not delayed (Path 1) is used to adjust the phase and group delay of its transfer function to match that of the signal in the delayed path (Path 2). A comparison between the unmodified Path 1 signal, the time modified Path 1 signal and the Path 2 signal is shown in FIG. 30A. As can readily be appreciated introduction of a time delay into the Path 1 signal by the hybrid analog/digital time delay unit achieves matched group delay between the Path 1 and Path 2 signals at the receiver. The phase difference with frequency before and after time delay correction in the Path 1 signal is shown in FIG. 30B. The result that time coherence improves the measured EVM by 1.7 dB over phase only coherence is also apparent from a comparison of FIGS. 31A and 31B. While the results shown in FIGS. 31A and 31B are specific to QPSK modulated data, the experimental setup shown in FIG. 29C was also used to demonstrate similar results with higher cardinality modulations including (but not limited to) time delay correction of 16 QAM signals.

The ability of the channel integrated circuits described above with reference to FIGS. 29A-31B to control the relative time delay between two received signals without sharing a phase locked LO signal demonstrates the scalability of the channels described herein including (but not limited to) channels that employ frequency conversion and hybrid analog/digital time delay units. Accordingly, it can be shown that such channels can be used to implement spatial redistributors having large arrays of antenna elements with time delayed signal paths through the spatial redistributor.

As it is observed extensively above, spatial redistributors in accordance with various embodiments of the invention are not limited to any specific channel design and can in fact utilize multiple different channel architectures to form a single time delay receive and/or transmit beamforming array. Furthermore, a number of channels utilized in spatial redistributors in accordance with various embodiments of the invention utilize multiple channels, where one or more of the channels incorporates a sub-array of antenna elements. Channels that can be utilized with sub-arrays of elements to collectively perform time delay beamforming in accordance with a number of embodiments of the invention are discussed below.

Spatial Redistributors Incorporating Hybrid Time Delay Beamforming Arrays

Much of the discussion above has focused on the use of a collection of channels that each apply time and phase adjustments to a received signal to perform receive and/or transmit beamforming. In a number of embodiments, the channels also combine signals received using multiple antenna elements (but are still independent of other channels, i.e. do not combine received signals with signals from other channels). By employing conventional phased array beamforming to combine the received signal, a channel can increase the SNR of the received signal. The channel can then apply time and phase adjustments to the combined signal. In several embodiments, the channel can also incorporate an array of transmit antenna elements. In which case, the channel can apply different time and phase adjustments to the signals provided to each of the transmit antenna elements. When multiple channels are utilized together, controlling the time and phase adjustments applied to the signal paths of each signal transmitted by a transmit antenna element enables all of the antenna elements of the array of channels to act as a single time delay beamforming antenna array. Utilizing a partially centralized delay within individual channels can save power/chip area/infrastructure and reduce complexity. If the antenna elements of the channel are spaced close to each other relative to the data wavelength, then little dispersion/beam squinting is likely to occur, neutralizing the drawbacks that can occur when a shared delay is applied across a large array. The partial centralization can be used to add spatial selectivity or increase signal to noise ratio within the channel, allowing for additional processing and signal adjustment. For integrated circuit implementations of channels that utilize partial centralization, the circuitry of the channel may be implemented in a single integrated circuit die or between several.

Figure 32:
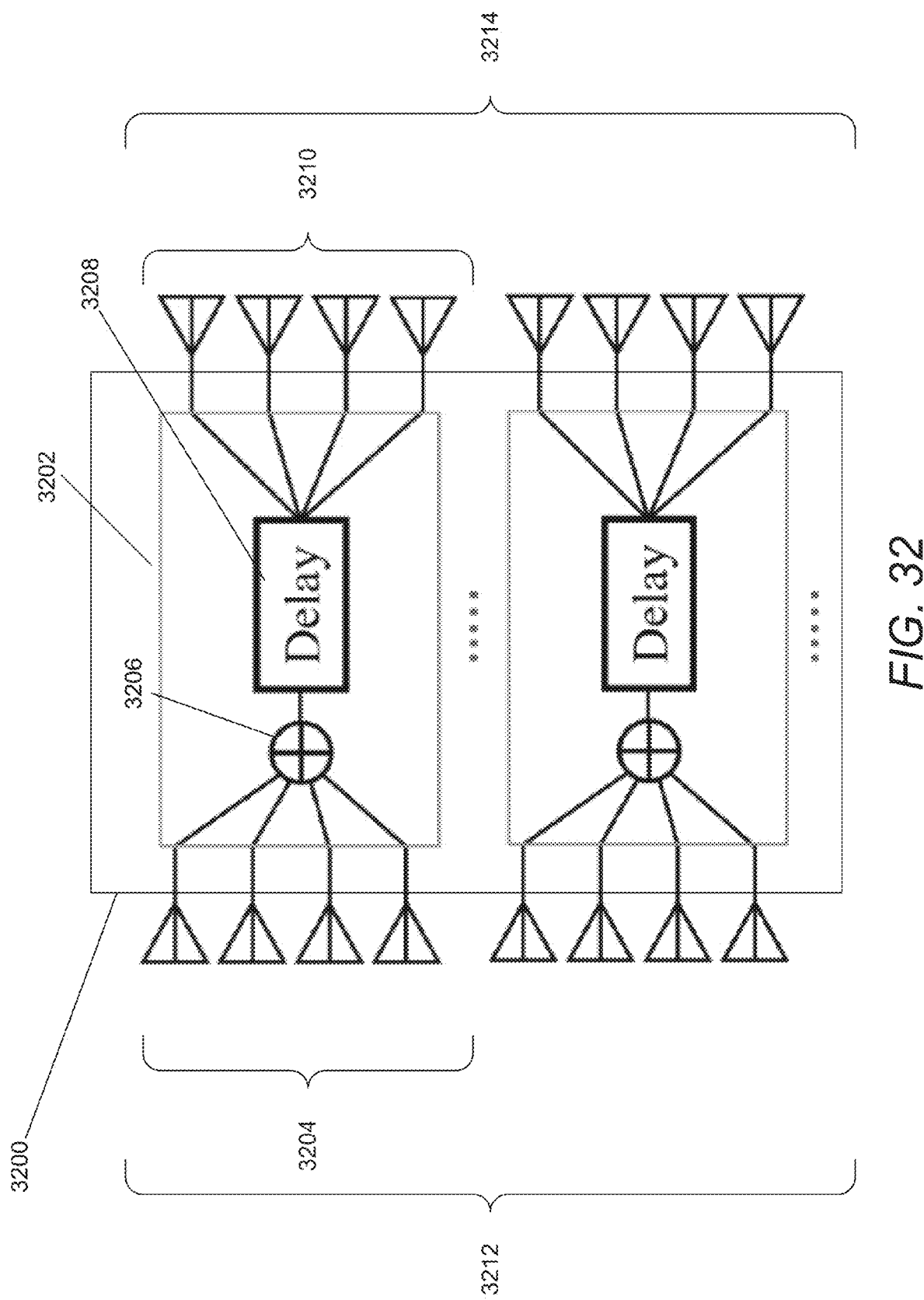
FIG. 32 illustrates a set of channels that each include sub-arrays of receive antennas and sub-arrays of transmit antennas that coordinate to act as time delay receive and transmit beamforming arrays in accordance with an embodiment of the invention.

A set of channels that each include sub-arrays of receive antennas and sub-arrays of transmit antennas that coordinate to act as time delay receive and transmit beamforming arrays in accordance with an embodiment of the invention is illustrated in FIG. 32. The spatial redistributor 3200 includes a number of channels 3202. At least some of the channels include a sub-array of antenna elements 3204 that can be used to receive signals. Due to the spacing of the antenna elements, the signals can be combined 3206 using a conventional phased array beamformer. As noted above, performing beamforming can significantly increase the SNR of the received signal. The channel can then apply a time delay 3208 to the received signal using a time delay units implemented in a similar manner to any of the time delay units described above. The time delay can be determined based upon the aperture of the spatial redistributor's transmit array and the direction in which the transmit beam is being steered.

In the illustrated embodiment, each channel 3202 also has a sub-array 3210 of transmit antennas. The channel 3202 can apply different time and phase adjustments to the signals provided to each of the antenna elements in the sub-array 3210. In this way, each of the channel's 3202 antenna elements forms an element in decentralized receive 3212 and/or transmit 3214 time delay transmit beamforming antenna array.

It is important to appreciate that the decentralized nature of the channels that form each of the sub-arrays in the spatial redistributor 3200 shown in FIG. 32 does not cause each channel to act as an independent beamforming relay. While this configuration is possible, the true benefit of the configuration shown in FIG. 32 is that the time delays introduced by each channel enable the channels collectively to function as a single decentralized time delay beamforming array that can create coherent receive beams and coherent transmit beams (instead of each channel's sub-array forming its own independent beams that may interfere).

The spatial redistributor 3200 shown in FIG. 32 takes advantage of the ability to perform localized beamforming within individual channels with the advantages of scale afforded by utilizing multiple channels that do not require sharing of a phase coherent reference signal and that can collectively perform time delay beamforming. While the spatial redistributors described above with respect to FIG. 32 incorporate multiple channels into single fixed array, spatial redistributors in accordance with many embodiments of the invention can be formed from moving and/or spatially distributed channels similar to those shown in FIG. 32. Furthermore, spatial redistributors can be constructed from combinations of channels having multiple receive and/or transmit antenna elements, channels having a single receive and/or transmit antenna element, channels that have multiple receive antenna elements and a single transmit antenna element, and channels that have a single receive antenna element and multiple transmit antenna elements. Accordingly, it should be readily appreciated that the construction of spatial redistributors including (but not limited to) spatial relays and spatial routers is not in any way limited to the use of any one channel design. Rather, spatial redistributors can be implemented using any channels and/or combination of channels as appropriate to the requirements of specific applications.

Time Delay Beamforming Element Self-Test Modes

Figure 33:
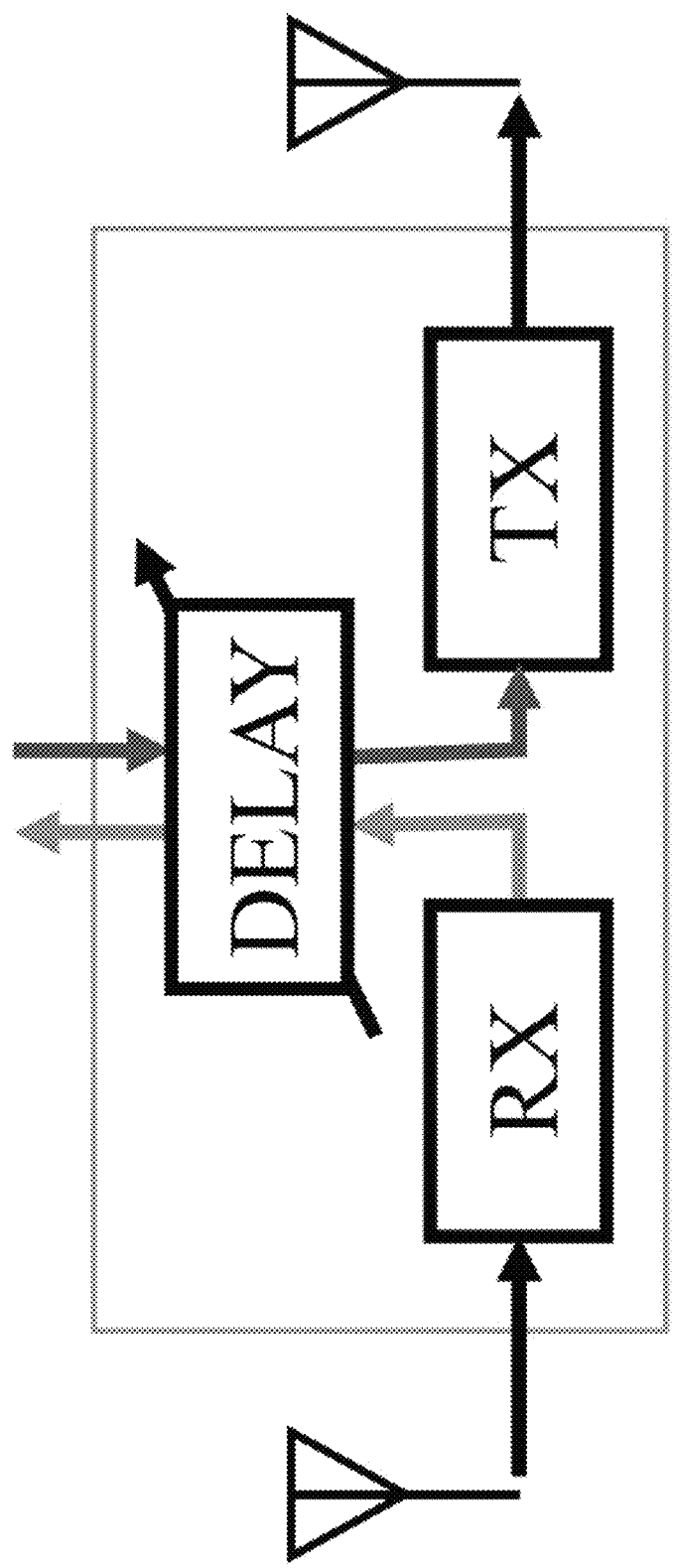
FIG. 33 illustrates channels including a self-test capability achieved by providing circuitry that enables the disconnection of the receive path from the transmit path in accordance with an embodiment of the invention.

In many embodiments, the sub-systems of channels within a spatial redistributor incorporate self-test capabilities so that the spatial redistributor controller may assess system health and measure the phase/time delay offsets associated with its internal circuitry and external lines/radiators. In several embodiments, self-test capability is achieved within the channel by providing circuitry that enables the disconnection of the receive path from the transmit path as illustrated in FIG. 33.

The receive path output can be demodulated on or off chip and the channel used as a stand-alone receiver. The transmit path can also be driven by an on-chip oscillator or frequency synthesizer or by other means such as an external source. These capabilities allow the channel to perform functions including (but not limited to) mutual coupling calibration to determine the phase offsets of the elements and/or be used to perform shape calibration to determine the relative location and orientation of the elements. This disconnection capability can also be used separately from calibration to allow the system to function as separate transmit and receive arrays. These arrays can send and receive signals, data, and power without functioning as a relay. As can readily be appreciated, any of a variety of techniques can be utilized to perform self-testing, self-calibration and/or other monitoring of channels and channel sub-systems as appropriate to the requirements of specific applications in accordance with various embodiments of the invention.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) a radar echo countermeasure, without departing from the scope and spirit of the present invention. Thus, embodiments of the present invention should be considered in all respects as illustrative and not restrictive.

What is claimed is:

1. A spatial redistributor, comprising:
   an array of channels, where each of a plurality of independently operating channels in the array comprises:
   at least one antenna element configured to wirelessly receive a signal;
   an RF chain configured to apply at least a time delay to the received signal;
   control circuitry configured to control the time delay applied to the received signal by the RF chain;
   a reference oscillator; and
   wherein the at least one antenna element is further configured to wirelessly retransmit the time delayed signal;
   wherein the array of channels is configured to redirect a signal received from a first set of directions for retransmission in a second set of directions; and
   wherein the control circuitry of the channels in the array of channels coordinates the time delays applied to the received signal across the array of channels to control the wave front of the retransmitted signal.

2. The spatial redistributor of claim 1, wherein at least a plurality of the channels in the array of channels do not share a common reference oscillator signal.

3. The spatial redistributor of claim 1, wherein controlling at least one of a time delay and a phase shift applied to the received signal achieves at least one of receive beamforming and transmit beamforming.

4. The spatial redistributor of claim 1, wherein controlling at least one of a time delay and a phase shift applied to the received signal achieves receive and transmit beamforming.

5. The spatial redistributor of claim 1, wherein each channel in the array of channels is further configured to apply a phase shift to the received signal prior to retransmission.

6. The spatial redistributor of claim 5, wherein the time delay is applied to the received signal and the phase shift is applied to the time delayed signal.

7. The spatial redistributor of claim 5, wherein the time delay and the phase shift are applied using a single adjustment of the received signal.

8. The spatial redistributor of claim 1, wherein the antenna elements of the channels in the array of channels form an antenna array selected from the group consisting of:
   a one-dimensional (1D) array;
   a two-dimensional (2D) array; and
   a three-dimensional (3D) array.

9. The spatial redistributor of claim 8, wherein channels in the array of channels form at least one array selected from the group consisting of a regular array and an ad hoc array.

10. The spatial redistributor of claim 8, wherein the antenna array comprises alternating transmit and receive antenna elements.

11. The spatial redistributor of claim 8, wherein the antenna array comprises transmit and receive antenna elements mounted to different sides of a supporting structure.

12. The spatial redistributor of claim 8, wherein the antenna array comprises antenna elements that are utilized as both a receive and a transmit antenna array.

13. The spatial redistributor of claim 1, wherein the at least one antenna element of at least one of the channels in the array of channels comprises at least one receive antenna element and at least one transmit antenna element.

14. The spatial redistributor of claim 1, wherein the at least one antenna element of at least one of the channels in the array comprises a multiport antenna element that is utilized for receiving and transmitting signals.

15. The spatial redistributor of claim 1, wherein the:
   at least one antenna element of at least one of the channels in the array comprises a single port; and
   at least one channel in the array that comprises a single port antenna element further comprises a circulator.

16. The spatial redistributor of claim 1, wherein at least a plurality of the channels in the array of channels apply at least one of a time delays and a phase shift directly to a received RF signal.

17. The spatial redistributor of claim 1, wherein at least a plurality of the channels in the array of channels perform frequency conversion and apply a time delay and apply a phase shift to an intermediate frequency (IF) signal.

18. The spatial redistributor of claim 17, wherein at least a plurality of the channels in the array of channels perform frequency conversion and apply time delays and apply phase shifts to a base band (BB) signal.

19. The spatial redistributor of claim 17, wherein the frequency conversion comprises down conversion and up conversion.

20. The spatial redistributor of claim 19, wherein the received signal has a carrier frequency with a first frequency and the up conversion is to a carrier frequency at a second frequency that is different to the first frequency.

21. The spatial redistributor of claim 1, wherein at least a plurality of the channels in the array of channels apply at least one of a time delay and a phase shift to a received analog signal.

22. The spatial redistributor of claim 21, wherein the at least a plurality of the channels in the array of channels that apply at least one of a time delay and a phase shift to a received analog signal:
perform frequency conversion to convert the received signal to an IF signal;
obtain analog samples of the received signal; and
apply delays to the analog samples of the received signal.

23. The spatial redistributor of claim 22, wherein:
obtaining analog samples of the received signal comprises sampling the received signal onto a set of parallel switched capacitors; and
applying delays to the analog samples of the received signals comprises controlling the delay between the sampling of the received signal onto the capacitors in the set of parallel switch capacitors and the readout of the capacitors in the set of parallel switched capacitors.

24. The spatial redistributor of claim 23, wherein each of the at least a plurality of the channels in the array of channels that apply delays to analog signals further comprises two non-overlapping clock generators (NOCs) that control the sampling of the received signal onto the capacitors in the set of parallel switch capacitors and the readout of the capacitors in the set of parallel switched capacitors.

25. The spatial redistributor of claim 23, wherein at least a plurality of the channels in the array of channels have reference oscillators that produce different time bases.

26. The spatial redistributor of claim 1, wherein at least a plurality of the channels in the array of channels:
digitize the received signal;
apply time delays and phase shifts to the digitized signal;
generate an analog signal using a digital to analog converter; and
retransmit a signal based upon the generated analog signal.

27. The spatial redistributor of claim 1, wherein the array of channels forms a spatial router configured to utilize routing information to dynamically adjust the manner in which received signals are redirected.

28. The spatial redistributor of claim 27, wherein the spatial router comprises at least one channel configured to decode data modulated onto the received signal and extract routing information from the decoded data.

29. The spatial redistributor of claim 28, wherein the routing information comprises at least one geometric angles, location coordinates, and an identifier.

30. The spatial redistributor of claim 1, wherein the reference oscillator of at least a plurality of channels in the array is a free running oscillator.

31. The spatial redistributor of claim 1, wherein at least a plurality of channels in the array are bidirectional channel.

32. The spatial redistributor of claim 1, wherein at least a plurality of channels in the array are mobile.

33. A spatial redistributor, comprising:
an array of channels, where each of a plurality of independently operating channels in the array comprises:
at least one antenna element configured to wirelessly receive a signal;
a reference oscillator, wherein a reference oscillator signal from the reference oscillator is used to demodulate the signal into an intermediate frequency (IF) signal;
an RF chain configured to apply at least a time delay and a phase shift to the IF, wherein the reference oscillator signal is further used to upconvert the time delayed and phase shifted signal into an upconverted signal;
control circuitry configured to control the time delay and the phase shift applied to the received signal by the RF chain; and
wherein the at least one antenna element is further configured to wirelessly retransmit the upconverted signal;
wherein the array of channels is configured to redirect a signal received from a first set of directions for retransmission in a second set of directions;
wherein the control circuitry of the channels in the array of channels coordinates the time delays and phase shifts applied to the received signal across the array of channels to control the wave front of the retransmitted signal to perform receive and transmit beamforming; and
wherein at least a plurality of the channels in the array of channels do not share a common reference oscillator signal.

34. A method of redistributing signals, comprising:
receiving a signal from a first set of directions at an array of channels, where each of a plurality of independently operating channels in the array comprises:
a receiving antenna configured to wirelessly receive a signal;
at least one antenna element configured to wirelessly receive a signal;
an RF chain configured to apply at least a time delay to the received signal prior to retransmission;
control circuitry configured to control the time delay applied to the received signal by the RF chain;
a reference oscillator; and
wherein the at least one antenna element is further configured to wirelessly retransmit the time delayed signal; and
retransmitting the received signal in a second set of directions by coordinating the time delays applied to the received signal across the array of channels to control the wave front of the retransmitted signal.

* * * * *